United States Patent

Busch

[15] 3,676,846

[45] July 11, 1972

[54] MESSAGE BUFFERING COMMUNICATION SYSTEM

[72] Inventor: Michael D. Busch, Corona Del Mar, Calif.

[73] Assignee: Call-A-Computer, Inc.

[22] Filed: July 9, 1970

[21] Appl. No.: 61,007

Related U.S. Application Data

[62] Division of Ser. No. 766,384, Oct. 9, 1968, Pat. No. 3,560,936.

[52] U.S. Cl. ..................................340/146.1 BA, 340/172.5

[51] Int. Cl. ..........................................................G08c 25/00

[58] Field of Search ................340/146.1, 172.5; 179/15 AE, 179/ A

[56] References Cited

UNITED STATES PATENTS

| | | | |
|---|---|---|---|
| 3,408,632 | 10/1968 | Hauch | 340/172.5 |
| 3,432,815 | 3/1969 | Lem et al. | 340/172.5 |
| 3,447,135 | 5/1969 | Calta et al. | 340/172.5 |
| 3,308,439 | 3/1967 | Tink et al. | 340/172.5 |
| 3,417,374 | 12/1968 | Pariser | 340/172.5 |
| 3,500,333 | 2/1970 | Couleur et al. | 340/172.5 |
| 3,473,150 | 10/1069 | McClelland | 340/146.1 X |
| 3,327,288 | 6/1967 | Webber | 340/146.1 |
| 3,381,272 | 4/1968 | Pasini | 340/146.1 |
| 3,426,323 | 2/1969 | Shimabukuro | 340/146.1 |

*Primary Examiner*—Charles E. Atkinson

*Attorney*—Fowler, Knobbe and Martens

[57] ABSTRACT

Apparatus and method for transmitting data on a time-shared basis between a plurality of low-speed sources and a high-speed source over a communication circuit. Byte-serial data is initially transmitted at a relatively low rate from a plurality of remote sources (terminals) to a nearby peripheral computer which temporarily stores the incoming data in a memory unit and arranges it into strings of data blocks. The stored data is later transmitted as messages of one or more data blocks at a much faster rate over a communication circuit to a central computer. These data blocks may be either text blocks containing the temporarily stored data or control blocks containing information regarding the status of remote terminals. In addition, each message contains an acknowledge block whose purpose is to facilitate the detection and correction of data transmission errors. The central computer checks all incoming blocks for errors and acknowledges only those that have been correctly received. Blocks received in error by the central computer are not acknowledged, and are retransmitted by the peripheral computer until they are correctly received. Conversely, messages consisting of acknowledge, text, and control blocks are transmitted from the central computer to the peripheral computer over the communication circuit at high speed, the data is temporarily stored in the peripheral computer's memory and is later transmitted to the correct remote destination (terminal) at low speed. Error detection and correction performed on these messages is similar to those performed on messages traveling in the opposite direction.

8 Claims, 33 Drawing Figures

INVENTOR
MICHAEL D. BUSCH
BY
FOWLER, KNOBBE
& MARTENS
ATTORNEYS.

INVENTOR
MICHAEL D. BUSCH

BY
FOWLER, KNOBBE & MARTENS
ATTORNEYS.

INVENTOR
MICHAEL D. BUSCH

BY
FOWLER, KNOBBE
& MARTENS
ATTORNEYS.

INVENTOR
MICHAEL D. BUSCH
BY
FOWLER, KNOBBE & MARTENS
ATTORNEYS.

INVENTOR
MICHAEL D. BUSCH
BY
FOWLER, KNOBBE & MARTENS
ATTORNEYS.

INVENTOR
MICHAEL D. BUSCH

BY
FOWLER, KNOBBE
& MARTENS
ATTORNEYS.

Patented July 11, 1972 3,676,846

20 Sheets-Sheet 7

INVENTOR
MICHAEL D. BUSCH

BY
FOWLER, KNOBBE
& MARTENS
ATTORNEYS.

INVENTOR
MICHAEL D. BUSCH
BY
FOWLER, KNOBBE
& MARTENS
ATTORNEYS.

INVENTOR
MICHAEL D. BUSCH

BY
FOWLER, KNOBBE & MARTENS
ATTORNEYS.

INVENTOR.
MICHAEL D. BUSCH

BY
FOWLER, KNOBBE
& MARTENS
ATTORNEYS.

INVENTOR
MICHAEL D. BUSCH

BY
FOWLER, KNOBBE & MARTENS
ATTORNEYS.

INVENTOR.
MICHAEL D. BUSCH

BY
FOWLER, KNOBBE & MARTENS
ATTORNEYS.

INVENTOR
MICHAEL D. BUSCH
BY
FOWLER, KNOBBE & MARTENS
ATTORNEYS.

INVENTOR
MICHAEL D. BUSCH

BY
FOWLER, KNOBBE & MARTENS
ATTORNEYS.

INVENTOR
MICHAEL D. BUSCH
BY
FOWLER, KNOBBE & MARTENS
ATTORNEYS.

INVENTOR
MICHAEL D. BUSCH
BY
FOWLER, KNOBBE & MARTENS
ATTORNEYS.

INVENTOR
MICHAEL D. BUSCH
BY
FOWLER, KNOBBE & MARTENS
ATTORNEYS.

INVENTOR.
MICHAEL D. BUSCH

BY
FOWLER, KNOBBE & MARTENS
ATTORNEYS.

INVENTOR
MICHAEL D. BUSCH

BY
FOWLER, KNOBBE & MARTENS
ATTORNEYS.

INVENTOR
MICHAEL D. BUSCH
BY
FOWLER, KNOBBE & MARTENS
ATTORNEYS.

MESSAGE BUFFERING COMMUNICATION SYSTEM

This is a division of application Ser. No. 766,384, filed Oct. 9, 1968 and now U.S. Pat. No. 3,560,936 issued Feb. 2, 1971.

BACKGROUND OF THE INVENTION

1. Field of the Invention

The present invention relates to a system and a method for transmitting data between several low-speed sources an a central high-speed source. The invention relates more particularly to digital data communication systems in which a plurality of sources such as Teletype terminals capable of receiving and transmitting byte-serial digital data (herein after referred to as "terminals") are connected by communication circuits to a central computer capable of receiving and transmitting byte-serial digital data from and to a plurality of terminals simultaneously.

2. Description of the Prior Art

In one prior digital data communication system, each terminal is connected to a central data processing system, i.e., a computer, by means of a separate parallel communication circuit, i.e., a telephone line. However, in digital data communication systems in which the cost of communication circuits is high (i.e., a system in which the terminals are scattered throughout a large geographic area), it is often advantageous to interpose between the terminals and the central data processing system one or more devices capable of concentrating the input and output data streams of a plurality of terminals onto a single communication circuit in such a way that the identity of each data stream (i.e., the terminal of origin or destination) is preserved. Two types of such concentrators are well known.

A frequency-division concentrator preserves the identity of data streams coming from a plurality of terminals by providing a discrete and separable subcarrier for each terminal. Each subcarrier is usually of a different frequency and is modulated by the data stream from the associated terminal. A frequency-division concentrator preserves the identity of data streams going to a plurality of terminals by isolating each discrete and separable subcarrier signal (e.g., with a band-pass filter), demodulating it and directing the resultant data stream to the terminal associated with that subcarrier.

A time-division concentrator transmits and receives over its communication circuit a cyclic synchronous digital data stream, each cycle of which consists of a data byte associated with each attached terminal taken in turn together with synchronization information which defines the beginning of each cycle. Each terminal is assigned a discrete time interval within this cycle. A time-division concentrator preserves the identity of data streams coming from a plurality of terminals by temporarily storing (buffering) a data byte from each terminal and retransmitting that byte over the communication circuit during the next discrete time interval assigned to that terminal. A time-division concentrator preserves the identity of data streams going to a plurality of terminals by buffering a data byte for each terminal, that byte being obtained from the communication circuit during the discrete time interval assigned to that terminal, and retransmitting that data byte to the terminal.

Frequency-division concentrators and time-division concentrators share a number of fundamental deficiencies. The first of these is due to the fact that in most digital data communication systems each terminal is actually transmitting and receiving data during only a small portion of the time; it is idle during the rest of the time. Concentrators of the prior art cannot take advantage of the low duty cycle of terminals, i.e., the small amount of time during which the terminals are active, because such concentrators create a fixed partitioning of the communication circuit. That is, they necessarily assign a discrete interval of time (or bandwidth) to each terminal regardless of whether that terminal is active or idle, which is, of course, undesirable.

Secondly, concentrators generally prove most advantageous in digital data communication systems which involve long-distance and high speed data transmission. But errors and loss of information are particularly likely to occur over long distances and at high transmission rates. Yet, existing concentrators are primarily directed toward detecting errors rather than correcting them.

Finally, it is frequently necessary for digital data communication systems to include several different types of terminals. The central data processing system may be complicated significantly by the requirement that it be able to communicate with terminals which are made by different manufacturers, and which have different character codes and data transmission rates. Existing concentrators are incapable of performing sufficient speed conversion, character translation, etc. to render the differences between terminal types "invisible" to the central data processing system.

SUMMARY OF THE INVENTION

An exemplary data communication system constructed in accordance with the invention and disclosed in detail herein includes a plurality of data terminals, a peripheral computer which is usually located relatively near the terminals and a central computer which is usually considerably farther from them. Each of the terminals produces an intermittent stream of digital data which are transmitted to the peripheral computer asynchronously and concurrently over a plurality of low speed communication channels which extend between the respective ones of the terminals and the peripheral computer. In accordance with a principal feature of the invention, means are provided within the peripheral computer for assembling all of the data streams into a continuous data string while preserving the identity of each of them. This data string is then synchronously transmitted to the central computer over a single high speed communication channel extending between the two computers.

An important advantage of the system incorporating the above feature of the invention is that the high speed communication channel is utilized much more effectively and efficiently than in the prior art because only so much time is devoted to the transmission of data from a given terminal as that data actually requires. Thus, the system is able to take advantage of the low duty cycle characteristic of most terminals.

In carrying out this feature of the invention, a novel and highly effective means is provided in the peripheral compute for assembling all of the data streams into a continuous data string. Its principal component is a memory, typically of the magnetic core type, having a plurality of individually addressable memory segments. All of the data streams are concurrently stored in the memory, with each data stream being stored in a different group of memory segments with each group including at lest one memory segment. As each group of memory segments receives a data string comprising one complete message from a given terminal, that group of memory segments is effectively interlinked with other groups of memory segments which have been similarly filled. In this way, a continuous string of data held in a series of interlinked memory segments is built up.

A particularly effective means of transmitting the data string assembled in the memory of the peripheral computer in such a way as to correct any errors that might occur during transmission forms yet another important feature of the invention. In order to appreciate the advantages of this technique, present error correction techniques for high speed transmission of data will be described briefly first. For sake of simplicity, unidirectional transmission will be assumed in which one computer (the transmitting computer) transmits blocks of data to another computer (the receiving computer). In practice, of course, data transmission is usually bidirectional.

In the conventional method of transmitting data blocks arranged in an output string, the transmitting computer waits after transmitting each block for an acknowledgement of the correct receipt of that block from the receiving computer. For each block received, the receiving computer transmits either a positive acknowledgment, if the block was received correctly, or a negative acknowledgement, if the block was received in error. The transmitting computer responds to a positive acknowledgment by deleting from the output string the block which was just transmitted and then transmitting the next block in the output string. It responds to a negative acknowledgement by retransmitting the block which was just transmitted.

The method just described has two basic disadvantages. First, it is inefficient. When the transmitting computer has finished transmitting a block, it cannot immediately transmit the next block in its output string. It must wait for an acknowledgment from the receiving computer before it can proceed. If the two computers communicate by means of a full-duplex circuit (as they do in the system disclosed herein), the half of the circuit carrying data from the transmitting computer to the receiving computer is wasted during the time that the transmitting computer is waiting for an acknowledgement.

Secondly, the method is not completely reliable. It would be reliable only if acknowledgments from the receiving computer could be sent to the transmitting computer without error. Let it be assumed, for example, that the transmitting computer has transmitted a block and has received an acknowledgment which was garbled in transmission so that it is impossible for it to determine whether the acknowledgment was positive or negative. In such a case, the transmitting computer has no alternative but to "guess" whether the previously transmitted block was received correctly or not. If this "guess" is wrong, the receiving computer will either miss the block altogether or will receive it in duplicate.

The problems inherent in this conventional prior art method of data transmission are solved by the present invention. Thus, in accordance with the invention, the transmitting compute transmits a series of blocks one right after the other without waiting for an acknowledgment after each block. Each block is transmitted with a unique block number and each block that has been received correctly by the central computer is acknowledged by specific block number and not just as "the previously transmitted block," such acknowledgments therefore being time-independent. Moreover, means are also provided in the receiving computer for rejecting any data block whose block number is the same as that of one which it had acknowledged previously. Consequently, the transmitting computer can and always will safely retransmit any block when it is in doubt as to whether it was received correctly (e.g., when an acknowledgment is received in error or when no acknowledgment is received at all).

More particularly, assuming for sake of simplicity unidirection transmission of a string of data blocks from a transmitting computer to a receiving computer, a series of data blocks is first accumulated in the memory of the transmitting computer, preferably, but no necessarily, in accordance with the previously explained feature of the invention. Data blocks are then successively transmitted from the series to the receiving computer and, as part of each data block, there is transmitted a unique block number. Each data block present in the memory of the transmitting computer is periodically retransmitted along with its block number until the data block is purged therefrom. Each of the transmitted data blocks is checked at the receiving computer and is stored only if its block number bears a predetermined relationship to the immediately preceding block number.

An acknowledgment number is periodically transmitted from the receiving computer to the transmitting computer corresponding to the block number of each data block which has been stored by the receiving computer. Intermittently, the series of data blocks in the memory of the transmitting computer is purged of all data blocks up to and including the one corresponding to the last acknowledgment number received from the receiving computer. In this way, each data block is transmitted by the transmitting computer until it receives positive acknowledgment that the data block has been correctly received by the receiving computer.

REFERENCES

Figure 1:
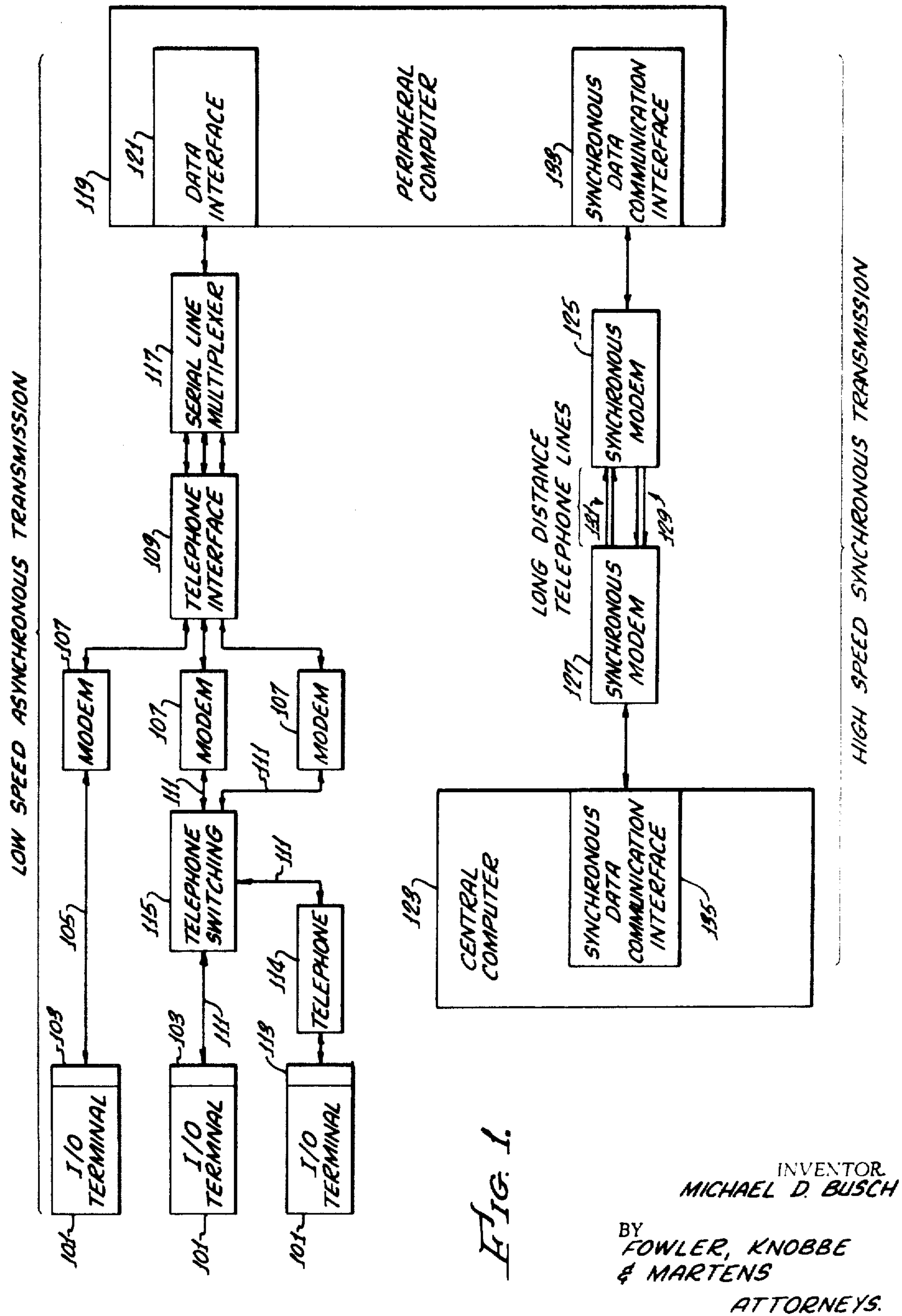
FIG. 1 is a general block diagram of a data communication time sharing system suitable for practicing the present invention.

The following documents should be consulted for additional information concerning currently known and commercially available elements of the disclosed embodiment of the invention;

1. *Small Computer Handbook* (1967–1968), published by Digital Equipment Corporation, Maynard, Massachusetts.
2. *The PDP–8 Users Handbook*, published by Digital Equipment Corporation, Maynard, Massachusetts.
3. *PDP–8* Maintenance Manual, published by Digital Equipment Corporation, Maynard, Massachusetts.
4. *Datasets 201A and 201B Interface Specifications Bulletin*, published by American Telephone and Telegraph Company, New York, New York.
5. *Dec Communications Equipment*, published by Digital Equipment Corporation, Maynard, Massachusetts.
6. *Data Communication System 680 Instruction Manual* (DEC–08BY17CA–D), published by Digital Equipment Corporation, Maynard, Massachusetts.
7. *The 689/ADF Bulletin*, published by Digital Equipment Corporation, Maynard, Massachusetts.
8. *Data Communication Channel DP01A Instruction Manual for Use with PDP–8*, published by Digital Equipment Corporation, Maynard, Massachusetts.
9. *PAL III Symbolic Assembler Programming Manual*, (8–3–S), published by Digital Equipment Corporation, Maynard, Massachusetts.
10. *Digital 8–3–S Assembly Program*, available from Digital Equipment Corporation, Maynard, Massachusetts.

DEFINITION OF TERMS bit—A quantity of data, consisting of one binary digit (0 or 1).

byte—A quantity of data, consisting of a predetermined number of bits (e.g., in the present invention, 8-bits); usually the quantity of data needed to encode a single character.

byte serial—A method of data transmission, one byte at a time.

byte parity—The number of one-bits in a byte modulo two (i.e., the oddness or evenness). For the purposes of error detection, an additional "parity bit" is frequently included in each byte and is set to 0 or 1 in order to maintain a predetermined byte parity (e.g., in the present invention, even byte-parity).

microencoded—A method of transmitting byte-serial data, in which each bit position of a byte has a different assigned meaning.

block—A quantity of data, consisting of a plurality of bytes.

character—A letter, number, or mark in binary code.

longitudinal checksum—The sum of the bytes in a block, where each byte is taken as a binary number, and overflows are ignored in summing. For the purposes of error detection, an additional "longitudinal checksum character" (lcc) is frequently included in each block and is given a value which maintains a predetermined longitudinal checksum (e.g., in the present invention, zero modulo 128).

baud—A measure of data transmission speed, consisting of one bit per second.

mark—A signal on a communications circuit corresponding to a 0-bit.

full-duplex—A method of data transmission, in which independent streams of data are transmitted in both directions simultaneously.

synchronous—A method of transmitting byte-serial data, in which the time interval between successive bytes is fixed.

asynchronous—A method of transmitting byte-serial data, in which the time interval between successive bytes is random.

moden—A bidirectional transducer between d.c. digital signals and a signal capable of transmission over a voice-grade telephone circuit (e.g., frequency-modulated or phase modulated audio tones).

segment—A quantity of memory space, consisting of a predetermined number of memory words (e.g., in the present invention, sixteen), one of which is a link (which see).

link—In a segment, a word (e.g., in the present invention, the first word of the segment) which contains the memory address of another memory segment.

linking word—The address in a link.

SYN—A ASCII character used for establishing synchronism in synchronous data transmission.

SOH—An ASCII character which denotes start of header.

STX—An ASCII character which denotes start of text.

ETX—An ASCII character which denotes end of text.

ACK—An ASCII character which denotes an acknowledgment.

ETB—An ASCII character which denotes an end of message.

message—A unit of data transmission, consisting of one or a plurality of blocks.

output string—The blocks which are temporarily stored in the memory of one computer pending their successful transmission to another computer.

ones complement—The ones complement of a binary number is obtained by subtracting that number from a binary number consisting entirely of "1" bits.

two's complement—The two's complement of a binary number is obtained by subtracting that number from a binary number consisting entirely of "0" bits. The sum of a number and its two's complement is 0.

End of Text Sentinel—A byte having a simple configuration, such as all zeroes, denoting the end of a message.

DESCRIPTION OF THE PREFERRED EMBODIMENT

1. Description of a Suitable Data Transmission System a. General Description of the System

Referring now to FIG. 1 there is shown a time sharing computer system suitable for practicing the present invention. Data originates at a plurality of remote teleprinter terminals 101, only three of which are shown. Typically the terminals comprise a keyboard unit and a display or printing unit. The first terminal 101 is connected to a conventional modem 103 which converts the digital signals from the terminal 101 to frequency-shift-keyed audio tones which can be transmitted over a dedicated voice-grade telephone line 105 and converted by another modem 107 to digital signals and coupled as input to a telephone interface 109. The telephone interface 109 will transmit data serially to the first terminal 101 through modem 107, telephone line 105 and modem 103. A suitable modem 103 for use in conjunction with the terminal 101 is the A. T. & T. 101C Dataset. A suitable modem 107 is the A. T. & T. 103A Dataset.

The second terminal 101 is also connected to a modem 103. The audio tones generated by the modem 103 are transmitted over a dial-up telephone circuit including telephone lines 111 and telephone switching equipment 115 before passing through a modem 107 to the telephone interface 109.

The third terminal 101 is connected to the telephone interface 109 in a fashion similar to the coupling used for the second terminal 101 except that a telephone acoustical coupler 113 and a conventional telephone instrument 114 are used in the place of a modem 103. A suitable acoustical coupler 113 is the Anderson-Jacobson Modem 260 originating acoustical coupler.

Digital data is transmitted between the terminals 101 and the telephone interface 109 asynchronously, typically at a rate of 60 to 150 baud. The telephone interface 109 includes means for detecting a change in the carrier signal between the modems 103 and 107 and means for connecting and disconnecting the remote terminal 101 (i.e., "pick up the phone" and "hang up the phone"). One suitable telephone interface 109 is the Digital Equipment Corporation Model 689 additional data phone features unit.

A serial line multiplexer 117 is coupled to the telephone interface 109 and provides a means for coupling any one of the dataline inputs from the telephone interface 109 to a peripheral computer 119 through a data interface 121. A suitable data interface 121 is the Digital Equipment Corporation Data Line Interface Type 681. A suitable serial line multiplexer 117 is the Digital Equipment Corporation Model 685. The multiplexer 117 includes a line selection register (LSR) which specifies the particular input circuit from the telephone interface 109 to be connected to the data interface 121. The LSR is a 7-bit register whose 6 low order bits select one of 64 input circuits and whose 7th high order bit may be used to select one of an additional 64 input circuits of a second multiplexer 117 is provided in the system. The peripheral computer 119 includes instructions and logic for loading a number into the LSR so that random access to any input circuit from the telephone interface 109 is possible. The peripheral computer 119 also includes means for clearing and incrementing the LSR providing the capability for high speed sequential scanning of the input lines from the telephone interface 109.

The serial line multiplexer 117 includes one or more clocks which interrupt the computer 119 periodically to permit the computer 119 to sample incoming data from the telephone interface 109 and to transmit outgoing data to the telephone interface 109 at the proper bit rate.

The computer 119 will sample each input line at the proper time under the control of the clocks in the multiplexer 117 and assemble these sampled data bits into bytes. These data bytes are then assembled into data blocks within the computer 119 for later transmission to a central computer 123.

Advantageously, the peripheral computer 119 and the central computer 123 may be small scale general purpose digital computers such as the Digital Equipment Corporation PDP–8 which is a 1-address, fixed word length, parallel computer using 12 bit, two's complement arithmetic and having a random-address magnetic core memory providing storage for 4,096 words. The memory cycle time for this computer is 1.5 microseconds. This computer also features indirect addressing and means for instruction skipping and program interruption as a function of the condition of the input/output devices associated with the computer.

The computer 119 transmits and receives data bytes from the central computer 123 over a communications circuit which includes a pair of high speed synchronous modems 125 and 127 and a dedicated bidirectional communications circuit 129 and 131. The modems 125 and 127 may be any of the commercially available units of which the American Telephone and Telegraph Company 201B Dataset is an example. The communications circuit must be capable of continuous full-duplex transmission and may be a so called 4-wire telephone circuit consisting of two independent unidirectional pairs 129 and 131 faced in opposite directions. Advantageously, the synchronous modems 125 and 127 have a transmission rate in the order of 2,400 baud.

The peripheral computer 119 includes a synchronous data communications interface 133 which provides a means for synchronizing data communication with the modem 125. The synchronous interface 133 includes a first transmit register which receives a data byte or character in parallel from the computer 119 when a transmit instruction is performed. The data byte is then shifted in parallel into a second transmit register. The second transmit register is then shifted so that the bits in the byte are transmitted serially to the modem 125. The synchronous interface 133 however will not begin transmission until the computer 119 inserts a particular character, a synchronization character, into the first transmit register.

The computer 119 receives data bits serially from the modem 125. These bits are shifted into a first receiver register in the synchronous interface 133. Once a complete data byte or character has been assembled in the first receive register the byte is shifted in parallel into a second receive register releasing the first receive register to receive a subsequent byte from the modem 125.

The synchronous interface 133 continuously decodes the bytes appearing in the first register and will prevent the parallel shift of characters from the first receive register to the second receive register until a particular character, a synchronization character, is decoded in the first receive register. All subsequent characters from the modem 125 received in the first receive register will be shifted to the second receive register. Each time the synchronous interface 133 shifts a byte into the second receive register it will send an indication to the computer 119 that a data byte is available for it to process.

The central computer 123 receives and transmits data to the synchronous modem 127 through a synchronous data communication interface 135 in the same manner as that described above.

A suitable device for use as the synchronous data communication interface 133 and 135 is the Digital Equipment Corporation Data Communication Channel DP01A.

b. Detailed Description of the System

1. The Peripheral Computer

Figure 2:
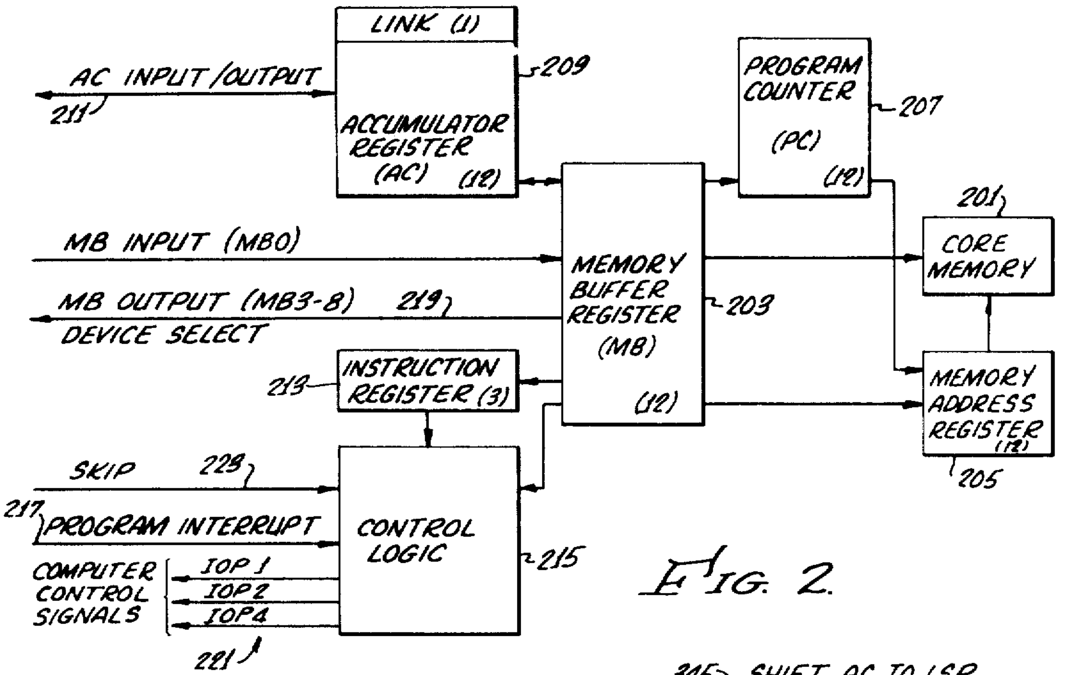
FIG. 2 is a block diagram of the peripheral computer seen in FIG. 1.

In FIG. 2 there is shown a simplified block diagram of the peripheral computer 119. A core memory 201 provides program and data storage and has a capacity to store 4,096, 12-bit words. All words to be entered into or red from the memory 201 must pass through a 12-bit memory buffer register 203 (MB). A 12-bit memory address register 205 selects the particular word location or address in the memory 201 which is to be written into or read from by the memory buffer register 203. The memory address register 205 allows random access to any particular location in the core memory 201. The word location which is to be accessed in the memory 201 may be set into the memory address register 205 from a 12-bit program counter 207 (PC) or the memory buffer register 203.

The arithmetic and logical operations of the computer 119 are performed in a 12 bit accumulator register 209 (AC). A 13th bit or a link bit is provided in the accumulator register 209 for overflow indications during arithmetic computation. The contents of the accumulator register 209 may be rotated with the link bit right or left, under the control of the program in the memory 201. The contents of the accumulator register 209 may be added to the contents of the memory buffer register 203 with the sum being placed in accumulator register 209. Similarly the contents of the accumulator register 209 and the memory buffer register 203 may be logically ANDed under program control with the result being placed in accumulator register 209. Data bits may be entered into or read from the accumulator register 209 in parallel on a line 211 which represents a plurality of input/output lines, one corresponding to each stage in the accumulator register 209.

To execute an instruction in the program the location of that instruction is set into the memory address register 205 from the program counter 207. The contents of the memory location defined by the memory address register 205 is read into the memory buffer register 203. A portion of the word (i.e., the instruction) in the memory buffer register 203 corresponding to the operation code of the instruction (MBO–2) is then shifted into a 3-bit instruction register 213. The operation code contained in the instruction register 213 is decoded by logic in a control logic means 215.

The control logic means 215 controls the logical operation of the computer 119 by generating control signals to the logical elements in the computer 119 to control the sequencing of a particular logical function. The interconnections between the control logic 215 and the other elements of the computer 119 are not shown for the sake of simplicity. When an instruction has been completely performed the control logic 215 will increment the program counter 207 and will cause that new instruction address to be shifted into the memory address register 205. The process is then repeated again.

Particular instructions which may be performed by the computer 119 require that the control logic 215 make a decision dependent upon certain conditions present in the computer 119. If the particular condition in the computer 119, such as a negative number in the accumulator register 209, is detected, the control logic 215 will cause the program counter 207 to be incremented to skip the next sequential instruction. The computer 119 may also execute an instruction which will cause a parallel transfer of bits from the memory buffer register into the program counter 207 to cause the computer 119 to jump to a new section of the program to continue computation.

All data transfers between the core memory 201 and the various registers in the computer 119 pass through the memory buffer register 203. Data may be transferred into the memory buffer register 203 from the memory address register 205 or the accumulator register 209.

During the execution of certain instructions the control logic 215 will cause particular bits in the memory buffer register 203 (MB3–8) to be read out in parallel on a plurality of lines represented by line 219. These lines may be connected to a plurality of input/output devices and used as a code for selecting a particular device to interact with the computer 119.

The control logic 215 includes enable interrupt logic when may be enabled or disabled by the execution of particular instructions by the computer 119. When the interrupt logic is enabled, the normal operation of the computer 119 may be interrupted by a program interrupt signal on line 217 to the control logic 215. A program interrupt signal may be generated by any one of the input/output devices associated with the computer 119. All the input/output devices have their program interrupt signals bussed together and connected to line 217. When a program interrupt signal occurs on line 217 the control logic 215 will allow the computer 119 to complete the particular instruction that it is executing and will then cause the location of the next instruction which was to be performed to be shifted from the program counter 207 into a particular memory location, location 0000 for example, in the core memory 201. The control logic 215 will then cause the computer 119 to execute the instruction found in a particular memory location, location 0001 for example. The instruction found in this latter location will usually be an instruction which will cause the computer 119 to jump to a routine that will cause the computer 119 to interrogate the status of the various input/output devices and to take whatever action is necessitated by the condition which caused the program interrupt signal to be generated.

To interrogate the status of various conditions in the input/output devices the computer 119 will perform certain instructions as determined by the program in the core memory 201. For example, to check the status of a particular condition in a particular input/output device, an instruction will be shifted from a core memory 201 into the memory buffer register 203. This instruction when decoded by control logic 215 will result in the device select bits (MB3–8) in the memory buffer register 203 being applied in parallel on the lines represented by line 219 to the input/output devices. Each input/output device has a device select decoder which generates an indication to the input/output device that it has been selected to be interrogated. At the same time that the device select code is being read out from the memory buffer register 203, control signals (IOP1, IOP2, IOP4) will be generated by the control logic 215 on a plurality of lines 221. The signals on the lines 221 are connected to the input/output devices and when decoded in conjunction with the device select code on line 219 will cause a particular condition in that input/output device to be interrogated.

There are, in general, two types of conditions in the input/output devices which will cause program interrupts. If a particular condition of the first type in an input/output device is interrogated and it is found that it was not the condition which generated the program interrupt a skip signal will be returned to the control logic 215 on line 223. The control logic 215 detects the skip signal and will cause the program counter 207 to skip the next sequential instruction and perform the following one. If, however, the condition is interrogated and it is found that it was the condition that caused the program interrupt a skip signal will not appear on line 223 from that device. The control logic 215 will cause the program counter 207 to be incremented, as it normally would, resulting in the computer 119 performing the next sequential instruction. Typically that instruction will cause the computer 119 to jump to a routine which will take the appropriate action necessitated by the particular condition. When a condition of the second type is interrogated the opposite result occurs. That is, a skip signal will be generated if the interrogated condition did cause the program interrupt and will not be generated if it did not.

The signals on lines 221 (IOP1, IOP2, IOP4) are generated by the control logic 215 as a function of the state of particular bit positions (MB9–11) of certain types of instruction once the instruction has been read into the memory buffer register 203. These signals do not occur simultaneously but instead will be spaced apart by approximately 1 microsecond. The signals on lines 221 and the device select code on lines 219 may be gated together in the input/output device to generate control logic signals for elements within the device.

2. The Serial Line Multiplexer

Figure 3:
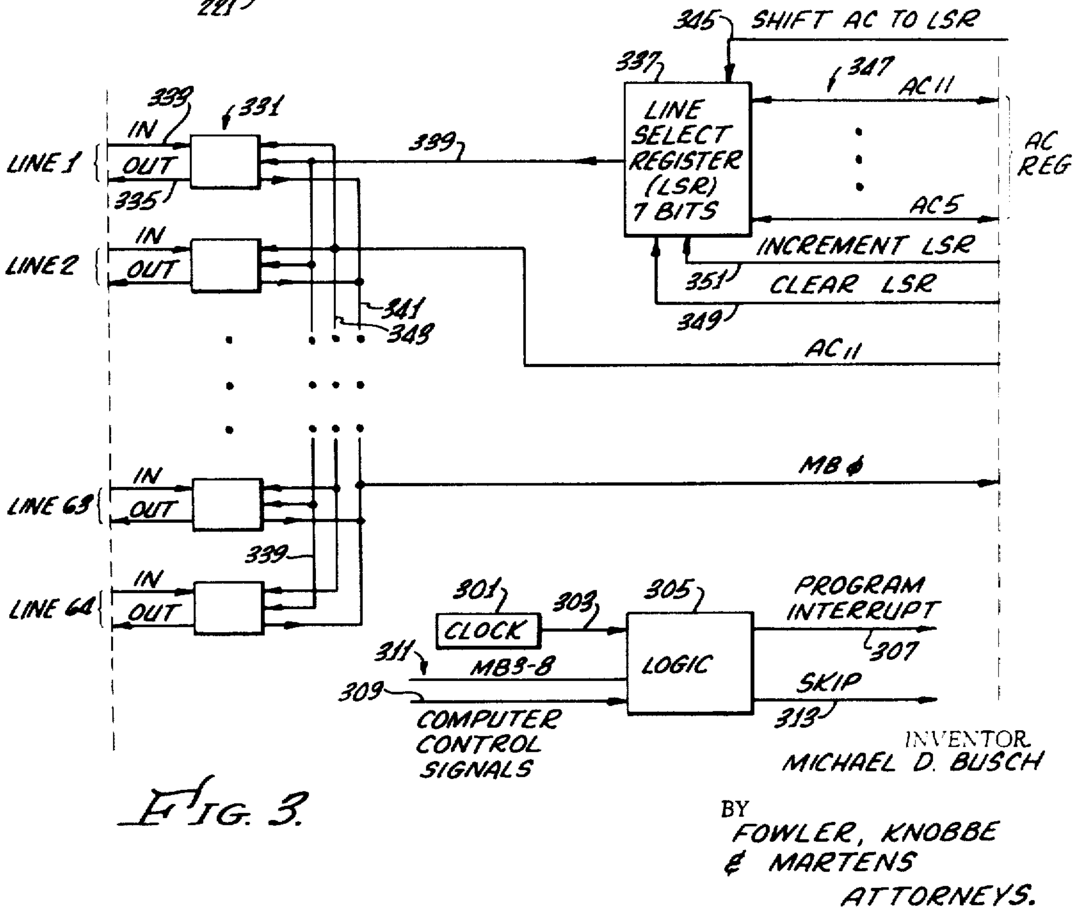
FIG. 3 is a block diagram of the serial line multiplexer seen in FIG. 1.

In FIG. 3 there is shown a schematic block diagram of the serial line multiplexer 117 seen in FIG. 1. The multiplexer 117 includes one or more clocks only one of which, clock 301, is shown in the figure. The clock 301 has a periodic output on line 303 to a logic means 305. Each time a clock pulse appears on line 303 a clock flag flip flop (not shown) will be set which will cause a clock program interrupt pulse to appear on line 307 if the clock interrupt signal has been previously enabled. The clock program interrupt is enabled when a certain instruction is executed by the computer 119. When this instruction is executed a device select code will appear on line 311 and a signal will appear on line 309. The line 309 represents the IOP signals appearing on lines 221 in FIG. 2. These signals will set a clock enable flip flop (not shown). The clock enable flip flop when set enables logic which will cause the clock flag flip flop to set when a clock pulse occurs.

The program interrupt signal on line 307 is an input to the control logic 215 on the program interrupt line 217. The program interrupt signal will cause the computer 119 to initiate an interrupt routine to interrogate all the possible conditions which could generate a program interrupt signal. During the execution of this interrupt interrogation routine, a certain instruction will be executed which will interrogate the logic 305 to determine if the clock 301 was the device which had resulted in the program interrupt signal. To interrogate the clock 301 the computer 119 will execute a particular instruction which will select the logic 305 by an appropriate signal on line 311. At the same time a second signal will appear on line 309 to interrogate the status of the clock flag flip flop to determine whether or not the clock 301 had generated the program interrupt pulse. If the clock 301 was not the source of the interrupt signal a skip signal on line 31 from logic 305 will cause the computer 119 to skip the next instruction and execute the following one as previously described. If, however, the clock 301 was the source of the program interrupt the skip signal on line 31 will not occur and the computer 119 will sequence to the next instruction which will result in the computer jumping to a sub-routine to service the input and output lines to the terminals 101.

The multiplexer 117, shown in FIG. 3, provides a means for the computer 119 to communicate data bits to or from up to 64 data terminals 101. A data conversion module, such as module 331, is associated with each data terminal 101. Data bits generated by a data terminal 101 are connected to the conversion modules 331 on an input line such as line 333. Data bits being transmitted out to the data terminals 101 from the multiplexer 117 appear on an output line such as line 335.

A 7-bit line select register 337 (LSR) provides a means for the computer 119 to select a particular data conversion module 331. Once a data conversion module 331 has been selected, the computer 119 may receive/transmit data to its associated terminal 101. The bits in the LSR 337 are coupled in parallel to each of the data conversion modules 331 by lines represented by line 339. Each data conversion module 331 decodes the bits contained in the LSR 337. If the LSR 337 selects a particular data conversion module 331, data bits may be transferred either in or out through that module. A data bit input to a selected data conversion module 331 will be coupled to an input bus 341. The data bit appearing on the bus 341 is coupled as an input to the most significant bit (MB0) in the memory buffer register 203 in the computer 119. The memory buffer register 203 will accept this data bit input only when the computer 119 is executing a Teletype Input instruction.

A data bit to be transmitted to a terminal 101 is contained in the least significant bit position (AC11) of the accumulator register 209. When the computer 119 executes a Teletype Out instruction, the AC11 bit is coupled to a bus 343 which is connected to each of the data conversion modules 331. The bit on the bus 343 will be coupled to the appropriate output line 335 through the data conversion module 331 which has been selected by the LSR 337.

The computer 119 may randomly address a particular terminal 101 by executing a Load Line Select Register instruction. This instruction will cause the computer 119 to generate a signal on line 345 to the LSR 337. When the signal appears on line 345 the 7 bits from the accumulator register 209 appearing on lines 347 will be shifted into the LSR 337. The computer 119 may then execute a Teletype In or a Teletype Out instruction to communicate with the desired terminal 101.

The computer 119 may perform a high speed scan of the input lines to the multiplexer 117 by initially executing a Clear Line Select Register instruction and then performing a series of Teletype In (TTI) or Teletype Out (TTO) instructions for a number of times corresponding to the number of terminals 101 to be communicated with. When the Clear Line Select Register instruction is performed a signal will appear on line 349 to clear the LSR 337. The LSR 337 will be incremented by a signal on line 351 each time a Teletype In or Teletype Out instruction is executed. (Of course, between each TTI/TTO instruction the contents of the accumulator register 209/memory buffer register 203 should be changed to the character being communicated to/from the particular terminal 101).

The contents of the LSR 337 may be shifted into the computer 119 by the execution of a Read Line Select Register instruction. When this instruction is executed the bits contained in the LSR 337 are read into the accumulator register 209 on lines 347. This feature allows the computer 119 to segment the high speed scan of the terminals 101 into groups. For example, the computer 119 could clear the LSR 337 and sequentially scan the first 8 terminals by incrementing the LSR 337 8 times and performing 8 TTI or TTO instructions. The computer 119 would then read the contents of the LSR 337 into the accumulator register 209 and subsequently store that value into a particular memory location. At a later time this value could be retrieved from that memory location and reinserted into the LSR 337 by the execution of a Load Line Select Register instruction. The computer 119 would thereafter increment the LSR 337 and execute TTI or TTO instructions for a second group of terminals 101.

A data word transmitted from a terminal 101 to the serial line multiplexer 117 typically includes an 11 bit unit code. The first bit is a start bit which is followed by eight character bits and two stop bits. The data word will have a duration of 100 milliseconds for a terminal 101 transmission rate of 110 baud.

To prevent any deterioration in the bit pulse shape, due for example to transmission line impedance, from causing a device receiving such a data word asynchronously to read a one bit as a zero, the receiving device must determine the bit sampling time accurately so that the bits in the data word are sampled approximately in the center.

The clock 301 in the multiplexer 117 provides the means for determining the correct bit sampling time. Advantageously, the clock 301 has a frequency 8 times the bit transmission rate of the terminals 101. Accordingly, when the clock 301 causes the computer 119 to sample an input line the computer 119 will be able to determine within one-eighth of a bit time when the start bit first appears as an input. Thereafter, the computer 119 can sample the approximate center of each character bit by sampling the input line every 8 clock pulses.

If the baud rate of the terminals 101 were different, the output frequency of the clock 301 would be changed accordingly. If the terminals 101 had different baud rates, more clocks could be used, one corresponding to each different baud rate.

3. The Telephone Interface

Figure 4:
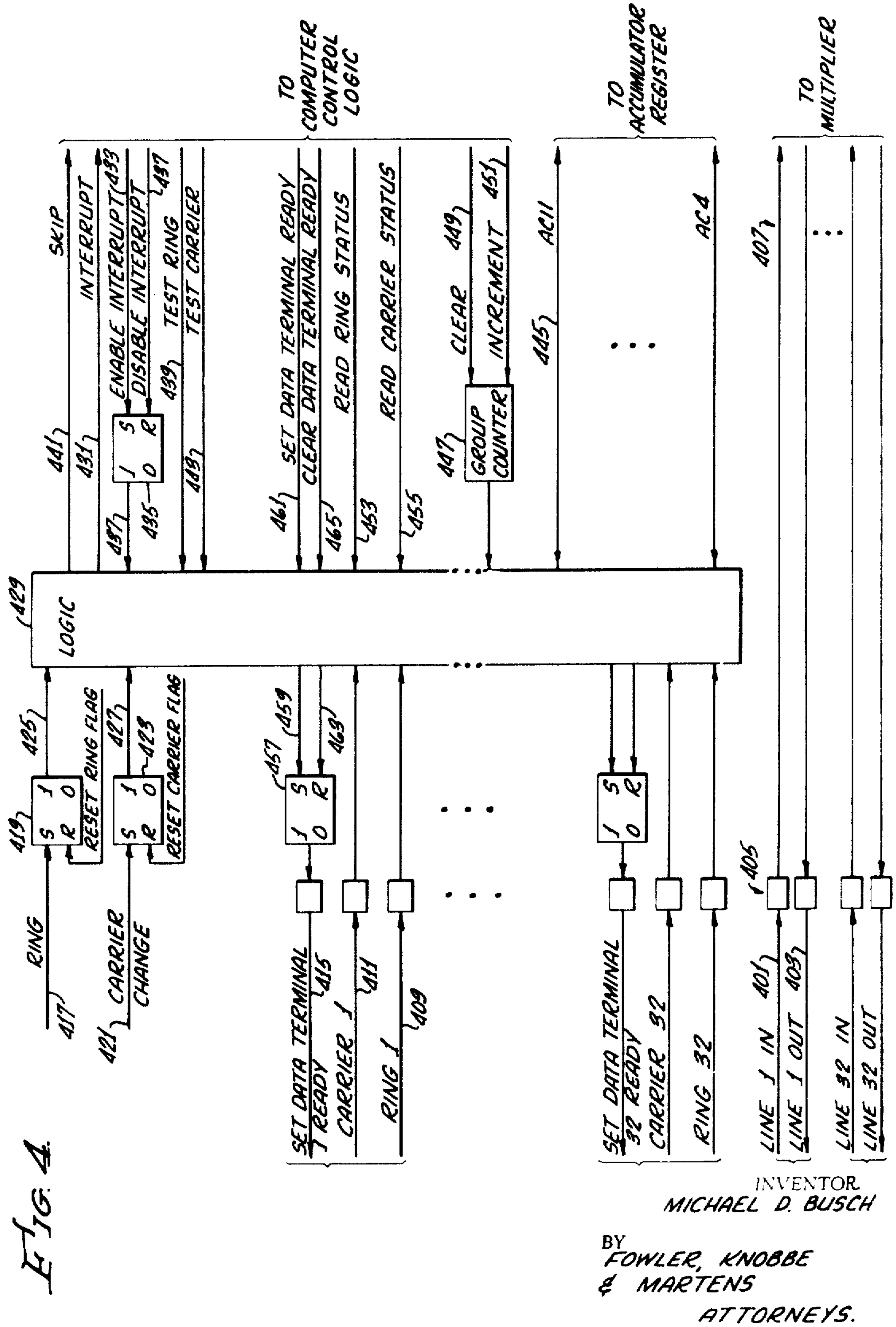
FIG. 4 is a schematic block diagram of the telephone interface seen in FIG. 1.

Referring now to FIG. 4, there is shown a schematic block diagram of the telephone interface 109 seen in FIG. 1.

The telephone interface 109 includes means for coupling the data bits to be communicated between the modems 107 and the serial line multiplexer 117. Each modem 107 has an input line and an output line such as lines 401 and 403 coupled to a signal conditioning means 405 in the telephone interface 109. The signal conditioning means 405 are connected to the data conversion modules 331, seen in FIG. 3, by lines 407.

Data communication between the terminals 101 and the computer 119 may be initiated by either device. For example, if the terminal 101 desires to transmit data to the computer 119 it will generate a ring signal. The ring signal is detected by the telephone interface 109 which informs the computer 119 by generating a program interrupt signal. The computer 119 detects that one of the terminals 101 has generated a ring signal and will cause the interface 109 to generate a set data terminal ready signal (i.e., pick up the phone) to the receiving modem 107 corresponding to the particular terminal 101. The set data terminal ready signal allows the receiving modem 107 to communicate with the transmitting modem 103. The telephone interface 109 will then receive a carrier signal which indicates that the modems 103 and 107 are connected.

Referring now to FIG. 4, in particular, it will be seen that each terminal 101 has a ring input such as the signal appearing on line 409 and a carrier input such as the signal appearing on line 411 to the telephone interface 109. The telephone interface 109 may generate a set data terminal ready signal such as the signal appearing on line 415 to each terminal 101.

All of the ring signal inputs to the telephone interface 409 are bussed together and connected as a one set input on line 417 to a ring flag flip flop 419. When any one of the terminals 101 generates a ring signal, the flip flop 419 will be set.

In a like manner, all of the carrier signal inputs from the terminals 101 are bussed together and connected by a line 421 as a one set input to a carrier flag flip flop 423. The flip flop 423 will be set when the status of any one of the carrier signal inputs changes.

The set output of the flip flops 419 and 423 are connected by lines 425 and 427, respectively, to a logic means 429. If the computer 119 has enabled the logic means 429, the logic means 429 will generate a program interrupt signal on line 431 when either of the flip flops 419 or 423 is set. The computer 119 will enable the logic means 429 by executing a particular instruction which will cause an enable interrupt signal to appear on line 433. The signal on line 433 will one set a flip flop 435. The set output of the flip flop 435 is connected to the logic means 429 by line 437. The computer 119 may disable the logic means 429 by executing a particular instruction which results in a signal appearing on line 437 to reset the flip flop 435.

If a program interrupt signal is generated on line 431 due to a ring signal or a change in a carrier signal, the computer 119 will interrogate the telephone interface 109 to determine the cause.

The computer 119 will interrogate the status of the ring flip flop 419 by executing a particular instruction which results in a signal being generated on line 439 as an input to the logic 429. If the ring flip flop 419 is one set, a skip signal on line 441 will be generated by the logic means 429 to the computer 119.

The computer 119 will test the status of the carrier flip flop 423 by executing an instruction which will result in a signal being generated as an input to logic 429 on line 443. If the flip flop 423 has been one set, a skip signal will be generated on line 441 as an indication to the computer 119.

When the computer has interrogated the telephone interface 109 and determined that either the ring flip flop 419 or the carrier flip flop 423 has become set, it will then interrogate all of the ring lines or all of the carrier lines, as the case may be, from the input terminals 101 to determine which particular terminal had generated the original signal which resulted in the program interrupt signal.

All of the ring signal inputs from the terminals 101 to the logic 429 are segmented into groups of 8 within the logic 429. (With 32 terminals 101, for example, there would be 4 groups of 8). The ring signals in each group of 8 are coupled through group selection logic within the logic 429 to eight output lines 445. The lines 445 are connected to eight stages (AC4-11) in the accumulator register 209. A group counter 447 is decoded in the logic 429 to select a particular group of eight lines. The group counter 447 may be cleared to zero by a signal on line 449 and may be incremented by a signal on line 451. Accordingly, the computer 119 may check the status of all the ring signal inputs to the telephone interface 109 by executing a particular instruction which results in a signal on line 453 as an input to logic means 429. The signal on line 453 will enable the ring signals from a particular group selected by the group counter 447 to be coupled to the output lines 445. The computer 119 will initially clear the group counter 447 and read the status of the first group of eight ring signals into the accumulator register 209. It will then store the contents of the accumulator register 209 away in memory for later reference and then increment the counter 447 to select the second group of ring signals and so forth.

The status of the carrier line inputs to the telephone interface 109 may be determined in a similar manner. That is, the carrier line inputs are segmented into groups of 8 and coupled to the output lines 445 through carrier group selection logic. The carrier group selection logic will be enabled when the computer executes an instruction which generates a signal as an input to logic 429 on line 455. The group counter 447 will be incremented by the computer 119 to sequentially select the groups to be coupled to the output lines 445.

A set data terminal ready signal may be sent to a particular terminal 101 by one setting a data terminal ready flip flop which is associated with that terminal, such as flip flop 457. The flip flop 457 will be one set by a signal on a line 459 from the logic means 429. All of the one set signal outputs to the data terminal ready flip flops 457 from the logic means 429 are segmented into groups of eight. The lines 445 from the accumulator register 209 are connected to each group of 8. The group counter 447 will enable the lines 445 to be coupled to a particular group of lines 459. Accordingly, when the computer 119 executes a particular instruction, a signal will appear on line 461 as an input to the logic means 429. This signal will enable the lines 445 to be coupled to a particular group of lines 459, as determined by the group counter 447. Accordingly, if the computer 119 desires to send a set data terminal ready signal to a particular data terminal 101, it will place a one bit in a particular bit position of the accumulator 209 and execute a sequence of instructions which will result in the group counter 447 selecting the appropriate group of lines 459 and causing the lines 455 to be coupled to that particular group.

The set data terminal ready signal will be terminated when the corresponding flip flop 457 is reset. A signal on line 463 from the logic means 429 will reset the flip flop 457. The computer 119 will reset the flip flops 457 in a manner similar to the one described to set the flip flops 457. That is, the computer 119 will execute an instruction which will result in a signal appearing on line 465 to enable the outputs from the logic means 429 on the lines 463. The signals on the lines 445 will be coupled sequentially to the groups of the lines 463 as the group counter 447 is incremented. As the group counter 447 is incremented, the contents of the accumulator register 209 is changed to correspond to that particular group of lines.

4. The Synchronous Data Communications Interface

Figure 5:
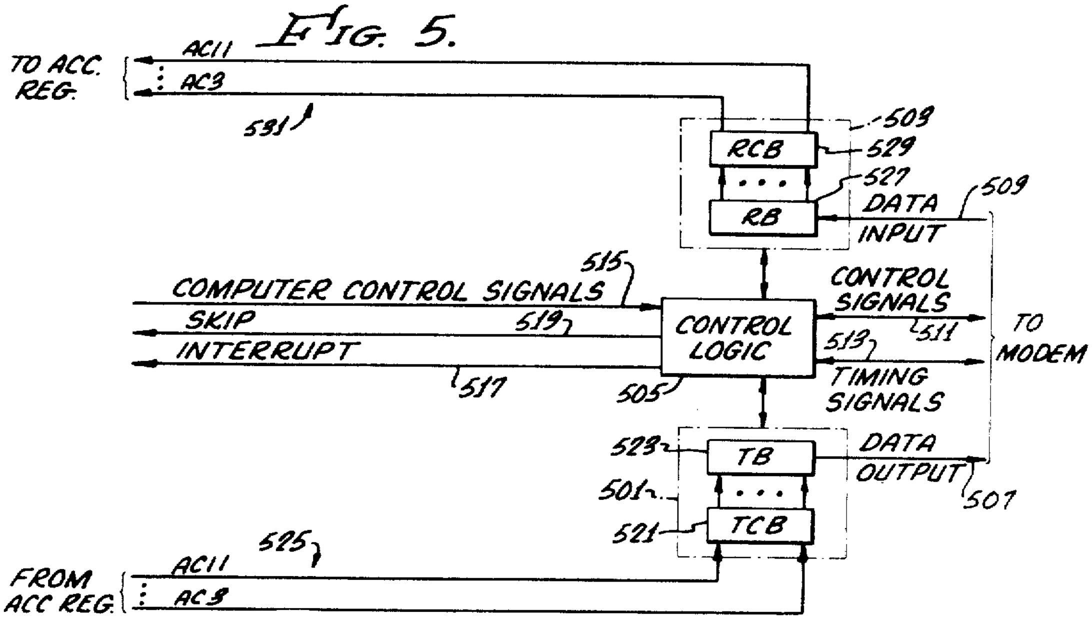
FIG. 5 is a block diagram of the synchronous data communication interface seen in FIG. 1.

Referring now to FIG. 5, there is shown a block diagram of the synchronous data communications interface 133 seen in FIG. 1.

The synchronous data communications interface 133 is functionally divided into a transmit character section 501 and a receive character section 503 with a common control logic means 505.

Data bits are transmitted from the transmit section 501 to the synchronous modem 125, seen in FIG. 1, on a line 507. Data bits received from the modem 125 appear as an input to the receive section 503 on a line 509. A line 511 represents a plurality of control signals which are communicated between the control logic means 505 and the modem 125 to indicate the status of both devices to each other. Timing signals which synchronize the transmission and the reception of data bits between the interface 133 and the modem 125 appear on line 513. The computer 119 controls the status of the synchronous data interface 133 with a plurality of control signals to the control logic 505 represented by the single line 515. These signals comprise various decoded combinations of the device select code signals (MB3–8) from the memory buffer register 203 and the IOP signals from the computer control logic 215.

The control logic 505 will generate a program interrupt signal on line 517 under certain conditions. When the computer 119 detects an interrupt signal on line 517, it will interrogate the possible causes of an interrupt with control signals on line 515. The control logic means 505 will respond to each interrogation by the computer 119 by generating a skip signal on line 519 depending upon the status of the condition interrogated.

The transmit character section 501 includes two 9-bit character registers, a transmit character buffer register 521 (TCB) and a transmit shift buffer register 523 (TB). The register 521 is connected to receive a data byte, in parallel, from the accumulator register 209 by lines 525.

The receive character section 503 also includes two 9-bit character registers, a receive shift buffer register 527 (RB) and a receive character buffer register 529 (RCB). The register 529 is coupled to shift a character in parallel to the accumulator register 209 on lines 531.

To transmit a character, the computer 119 will place the character in the accumulator register 209 and execute a transmit instruction. A control signal on line 515 from the computer 119 will cause the control logic 505 to enable the register 521 to read the contents of the accumulator 209. The control logic 505 will then shift the character into the register 523. The character is then shifted out one bit at a time on line 507 to the synchronous modem 125. The control logic 505 will also generate timing signals on line 513 to the modem 125 to synchronize the data transfer.

The first character in a transmit process must always be a synchronization (sync) character. A decoding means in the logic 505 continuously decodes the contents of the register 521. When a sync character is decoded in the register 521, the decoding means will cause the contents of register 521 to be shifted into the register 523 and a transmit active signal to be sent to the modem 125 on line 511. The transmit active signal will also enable the timing signals to be transmitted on line 513. When the character in register 521 is shifted into register 523, the logic 505 will set a transmit flag flip flop (not shown) which causes a program interrupt signal to be generated on line 517. The computer 119 will interrogate the control logic 505 with signals on line 515 and will determine that the transmit flag had been set. The computer 119 will then respond by clearing the transmit flag, inserting a new data character to be transmitted into the accumulator register 209, and executing a transmit instruction to shift that character into the register 521. During this time the character contained in the register 523 is being shifted out to the modem 125 on line 507. A decoding means associated with the register 523 is continuously decoding its contents. As soon as it senses that the register 523 is empty, it will cause the control logic 505 to shift the character in register 521 into the register 523 and also set the transmit flag again.

Since data transmission between the data interface 133 and the modem 125 is synchronous, the computer 119 must insert a new character into the register 521 before the contents of register 523 have been completely transmitted to the modem 125. Accordingly, for a data bit transmission rate of 2,400 baud and a byte length of 8 bits, the computer 119 must provide 300 characters every second.

Data bits being received by the computer 119 from the modem 125 are shifted in series into the register 527. The modem 125 also provides timing signals on line 513 to synchronize the shifting of bits into the register 527. A decoding means in logic 505 continuously examines the contents of the register 527. When a sync character is sensed in the register 527 indicating that the modem 125 is initiating a data transfer into the computer 119, the logic means 505 will set a receive flag flip flop (not shown) which results in an interrupt signal on line 517. At the same time the control logic 505 will shift the character in register 527 into the register 529 and also set a receive active flip flop (not shown). The computer 119 will interrogate the control logic 505 in response to the program interrupt. When it determines that the receive flag was set, indicating that a character is available in register 529, it will execute a receive instruction to shift the character in register 529 into the accumulator 209 and reset the receive flag. After the first sync character has been detected in register 527, the control logic 505 will cause each eight bit group of data bits received on line 509 to be transferred into the register 529 and the receive flag to be set.

The control logic 505 also includes a timing means (not shown) which is responsive to the timing signals received on line 513 from the modem 125. When the modem 125 ends its transmission, the timing signals on line 513 will no longer be present. The timing means in the logic 505 will cause a receive end flag flip flop (not shown) to set if the timing signals on line 513 are missing for longer than approximately 1-½ bit times. The receive end flag will cause a program interrupt on line 517 to the computer 119. The computer 119 will detect that the receive end flag had been set and will generate signals on line 515 to return the control logic 515 to an appropriate condition.

5. Computer Program Instructions

The instructions which the computer 119 will execute may be divided into two main groups; a memory reference group, and an augmented group. The memory reference group of instructions will store or retrieve words from the core memory 201 while the augmented instructions do not.

The instructions in both groups utilize bit positions 0, 1 and 2 to specify the particular operation that the computer is to perform. The memory reference group of instructions employ the operation codes of 0 through 5 while the augmented instructions utilize the operation codes of 6 and 7.

Figure 6:
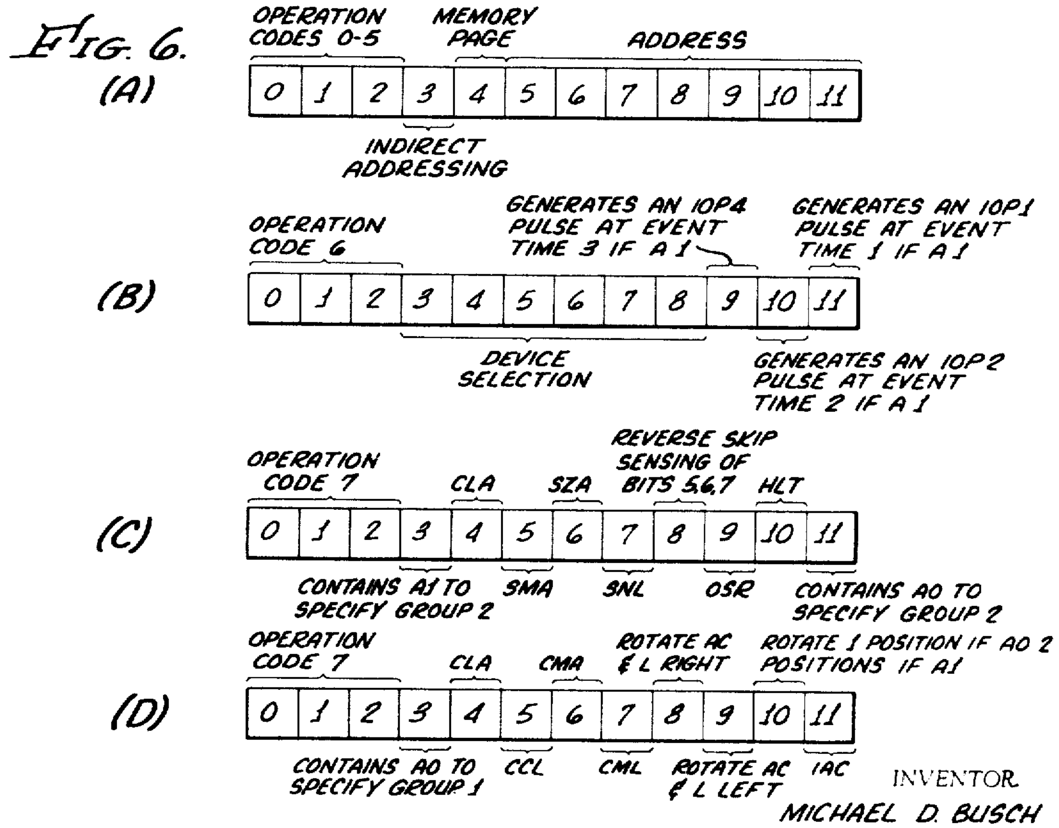
FIGS. 6(A), 6(B), 6(C), and 6(D) show the four different instruction formats used by the peripheral computer of FIG. 1.

Referring to FIG. 6(A) there is shown the instruction format for a memory reference instruction. Note that the first three bit positions define the operation code and that the remaining nine bits contain the address of the location that the computer 119 must store a word in or retrieve a word from. The core memory 201 contains 4,096 words and has been divided into 32 blocks or pages each containing 128 words. Bit positions 5 through 11 in a memory reference instruction will define a particular address on a page. Bit position 4 will contain a one bit if the address in bits 5 through 11 indicates an address in the particular page on which the current instruction is located. A 0 in bit position 4 indicates that the address in bit positions 5 through 11 refers to that address on page 0 of the memory. The remaining pages of memory can be addressed by placing a 1 bit in the bit 3 position of the instruction and a 7-bit effective address in bits 5 through 11. A 1 in the bit 3 position of the current instruction will cause the computer 119 to retrieve the word in the address of the current page as defined by bit positions 5 through 11. The word retrieved from that address is a 12-bit absolute address of the operand. This is called "indirect addressing."

A list of the memory reference instructions which the computer 119 will perform is contained in Appendix I.

The augmented group of instructions may be further divided into an input-output transfer (IOT) group, which has an operation code of 6, and an operate group (OPR), which has an operation code of 7. Since these instructions do not require access to the memory 201 the bits 3 through 11 can be microencoded to define the particular operation to be performed by the computer 119 still further. The various operations which are performed as a function of the microencoding in bits 3 through 11 occur at a specified time with respect to the computer cycle time and are designated as event times 1, 2 and 3.

The instruction format for the IOT instructions is shown in FIG. 6(B). The instruction formats for the OPR instructions are shown in FIGS. 6(C) and 6(D).

During the execution of an IOT instruction, three event times separated by 1 microsecond will occur while only two event times will occur during the execution of an operate instruction.

The execution of an IOT instruction, Op. Code 6, will cause the computer 119 to effect an information transfer between the computer 119 and an input/output device. Referring to FIG. 6(B), it will be seen that the operation code appears in bits 0, 1 and 2 while the bit positions 3 through 8 define a particular input/output device with which the computer 119 will communicate. The bit positions 9, 10 and 11 will cause the computer 119 to generate IOP4, 2 and 1 pulses at event times 3, 2 and 1, respectively, to the particular device selected by bits 3 through 8.

A list of the IOT instructions which the computer 119 will perform is shown in Appendix II.

The operate group (OPR) of the augmented instructions may be still further divided into two groups of microinstructions. The first group, designated OPR1 and shown in FIG. 6(D), is distinguished from the second group, designated OPR2, and shown in FIG. 6(C), by the presence of a 1 in bit position 3 of the word.

The OPR1 group contains instructions which will clear, complement, rotate or increment the accumulator register 209. The OPR2 group includes instructions which will cause the computer 119 to continue to the next instruction or skip that instruction as a function of the contents of accumulator 209 and link bit.

The instructions in group OPR1 are listed in Appendix III. The instructions in group OPR2 are listed in Appendix IV.

6. The Teletype In Instruction

Figure 7:
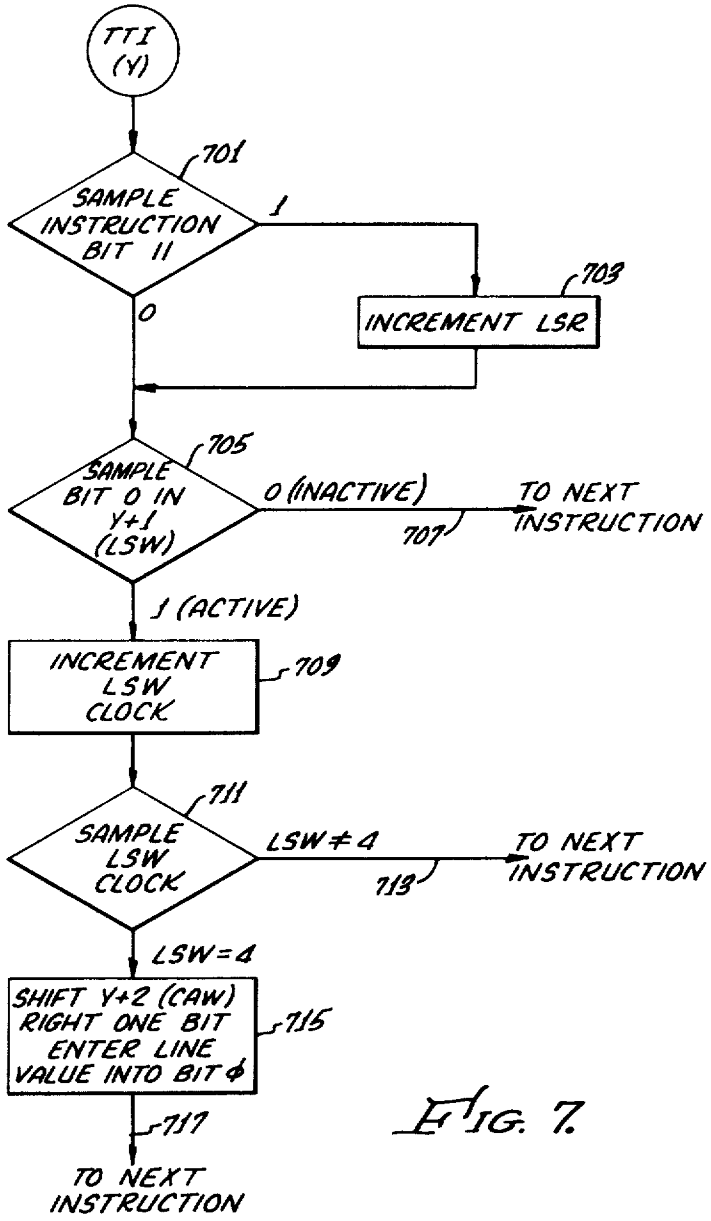
FIG. 7 is a flow chart for a Teletype In instruction.

The Teletype In Instruction, (TTI), an IOT instruction seen in Appendix II, is a particularly complex instruction and can be better understood by referring to FIG. 7 where there is shown a flow chart of the logical sequence which the computer 119 performs when a TTI instruction is executed.

Recall that a unit of code from the terminals 101 into the serial line multiplexer 117 includes 11 bits having a first bit which indicates the start of the unit code followed by 8 character bits and terminated with two stop bits. Also recall that the clock 301, FIG. 3, generates a pulse output to cause a program interrupt signal at a rate 8 times the bit rate of the incoming bits from the terminal 101 and that the computer 119 will execute a TTI instruction to examine the incoming line each time a clock interrupt is detected. Therefore, during one bit time of the incoming unit code the computer 119 will examine the particular incoming line 8 times.

Assume initially that the start bit of a unit code has just been applied to a previously inactive input line and that a clock interrupt occurs. The computer 119 will execute a TTI instruction and determine that that particular line was not receiving data at the time of the last clock interrupt. The computer 119 will then read and store the status of the line, which now is active, and proceed to the next instruction. At the time of the next clock interrupt, the computer 119 will determine that at the time of the last clock interrupt, a data bit was present on the line and will then examine a modulo 8 counter, which it increments each time it examines an active line. If the counter indicates that 4 clock interrupts have occurred since the line became active, it will sample the line and store the bit. The computer 119 will then sample the line every 8 clock interrupts (i.e., every time the modulo 8 counter assumes a 4-count configuration). This ensures that the computer 119 will sample the line within 12.5 percent of the center of the incoming bit. After the computer 119 has sampled the line eight times following the start bit it will have assembled a complete input character.

More specifically, when the clock 301 produces a pulse causing a program interrupt to the computer 119 and the computer 119 determines that it was the clock 301 which generated the interrupt, the computer 119 will execute a TTI instruction. The TTI instruction requires three successive locations in memory. The first location, Y, contains the TTI instruction. The next successive location, Y + 1, contains a line status word (LSW) and the third location, Y + 2, contains a character assembly word (CAW). When the computer 119 executes a TTI instruction it will perform the logical sequence shown in FIG. 7.

In step 701 the first action taken by the computer 119 is to examine bit 11 in the TTI instruction. If bit 11 is a one the computer will increment the line select register 337 in step 703 and then proceed to step 705. If bit 11 of the TTI instruction is a zero, the computer 119 will proceed directly to step 705 and will not increment the LSR 337.

In step 705 the computer 119 will read the word contained in location Y + 1, the line status word, into the memory buffer register 203 and examine bit zero to determine whether the terminal being tested was previously determined to be active or inactive at the time of the last clock interrupt. If bit 0 of the LSW is zero, indicating that the input line was inactive when last tested, the computer 119 will sample the present state of the input line and set that value into bit 0 and exit the TTI sequence on line 707. If bit 0 is a one indicating that the input line is receiving data from a terminal 101, the computer 119 will proceed to step 709 where the LSW bits 9, 10, and 11 (LSW clock), which maintain a running count of the number of times that the computer 119 examines the input line, are incremented. After the LSW clock has been incremented, the computer 119 will proceed to step 711 where it will examine the LSW clock to determine whether or not the clock is equal to 4. If the LSW clock is not equal to 4 the computer 119 will exit the TTI instruction on line 713 and perform the next instruction. If the LSW clock is equal to 4, however, indicating that either (1) that 4 clock interrupts have occurred since the start bit first appeared and that the center of the bit has been reached and should be sampled, or, (2) that 8 clock pulses, or a multiple thereof, have occurred since the center of the start bit was reached and the line should again be sampled, the computer 119 proceeds to step 713. In step 713 the word contained in location Y + 2, CAW, is read from memory 201 into the memory buffer register 203 and shifted right one bit. The computer 119 then reads the information on the incoming line and enters that value into bit 0 of the memory buffer register 203. The TTI sequence is then terminated when the computer 119 proceeds on line 717 to the next instruction contained in Y + 3.

CAW is preset so that a 1 appears in bit position 11 when the entire character including one stop bit has been shifted in. The computer 119, under program control, may subsequently determine whether or not an entire character has been read into CAW by examining bit 11. If the bit 11 is a 1, the computer 119 will place the word from CAW into a separate memory location for storage together with the number of the line that the word came from. The computer 119 will then reinitialize the TTI command by resetting the line status word to zero and the character assembly word to the appropriate number.

2. DATA FORMAT

From the previous description of the data transmission system with reference to FIG. 1, it will be recalled that the overall system includes a plurality of terminals 101 connected through a corresponding plurality of telephone channels 102 to a multiplex system 117 associated with a peripheral computer 119. Located at a distance from the peripheral computer 119 and communicating therewith over a pair of high speed long distance lines 129 and 131 is a central computer 123 which, for sake of simplicity, is shown as being of the same type as the peripheral computer 119. Interposed between respective ones of the computers 119 and 123 and their ends of the long distance lines 129 and 131 are a pair of synchronous modulator-demodulators (MODEMS) 125 and 127.

Figure 9:
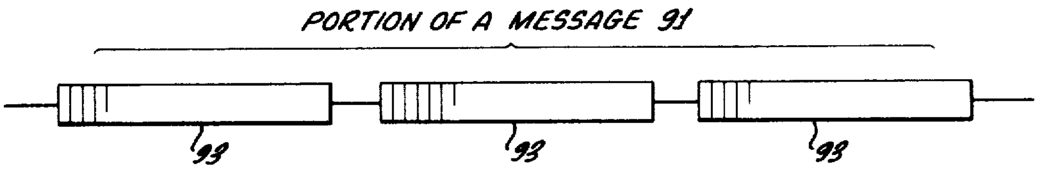
FIG. 9 illustrates three data blocks forming a portion of a message which is transmitted between the computers comprising part of the system of FIG. 8.
Figure 10:
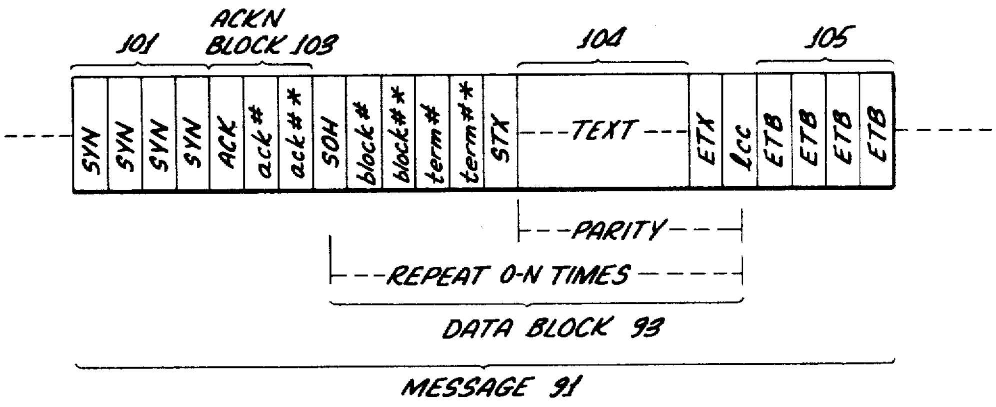
FIG. 10 shows the sequence of bytes at the beginning and end of the message a portion of which is shown in FIG. 9.

The format in which data is transmitted in accordance with the invention in both directions over the high speed communication lines 129 and 131 is shown in FIG. 9 and 10. As seen in FIG. 3 data is sent in the form of a message 91, each message comprising one or more data blocks 93.

Referring to FIG. 10 the composition of a message will now be described in greater detail. A message 91 consists of four SYN characters 101, an acknowledge block 103, any number (including zero) of data blocks 93, which may be either control blocks 93*b* or text blocks 93*a* intermixed, and four ETB characters 105.

The function of the SYN characters 101 is to synchronize the equipment which receives the bytes which follow them. Their number is not critical and may be either more or less than four.

The acknowledge block serves to notify the transmitting computer that the particular data block 93 sent by it was correctly received. It consists of three bytes: ACK/ack # /ack # * in which:

ACK— ASCII ACK character.

ack # — the block number (i.e., the serial number) of the last text block or control block correctly received.

ack # *— the 7-bit ones-complement (see definitions) of ack # .

A text block data block 93*a* consists of:

SOH/block # /block # */term # /term # */STX...text.../ETXlcc in which:

SOH— ASCII SOH (Start of Heading) character.

block # — serial number of the block, modulo 128 (see definitions).

block # *— 7-bit ones-complement of block # .

term # — terminal address associated with the block.

term # *— 7-bit ones-complement of term # .

STX— ASCII STX (Start of Text) character.

text— any length string of ASCII characters not including ACK, SOH, STX, ETX or ETB.

ETX— ASCII ETX (End of Text) character.

lcc— longitudinal checksum character, whose value is chosen so that all the bytes in the text together with the ETX and lcc bytes (but excluding the STX) add to zero modulo 128.

A control data block 93*b* is identical in format to a text data block 93*a* except that the seventh bit of the term # byte is set to "one" to mark it as a control block. The text of a control block 93*b* consists of just two bytes: a control byte and an ASCII DEL character. The control character is microencoded (see definitions) as follows:

In a message from the central computer 123 to the peripheral computer 119:

000 001 pick up the phone
000 010 hang up the phone
000 100 delete output
001 000 delete input
100 000 reload concentrator (emergency)

In a message from the peripheral computer 113 to the central computer 123:

000 001 output is exhausted
000 010 ringing
000 100 connect
001 000 disconnect

3. THE MESSAGE BUFFERING COMMUNICATION SYSTEM —

THE SYSTEM IN GENERAL

Figure 8A:
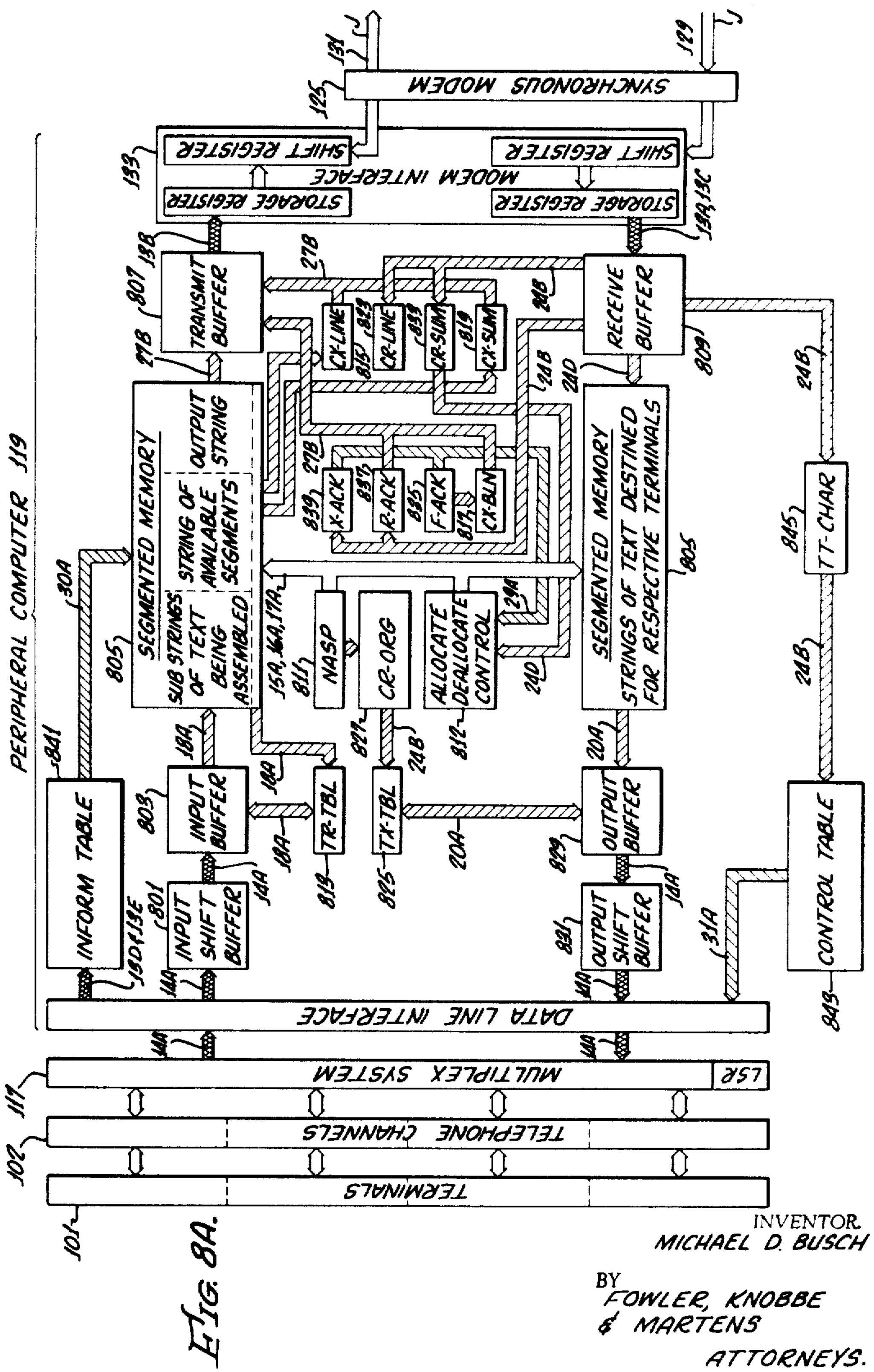
FIG. 8, formed of FIGS. 8A – 8B when joined together as indicated thereon, is a schematic block diagram of a message buffering communication system incorporating features of the present invention.
Figure 8B:
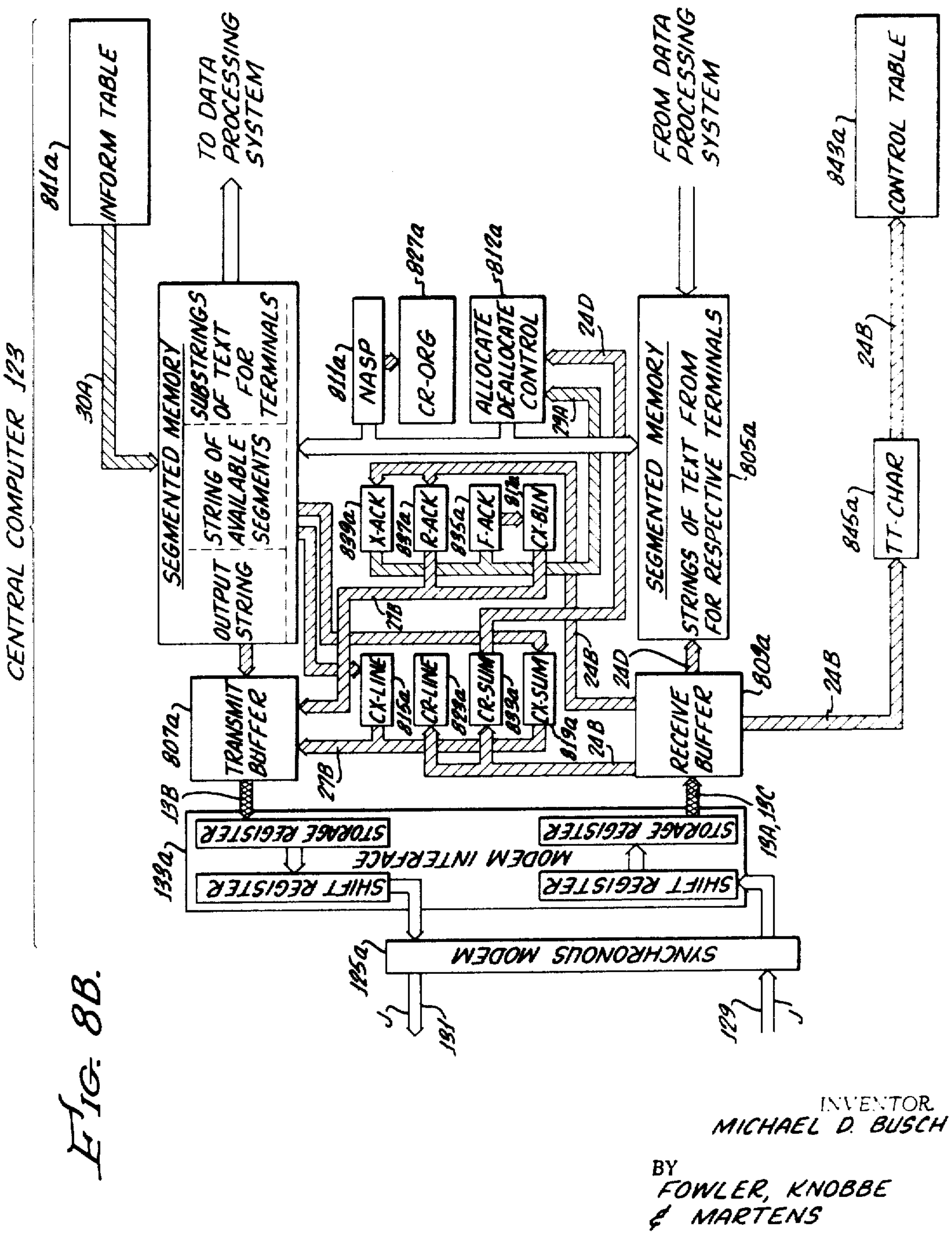

A Communication System incorporating features of the invention is shown in FIG. 8. It comprises the peripheral computer 119 which receives streams of data from the terminals 101 and the central computer 123 to which data is transmitted at high speed from the peripheral computer 119 over the high speed communication lines 129 and 131. Although the computers 119 and 123 may be of different types, for sake of simplicity they are shown to be almost identical. Thus, many of the functional components of the peripheral computer 119 have identical counterparts in the central computer 123. Corresponding parts in the two computers 119 and 123 are identically numbered, but with the components in the central computer 123 having the suffix *a* added.

Considering the general organization of the peripheral computer 119 first, data streams from the terminals 101 are successively sampled under the control of the multiplex system 117 and are fed through the data line interface 121 of the peripheral computer 119 and through a pair of buffers 801 and 803 to a segmented memory 805 within the computer 119. The function and nature of the segmented memory 805 forms an important part of the invention and will be explained in considerable detail hereinafter. In the segmented memory the data streams from the several terminals 101 are assembled into separate sub-strings of data, each sub-string representing one or more data blocks from a single terminal. As each sub-string is completed so that it holds a complete message from its associated terminal, it is attached to an output data string formed of previously completed sub-strings. Bytes of data are successively shifted out of the output data string into a transmit buffer 807 and are synchronously transmitted therefrom through the MODEM interface 133 of the computer and through the high speed communication circuits 125, 131 and 127 to the central computer 123.

Information originating from the central computer 123 and intended for the various terminals 101 is first transmitted over the high speed communication circuits 127, 129 and 125 and is shifted into a receive buffer 809 within the peripheral computer by means of its MODEM interface 133. From the receive buffer 809 the data from the central computer 123 is transferred into another section of the segmented memory 805 in which strings of text intended for the various terminals 101 are separately assembled. Bytes from these strings of text are concurrently fed serially through a pair of output buffers 811 and 813 and through the data line interface 121 to the multiplex system 117 which distributes them for transmission to the proper terminals 111.

4. THE MESSAGE BUFFERING COMMUNICATION SYSTEM —

THE SYSTEM IN DETAIL a. The Input Buffers

The input buffers include an input shift buffer 801 and an input buffer 803 which cooperate to assemble data bits coming in from the various terminals into bytes for subsequent transfer to the segmented memory 805. Both of the buffers 801 and 803 are parts of the main magnetic core memory 201 of the peripheral computer 119 (see C.1.*b*.1.). Thus the input shift buffer 801 is made up of a plurality of "words" in the memory 201, where each word is comprised of a set of magnetic cores capable of storing 12 bits of data. In each of the "-words" of the input shift buffer 801 data bits are entered in the first core of the "word" and are successively shifted by control means of the peripheral computer 119 until a complete byte has been shifted into the word of the memory 201. In operation, bytes from the different terminals are sequentially stepped bit by bit into different word locations in the portion of the memory 201 comprising the input shift buffer 801 and periodically, in sequence for successive ones of the terminals 101, the word locations of the input shift buffer 801 are interrogated to ascertain whether a complete byte from the terminals has been assembled in them. Each time that a complete byte is found to have been assembled in the input shift buffer 801, it is transferred together with the address of the terminal from which the byte originated into one of a plurality of word locations of the memory 201 comprising the input buffer 803. The input buffer 803 is also comprised of a plurality of words in the main memory 201, each word having a capacity to store 12 bits. In a particular form of the system actually built, the input buffer was made up of 48 word locations in the memory, thereby being able to store at any one time 24 bytes and their terminal addresses. The input buffer 803 is organized into a configuration also known as a "circular buffer" and at any given time it contains input bytes and their terminal addresses from many different terminals. The manner and mode of assembling incoming bits into bytes in the input shift buffer 801 is not per se a feature of the present invention. Indeed it may be found described as a TTI instruction in the PDP-8 *Users Handbook* referred to in E.I. herein, in which each input shift buffer is referred to as a CAW (Character Assembly Word).

b. The Segmented Memory

In accordance with an important feature of the invention, successive bytes fed from the input buffer 803 to the segmented memory 805 are assembled in the memory into a plurality of sub-strings, each of which contains bytes from a different one of the terminals 101.

Figure 11A:
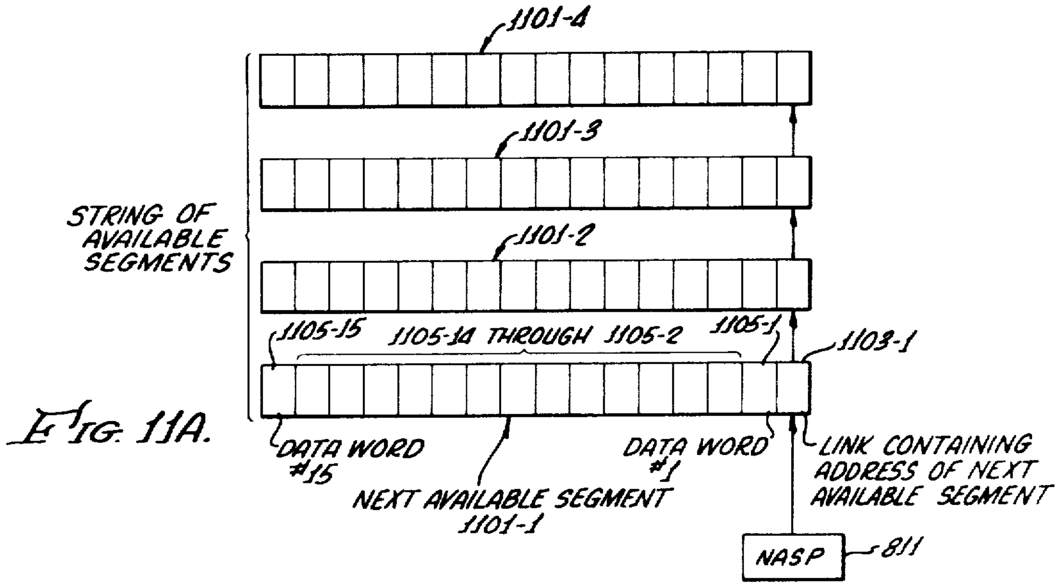
FIG. 11A illustrates the manner in which available memory segments are organized into a continuous string, in which each suitable memory segment contains the address in memory of the following available memory segment.

More specifically, the segmented memory 805 is functionally divided into a plurality of individually addressable memory segments, each of which has a storage capacity for a given plurality of bytes and a linking word representing the address of another one of the memory segments. In a working system incorporating features of the invention, the segmented memory included 96 memory segments, each segment having a capacity for a linking word and 15 data bytes. All memory segments which are available for storing information are functionally arranged in a group designated as "available segments." This is achieved by means within the computer for initially storing in each except the last of the available memory segments a linking word representing the address of the next one of the available memory segments. Four available memory segments 1101-1, 1101-2, 1101-3, and 1101-4 are illustrated in FIG. 11*a*. Referring to the first memory segment 1101-1, it contains a first word position 1103-1 for storing a "linking word" which is the address of the next available memory segment 1101-2 and 15 additional word positions 1105-1 through 1105-15 for storing data bytes 1 through 15. By means of routines built into the computer and well known to those skilled in the art, data bytes are written into successive ones of the word positions 1 through 15 of the memory segment 1101-1. The linking word of each available memory segment 1101 represents or "points to" the address of the first word position, i.e., 1103-1, of the next available memory segment 1101 so that, given the address in memory of the first word position of a given memory segment 1101 in a series of available memory segments 1101 a large string of data bytes can be stored in successive ones of them in a continuous string. It will be understood that the linking word need not necessarily point to the linking word of the next data segment ·1101. Therefore, in the description and claims that follow, a linking word will be referred to only as pointing to the next available memory segment. Where a more specific definition is intended, it will be given.

The address of the first available memory segment is held at all times in a one word memory location designated as the "-Next Available Segment Pointer" 811 (see both FIGS. 8 and 11). Means are also provided for updating the next available segment pointer 811 each time that the memory segment whose address it contains has been allocated and is no longer available. At this time the address of the memory segment which has become unavailable is replaced in the next available segment pointer 811 with the address of the memory segment whose address was previously represented by the linking word of the memory segment which has just become unavailable, i.e., the address of the second available memory segment.

Each time that the initial byte of a message 91 from one of the terminals 101 is received and is ready to be stored from the input buffer 803 into the segmented memory 805, that byte is assigned the memory segment 1101-1 whose address is then in the next available segment pointer 811. Subsequent bytes from the same message 91 are stored in subsequent word locations in the same memory segment 1101-1 until it is filled. Thus, in the illustrated example a total of 15 bytes are stored in the memory segment 1101-1, with the first byte being the address of the terminal 101 from which the message originated. The 16th byte in the message 91 is directed to the second word position of the memory segment 1101-2 which is the next of those then available. This segment is linked to the first segment which has just been filled by setting into the first word of the first segment a linking word representing the address of the memory segment 1101-2 allocated to receive the 16th byte of the message 91.

The several operations involved in allocating and deallocating (to be explained subsequently) memory segments by adding or deleting linking words and by other means are performed by a set of instructions identified collectively in FIG. 8 as the "Allocate-Deallocate Control" block 812.

It should be noted that, if it were certain that the second available memory segment 1101-2 in the group of available memory segments 1101 will be allocated to receive bytes of the same message as the first, it would be unnecessary to set its address into the preceding (the first) memory segment 1101-1 because, as described previously, each available memory segment 1101 contains a linking byte representing the address of the following available memory segment 1101. However, as will become apparent, memory segments 1101 are allocated from the group of available memory segments 1101 to several streams of data arriving from the terminals 101 so that, if there are 96 available memory segments, No's. 16, 54, and 72 might be linked together into one sub-string to hold a message from one data stream and a number of unrelated memory segments might be linked together to store a message from another data stream. Consequently, even though each memory segment 1101 in the group comprising the available memory segments holds the address of the following available memory segment 1101, its address must be changed when it becomes filled with data in order to correctly identify the memory segment 1101 holding the following data bytes in the message a part of which it contains.

Figure 11B:
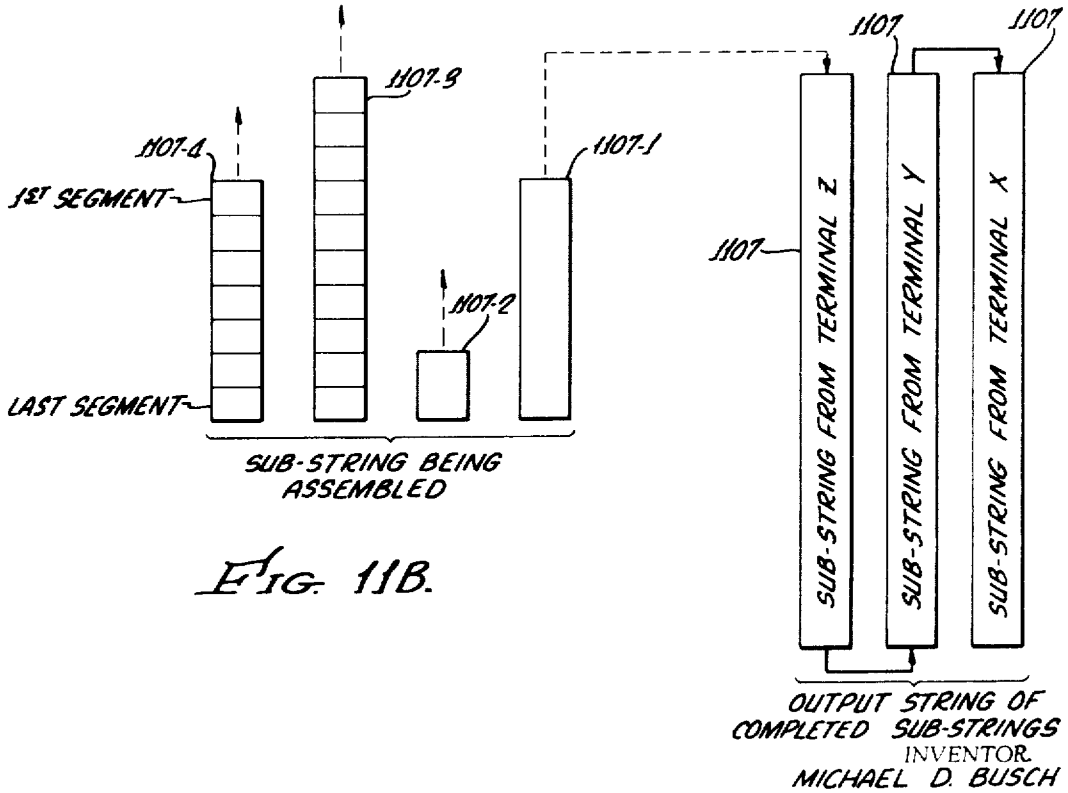
FIG. 11B illustrates the manner in which several sub-strings of memory segments are concurrently assembled in the segmented memory of the data concentrator portion of the system in FIG. 8A and are linked into a continuous output string.

In the manner just described, bytes originating as part of a data stream from a particular terminal 101 are successively stored in the segmented memory 805 with memory segments 1101 being continually furnished from the "reservoir" of available memory segments under the control of the next available segment pointer 811. This process is concurrently performed for data streams originating from several of the terminals 101. Thus, the first data byte of each message 93 from any terminal is assigned a new memory segment 1101 by the next available segment pointer 811, and as subsequent bytes from those messages fill those memory segments 1101, further memory segments 1101 are assigned to each of them by using the next available segment pointer (NASP). In this way several sub-strings of linked memory segments are concurrently formed in the segmented memory 805, each of them accumulating bytes from a different data stream. An example of this is illustrated in FIG. 11*b*, in which four sub-strings 1107-1, 1107-2, 1107-3, and 1107-4 in various stages of completion and containing bytes from data streams originating from different ones of the terminals 101 are shown.

c. The terminal Receive Table (TR-TBL)

In order to keep track of the several sub-strings 1107 which are being accumulated in the segmented memory 805, up to one sub-string for each terminal 101, a Terminal Receive Table (TR-TBL 813) is provided in the memory 201 of the computer 119. To save the locations of the beginning and end of each sub-string the TR-TBL 813 includes two words for each terminal 101. The first word "points" to the beginning in the segmented memory 805 of the data sub-string 1107 originating from a given terminal 101 and the second word "-points" to the end of that sub-string. Each time a byte and its associated terminal address are read from the input buffer 803, reference is made to TR-TBL 813 to find where in the segmented memory 805 the sub-string 1107 being created for that terminal address is located. When the sub-string for that terminal is found, the byte just read from the input buffer 803 is appended to it by storing it in the next word location of the memory segment 1101 currently used for storing bytes from that terminal. In particular, this reference is made to the second word of the TR-TBL 813 associated with the particular terminal from which the data byte originates, this word pointing to the end of the sub-string 1107 being assembled for that terminal 101. If upon obtaining a byte from the input buffer 803 it is found that there is no entry in the second word provided in TR-TBL 813 for the terminal 101 from which the byte originated (meaning that there is no sub-string 1107 being assembled in the segmented memory 805 for that terminal) a new sub-string 1107 is started for it. This process is repeated each time another byte is read from the input buffer 803. It will be realized that, in all probability, each time a new byte is read from the input buffer 803 it will be from a different terminal 101. Consequently, the several sub-strings 1107 being assembled in the segmented memory 805 are built up in a completely random manner.

The accumulation of bytes in a given sub-string 1107 in the segmented memory 805 continues until the terminal 101 from which the data bytes of that sub-string originated generates a terminating character. In the case of a Teletype terminal this is always produced at the end of a typed line. When this occurs, the sub-string 1107 is terminated by removing the address of its last data byte from the second word provided in TR-TBL 813 for its associated terminal and by transferring the address from the first word provided for its associated terminal in TR-TBL 813 to the linking word of the last memory segment 1101 of the preceding sub-string 1107 which was terminated in a similar way previously and which is awaiting transmission as part of an output string 1109 in the segmented memory 805. Thereafter, both words in the TR-TBL 813 are zeroed out so as to indicate the next time a data byte originating from their associated terminal is read from the input buffer 803, representing the first byte of another message from that terminal, that subsequent data bytes will have to be assembled in another sub-string 1107 in segmented memory.

d. The Transmit Buffer

Periodically bytes are read from the memory segments 1101 holding the output string of bytes 1109 in segmented memory 805. The transmit buffer 807 is comprised of 32 words in the memory 201 organized into a circular memory so that successive bytes read from the output string 1109 in the segmented memory 805 are transferred into successive word locations in the transmit buffer 807. Means are also provided for generating even byte parity for each byte transferred from the output string in the segmented memory 805 into the transmit buffer 807 so that each byte is entered into the transmit buffer 807 with correct parity.

e. CX-LINE, CX-BLN, and CX-SUM

During the process in which a particular sub-string 1107 in the output string 1109 in the segmented memory 805 is transmitted through the transmit buffer 807, it becomes desirable temporarily to store the terminal address associated with the sub-string. This is always the first byte in the sub-string 1107 and is stored in a one word memory location shown in FIG. 8 as the block 815 labeled CX-LINE.

Reviewing briefly the data format found in the system of FIG. 8, and with the reference also to FIG. 10, each sub-string 1107 accumulated within the segmented memory 805 for a given terminal 101 represents a single message 91 of the type shown in FIG. 10. Such a message may include any number of text or control blocks 93. In accordance with an important feature of the present invention, each text or control block, collectively referred to as a data block 93, is provided during transmission from the peripheral computer 119 to the central computer 123 with a unique block number. Toward this end a one word memory location 817, labeled in FIG. 8 as CX-BLN, is provided for storing the number of the last data block 93 to have been transmitted from the peripheral computer's segmented memory 805. Each time that a given data block 93 has been sent from the peripheral computer 119, CX-BLN 817 is stepped by one and the new number stored therein is transmitted as part of the next data block 93 sent from the peripheral computer. CX-BLN has a maximum count capacity of 127, after which it is stepped to zero. Therefore the numbers in it cycle through 0, 1, 2, ---127, 0---etc.

Also part of the process for transmitting a data block 93 from the peripheral computer 119 is the provision of a longitudinal checksum character (lcc) which is incorporated in the data block as it is sent. This checksum character serves to enable the computer receiving a data block 93 to ascertain that all bytes in it have been received. The longitudinal checksum character lcc is produced in the system of FIG. 8 by keeping a running sum (modulo 128) of the bytes which have been entered into the transmit buffer 807 for a data block whose text was taken from the output string 1109 in the segmented memory 119 and by transmitting a longitudinal checksum character lcc which is the two's complement (see definitions) of the running sum (modulo 128) of other characters in the block that have been transmitted so that when those characters are counted at the receiving computer and their total is added to the longitudinal checksum character lcc which is received as part of that block, the sum equals zero. A running sum (modulo 128) of the bytes which have been transferred into the transmit buffer 801 and which are to be transmitted is kept in a one word memory location CX-SUM 819.

f. TX-TBL, CR-LINE, CR-ORG

The segmented memory 805 also serves to sort in individual strings 821 text which has been transmitted from the central computer 123 over the high speed transmission circuits 127, 129 and 125 to the peripheral computer 119 for delivery to the various terminals 101. Thus, memory segments are made available by means of NASP 811 and the Allocate-deallocate control 812 from the same reservoir of available memory segments 1101 as those which serve data streams received from the terminals 101. In this way several strings of text 821 are built up concurrently in the segmented memory 805, each for delivery to a different one of the terminals 101. To keep track of the strings of text 821 being assembled in the segmented memory 805, a table 825 labeled TX-TBL is provided. It is similar to the TR-TBL table 813, but has only a single word for each terminal, this word always containing the address of the next byte to be transmitted from a string 821 in the segmented memory 805 to a terminal 101.

Let it be assumed, for example, that a data block 93 destined for delivery to a particular terminal 101 is sent to the peripheral computer 119 from the central computer 123.

Let it be assumed further, that at the time the data block 93 is being received in the peripheral computer 819 it is not the first but that there are other data blocks which have been assembled in the segmented memory 805 and are awaiting transmission to the same terminal. To take care of this possibility, means are provided for linking the memory segment 1101 holding the last received data block 93 to the preceding memory segments holding other data blocks assembled in a string 821 for delivery to the same terminal. This is done by setting the linking word 1103 of the last completed memory segment 1101 destined for a given terminal 101 to point to the last in the string of memory segments 821 already in the segmented memory and awaiting transmission to the same terminal 101. This is done by starting at the location in the segmented memory 805 whose address is the TX-TBL word location for the terminal in question and tracing through the successive memory segments 1101 in the segmented memory 805 until the last memory segment 1101 in this string is reached. The last memory segment in the string 821 is recognized by the fact that it has a link of zero. It is therefore this memory segment which is linked to the first segment of the new data block.

Whether or not an incoming data block is the first one destined for a particular terminal, the address of the particular terminal for which that data block is intended is stored in a one word memory location 823 labeled CR-LINE. The terminal address remains in CR-LINE 823 as byte after byte in the block 93 intended for the given terminal 101 is stored in the segmented memory 805. When the block 93 has been completely received, and it will be recalled that it may be stored in a string 821 of several linked memory segments 1101, the memory location in TX-TBL 825 corresponding to the terminal whose address is in CR-LINE 823 is interrogated to find out if it contains an address in the segmented memory 805 so as to ascertain whether or not there is already a string of text 821 in the segmented memory destined for the terminal 101 in question. If there is, the string 821 of memory segments containing the text just received is linked onto the preceding text by the process just outlined. That is, by tracing through the several memory segments 1101 containing the preceding text until the last one is reached.

If the word location of the terminal in the TX-TBL 825 contains no address, then the address of the first memory segment 1101 in the string of memory segments just assembled is stored therein so as to cause the word location in TX-TBL 825 for the terminal involved to point to the start of the just received text string 821. This information, namely the address of the first memory segment in the string of text just assembled is obtained from an additional one word memory location 827 labeled CR-ORG in which the address of the first segment assigned to the incoming string of text is transferred from NASP 811. Thus, for example, if the text just stored in the segmented memory 805 was intended for terminal No. 37 and was the only text in the segmented memory so intended, then CR-LINE 823 holds a word representing terminal No. 37. Furthermore, as successive bytes in this text are stored in successively allocated memory segments, the address of terminal No. 37 remains in CR-LINE 823. Similarly, the address of the first allocated memory segment 1101 remains in CR-ORG 827. If, at the termination of the text it is found that the word location in TX-TBL 825 corresponding to terminal No. 37 whose terminal address is in CR-LINE 823 contains no address, then the address of the first allocated memory segment 1101 is transferred from CR-ORG 827 to the word location in TX-TBL 825 corresponding to terminal No. 37, so that when TX-TBL 825 is subsequently interrogated with reference to terminal No. 37 it will correctly point to the initial memory segment holding the string of text intended for terminal No. 37.

g. The Output Buffers

Two output buffers are provided for transferring bytes from the segmented memory 805 through the data line interface 121 to the multiplex system 117 of the peripheral computer 119. The first of these is an output buffer 829 having one word location in the memory 201 for each of the terminals 101. As will be explained in greater detail hereinafter, data is transferred from the segmented memory into the output buffer 829 by parallel transfer of entire bytes and similarly, entire bytes are transferred in parallel from the output buffer 829 into an output shift buffer 831 associated therewith. The respective word locations of the buffers 829 and 831 are permanently allocated to respective terminals 101 so that the second word location, for example, of the output buffer 829 and of the output shift buffer 831 will always hold data destined for the second one of the terminals 101.

Periodically, in response to a timing signal from the multiplex system 117, data is transferred bit by bit to successive ones of the terminals 101. This is done by successively interrogating for respective ones of the terminals 101 their corresponding word locations in the output shift buffer 831 to see if there are one or more bits stored therein. If there are, they are shifted and the first bit in the word location interrogated is transmitted through the multiplex system 117 to the corresponding terminal 101. As part of the process of shifting bits out of the various word locations of the output shift buffer 831, each time it is noted that a particular word location in the output shift buffer 831 is empty, a new byte is transferred into it from the corresponding word location of the output buffer 829.

The parallel transfer of data from segmented memory 805 into the output buffer 829 is done at a different time and will also be explained in much greater detail subsequently. It will be sufficient to note at this point that this process too is done sequentially for the successive word locations of the output buffer 829 corresponding to the different ones of the terminals 101. Thus, one after the other of the word locations of the output buffer 829 is examined periodically and if it is found empty the next byte in the output string in the segmented memory destined to the terminal to which that word location corresponds is transferred into that word location. Thus, for each terminal, data is periodically transmitted from the string of text which is held therefor in segmented memory 805 by periodically transferring bytes in that text through the word locations allocated to that terminal in the output buffers 829 and 831.

h. CR-SUM

It will be recalled from the brief discussion of the manner in which data is transmitted from the output string 1109 in the segmented memory 805 that, with each data block 93 transmitted there is sent a longitudinal checksum lcc which is equal to the two's complement of the sum (without carries) of the bytes in the block. It was explained that this is used by the receiving computer to verify the block by accumulating the sum (without carries) of the bytes received in the data block 93 and comparing the accumulated sum with the longitudinal checksum lcc transmitted with that data block. If the sum of these is zero, the data block 93 is stored. If not, it is purged. This technique is applied not only to data blocks 93 transmitted from the peripheral computer 119 to the central computer 123 but also to data blocks which are transmitted in the opposite direction and received at the peripheral computer. Therefore, every time a data block 93 is received in the peripheral computer 113, a running sum (modulo 128) is kept of the bytes therein as they are shifted into the receiver buffer 809. This sum is held in a one word memory location 833 labeled CR-SUM.

i. R-ACK, F-ACK, X-ACK

Each of the computers 119 and 123 additionally includes four 1-word memory locations which are involved in correcting errors in transmission between the computers. It will be recalled that each data block 93 transmitted from a given computer is given a unique serial number, that means are provided in each of the computers to accept only those data blocks whose block numbers are higher than those of data blocks received previously so as to prevent duplication of data blocks received, and that during the transmission process each computer continues to retransmit each data block until its correct receipt is positively acknowledged by the other computer.

Reference has already been made of CX-BLN 817 in which a running count of block numbers sent is kept. Each time that transmission of a data block 93 begins, CX-BLN 817 receives the block number of the last data block to have been purged from the output string 1109 in the segmented memory 805. It is then stepped by one and this new number, which is one higher than that of the last data block to have been purged, is assigned to the data block about to be transmitted.

The block number of the last block which was erased from the output string 1109 in memory is kept in the word location labeled in FIG. 9 as F-ACK 835.

In each computer one word location is devoted to storing the number of the last block that was correctly received at that computer. This word location is shown as R-ACK 837. The block number in this word location is used upon receiving each data block 93 to check whether that data block was previously received so that, if it was previously received it may now be rejected, thus preventing duplication of data blocks in the receiving computer.

As part of the transmission process between computers, each time a data block 93 is correctly received its block number is returned by the receiving computer to the transmitting computer as acknowledgment of the correct receipt of that block. When received, these acknowledgment numbers are stored in each of the computers 119 and 123 in a word location X-ACK 839 (or 839*a*).

j. The Inform Table and Control Table

There are two tables in memory which are referred to in the flow charts and which are shown in FIG. 8 as the Inform Table 841 and the Control Table 843. They are used for temporarily storing and processing control messages which are exchanged between the computers 119 and 123. The Inform Table 841 is used to store micro-encoded bytes which should be sent to the central computer. An example of such a micro-encoded byte is that which is generated when one of the terminals 101 has dialed in and a ring indication is detected by the telephone channel corresponding to that terminal.

The Control Table 843, on the other hand, is used to store micro-encoded bytes which arrive from the central computer 123 in the form of Control blocks 93*b*, are temporarily stored in a one word memory location TT-CHAR 845 while their control block is verified, and are then stored in the proper word location in the Control Table 843. They remain there until the particular control function (such as picking up the telephone) which they represent is to be carried out, at which time they are removed from the control table and are transmitted to the proper telephone channel 102.

In order to understand the functions of the Inform and Control Tables 841 and 843, let it be assumed first that one of the terminals 101 has dialed in and that a ring indication is detected by the telephone channel 102 corresponding to that terminal. This causes a ring interrupt, as has been explained in Sec.G.1.b.3., and subsequently a control block containing the microencoded byte in the Inform Table 841 should be sent to the central computer 123 to let it know that the terminal 101 has dialed in. However, this is not the kind of information that needs to be transmitted to the central computer 123 immediately. Therefore, it is desirable to set up the control block without interrupting other operations which are being performed by the peripheral computer 119. Consequently, instead of immediately transmitting a control block in response to a "ring" interrupt, a micro-encoded bit representing a "ring" is stored in the inform table entry corresponding to the terminal while that terminal is ringing. Subsequently, in spare time, when other operations have been performed, the inform table 841 is scanned, the micro-encoded byte representing the ring from the terminal is picked up, and a control block including that byte is set up in the output string 1109 in the segmented memory 805, eventually to be sent to the central computer 123. By the same token, a control block received from the central computer 123 and intended for a particular terminal 101 is first stored in a location in the Control Table 843 allocated to that terminal. Subsequently, in spare time, the control bit is read from the Control Table 843 and the instruction which it represents is passed on to the appropriate component in the set of telephone channels 102.

In the foregoing description, attention has been concentrated on the components which are within the peripheral computer 119. The central computer 123 is shown in FIG. 8 as being substantially identical to the peripheral computer 119. Thus, the segmented memory 805, the transmit and receive buffers 807 and 809, and most of the one word memory locations in the peripheral computer 119 have counterparts in the central computer 123. The manner in which these elements of the central computer 123, which are labeled with a suffix *a*, cooperate with the peripheral computer 119 will become apparent as this description proceeds.

It will suffice to note at this point, that the functions performed by the computers 119 and 121 as part of the system of FIG. 8 is that of data communication rather than that of data processing. This terminal-originated data received from the peripheral computer 119 by the central computer 123 and held in its segmented memory 805*a* is subsequently transferred to a data processing system which may be a part of the central computer 123, or may be another computer or data processing system. Similarly, terminal-destined data is put into the segmented memory 805*a* of the central computer 123 by such a data processing system for transmission to the peripheral computer 119. The manner of and means for transferring the data from the segmented memory 805*a* to the data processing system, processing it, and transferring the processed data back to the segmented memory 805*a* for transmission to the peripheral computer 119 does not form a part of the present invention and will not be described.

5. OPERATIONS PERFORMED BY THE MESSAGE BUFFERING

COMMUNICATION SYSTEM — IN GENERAL

In each of the computers 119 and 123 of the system shown in FIG. 8 operations are grouped into three priorities. Those of the highest priority are performed in "real time." That is, they are performed without delay, by interrupting lower priority operations whenever an operation grouped in the highest priority is to be performed.

A second group of operations, comprising principally those required to transfer characters into and out of the segmented memory 805 is given a second level of priority. These operations are also performed by interrupting operations of lower priorities. However, the operations of the second level priority are themselves subject to interruption by operations of the first priority. They will be referred to as being performed in "pseudo real time."

All remaining operations are performed only when the computer can spare time from its highere order priority tasks and they are referred to herein as "spare time" processing operations. Spare time operations are subject to interruptions from both real time and pseudo-real time operations.

In the description which is to follow, a very detailed description will be given with reference to FIGS. 13 through 31 of the numerous operations which are carried out by the Message Buffering Data Concentrator. FIGS. 13 through 31 are flow charts showing each of the principal steps which are performed during these operations. In order to help the reader to follow the flow charts in FIGS. 13 through 31 and to understand their significant features in carrying out the invention, all of the flow charts are shown in simplified form, in FIG. 12. It enables ready identification of those operations of the system which are performed in real time, pseudo real time, and spare time. The numbers within the blocks in FIG. 12 refer to the various operations which are illustrated in FIGS. 13 through 31. The number of each routine is based on the figure number illustrating it. All operations, also referred to as routines, which appear alone in a figure are given their figure number with the suffix A. Thus, for example, the operation illustrated in FIG. 15 is designated as the operation 15A. Where several operations are illustrated in the same figure they are assigned the figure number and additional suffixes B, C, etc. Thus, for instance, four basic operations are shown in FIG. 26 and these are labeled 26A, 26B, 26C, and 26D.

Referring further to the detailed flow charts in FIGS. 14 through 31, a single step in an operation is shown in a rectangular block. Steps which depend on the outcome of a decision are shown in a rectangular block with the question to be decided indicated in the top portion of the block and with the possible outcomes (yes or no) being indicated on the bottom portion of the block.

Frequently repeated operations, known to those skilled in in the art as subroutines, are shown in a hexagonal block, with the number of the operation being indicated above and toward the right of the hexagonal block.

The name or description of each operation appears in an oval block at the head of the blocks comprising the steps of the operation and the number of the operation appears in a small circle above the oval title block. For example, in FIG. 14 the first operation is called process clock interrupt, its number is 14A and is continued by another operation number 14B. That operation has four subroutines numbered 24B, 27B, 18A, and 20A. They may be found in FIGS. 24, 27, 18 and 20 respectively.

Returning to FIG. 12, spare time processing is performed by a set of routines collectively numbered 28A. Spare time processing is performed by the computer unless it is called upon to perform other operations. During spare time processing, the data output string 1109 in the segmented memory 805 is purged (29A), and the contents of the Inform Table 841 and of the Control Table 843 are processed (30A and 31A). As indicated by the loop 1201 in the block 28A, these operations are performed repeatedly in the order indicated.

As will be seen in the following discussion, it is very seldom that spare time processing will go on uninterrupted for any substantial length of time due to the frequency at which it is interrupted by real time operations. These are represented by the interrupt block 1301 and by the blocks 13A, 13B, 13C, 13D, 13E and 14A to which it is connected. Principally, the operations represented by these blocks involve the transfer of data into the input buffers 801 and 803, the transfer of data out of the output buffers 829 and 831 and the transfer out of and into the transmit buffer 807 and the receive buffer 809 respectively. In this connection, it will be noted that system block diagram of the Data Concentrator in FIG. 8, the lines representing flow of data into the elements referred to have reference numerals corresponding to the routines to which reference has been made. This convention is followed throughout FIGS. 8 and 12 so as to make it relatively easy to find out from the two figures what type of operations is involved in the transfer of information into and out of each element of the system shown in FIG. 8.

Some of the real time operations which are performed as a result of an interrupt signal are done randomly whenever a particular element of the system calls for immediate service from the computer. These operations are represented by the blocks 13A through 13E. A very large number of the real time operations, however, are performed in response to periodic interrupt signals to handle information received from or dispatched to the various terminals 101. These operations are represented by the block 14A in FIG. 12. Briefly, the spare time data processing operations of the computer 119 are interrupted at a frequency which is 8 times as high as that at which data bits are transmitted over a given telephone line from the terminals 101 to the computer. Each time that the computer 119 is thus interrupted, it handles one eighth the total number of terminals, so that, after each eight such interrupts it has handled all of them once. To each of those terminals which it handles, the computer 119 transmits one bit if there is a bit in the output buffer 831 awaiting transmission to the terminal. At the same time a bit is shifted into the input buffer 801 for any of the lines on which a bit is available.

Figure 21:
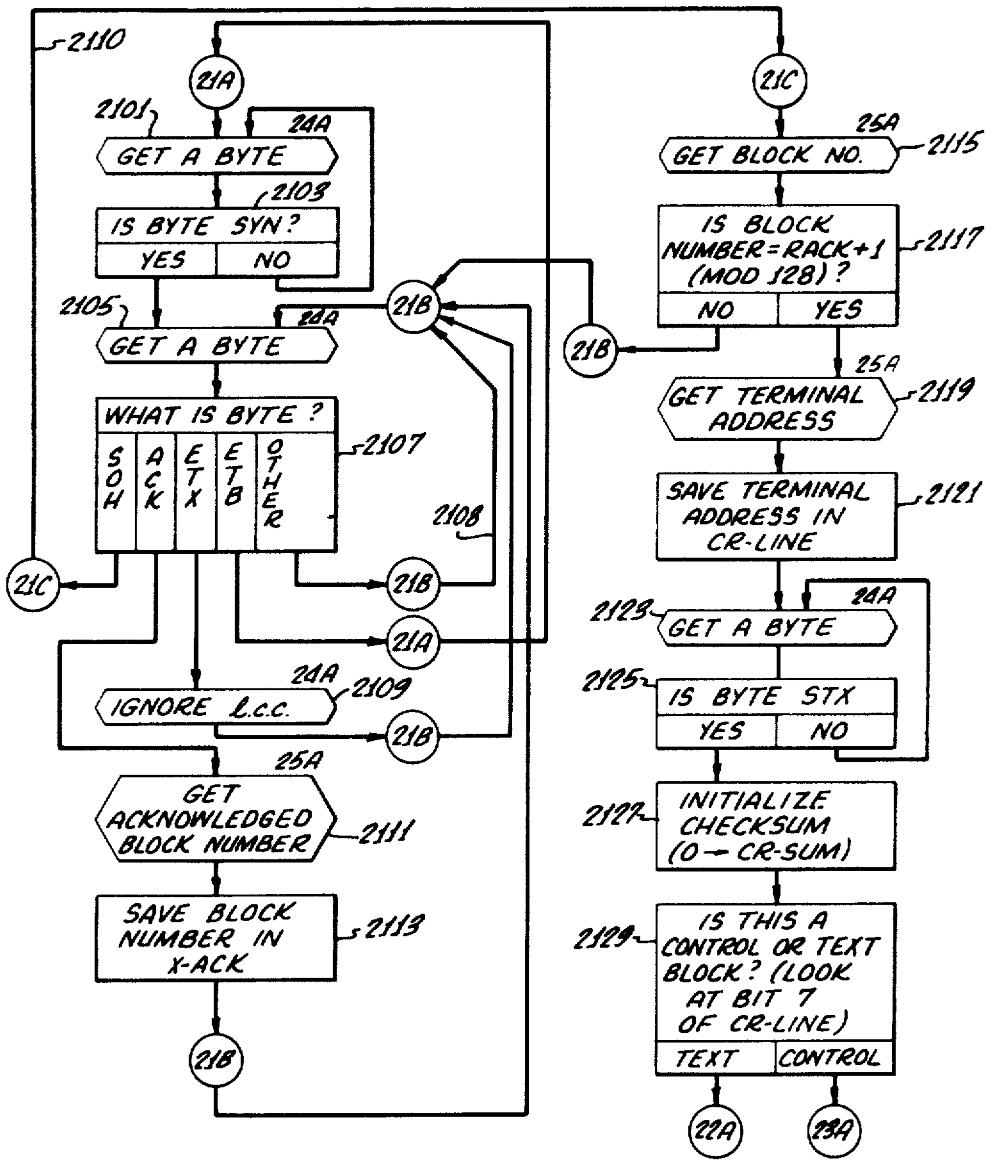
Figure 22:
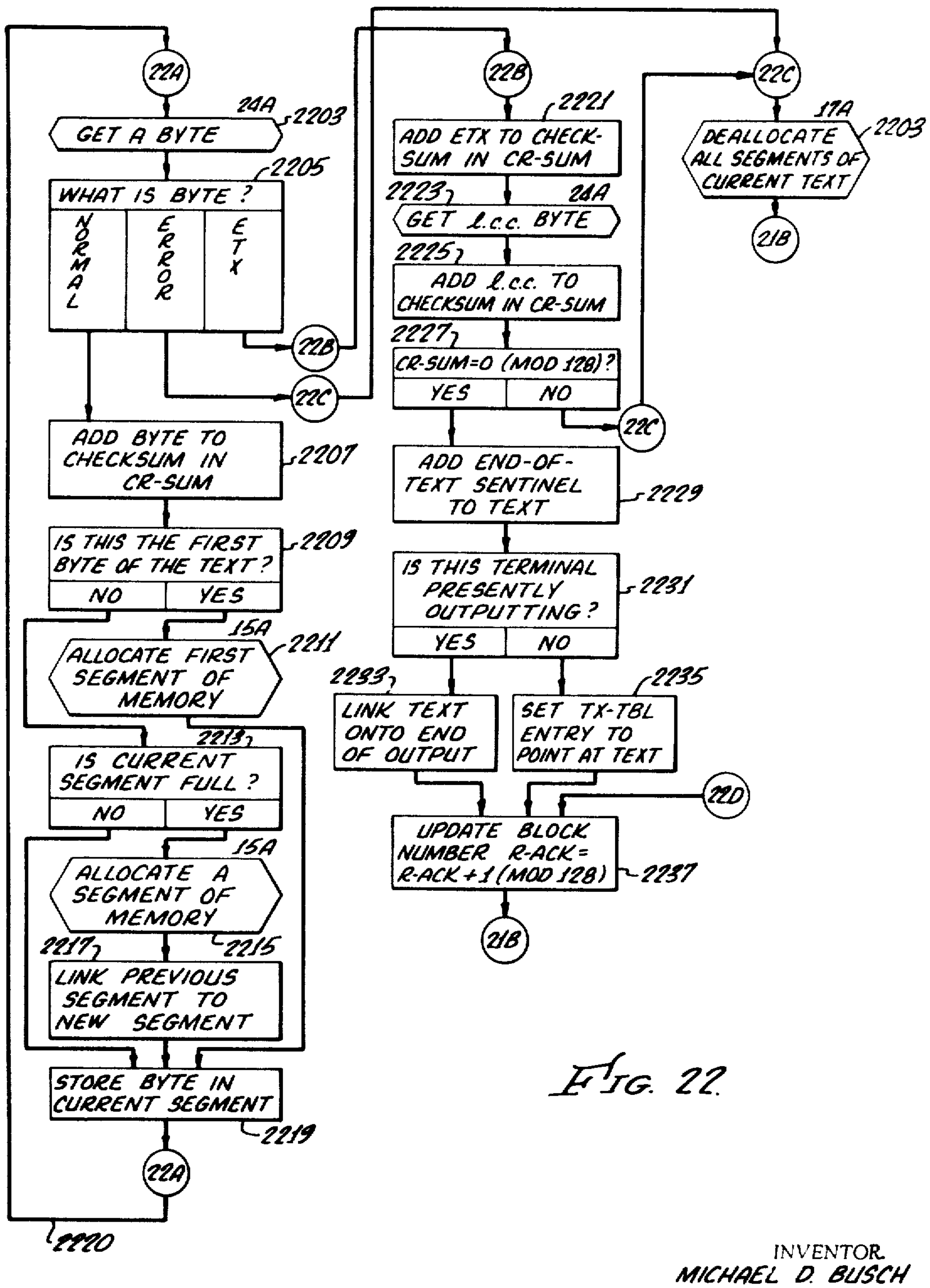
Figure 23:
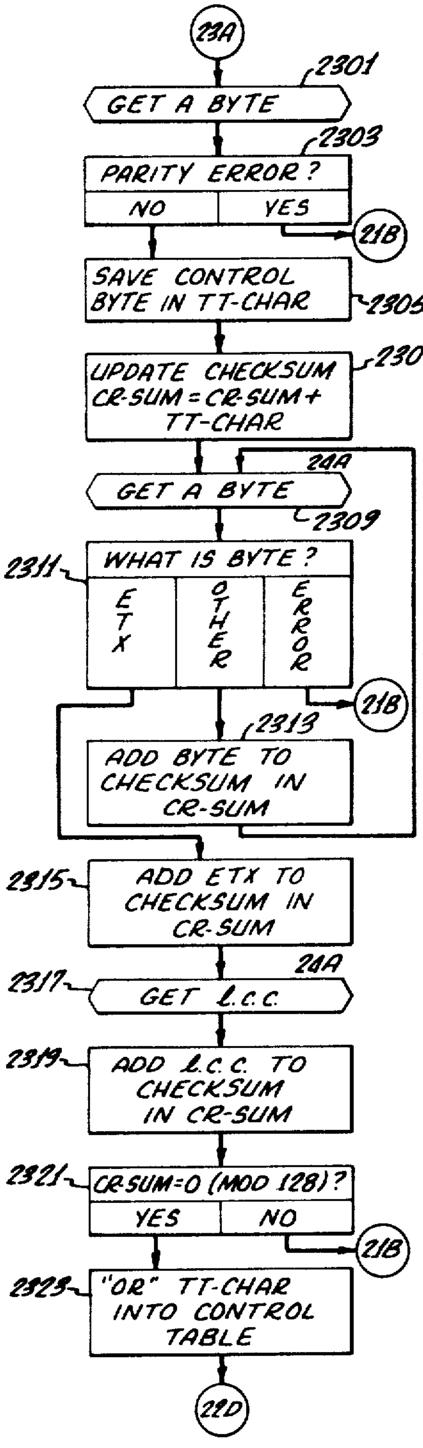

One out of a predetermined number of block 14A operations (every 88th one in the disclosed embodiment) is caused to initiate a series of four character service routines 14C which are referred to as being performed in pseudo-real time because, while they take precedence over spare time processing, they are interruptable by those operations which are performed in real time, such as those represented by the blocks 13A–13E and 14A. The first of these, represented by the block 24B involves a series of operations, parts of which are shown in FIGS. 21, 22 and 23. The function of all of the operations in block 24B is to transfer characters from the receive buffer 809 to the segmented memory 805. Briefly, the routine 24B looks for a SYN synchronizing character in the receive buffer 809 and when such a character is detected further tests are made on subsequent bytes to confirm whether the SYN character actually represents the beginning of a data message 91. If a message is indeed incoming from the central computer 123, the operations comprising the routines 24B will transfer the entire message into the segmented memory 805, performing all of the operations required to allocate the necessary memory segments and to assemble them into a string of text.

Following completion of the transfer of characters from the receive buffer 809 to the segmented memory 805 by means of 24B, the computer 119 performs its second Character Service routine, shown as the block 27B which serves principally to transfer characters from the segmented memory 805 to the transmit buffer 807. This routine continues until the 32-character transmit buffer 807 is full.

The third Character Service routine performed is that shown in block 18A for transferring characters from the input buffer 803 to the segmented memory 805. It is this routine through which several sub-strings 1107 are concurrently assembled in the segmented memory 805 for the respective terminals 101 and by which respective ones of the sub-strings once completed are connected into a single output string 1109.

The fourth and last of the Character Service routines is that represented by the block 20A and serves to transfer characters from the segmented memory 805 to the output buffer 829. As part of this routine bytes are concurrently transferred on a time-shared basis from the several strings of text 821 which have been assembled in the segmented memory 805 into the output buffer 821 for subsequent shifting through the output shift buffer 831 and transmission to the respective terminals 101 as part of the routine 14A.

Figure 13:
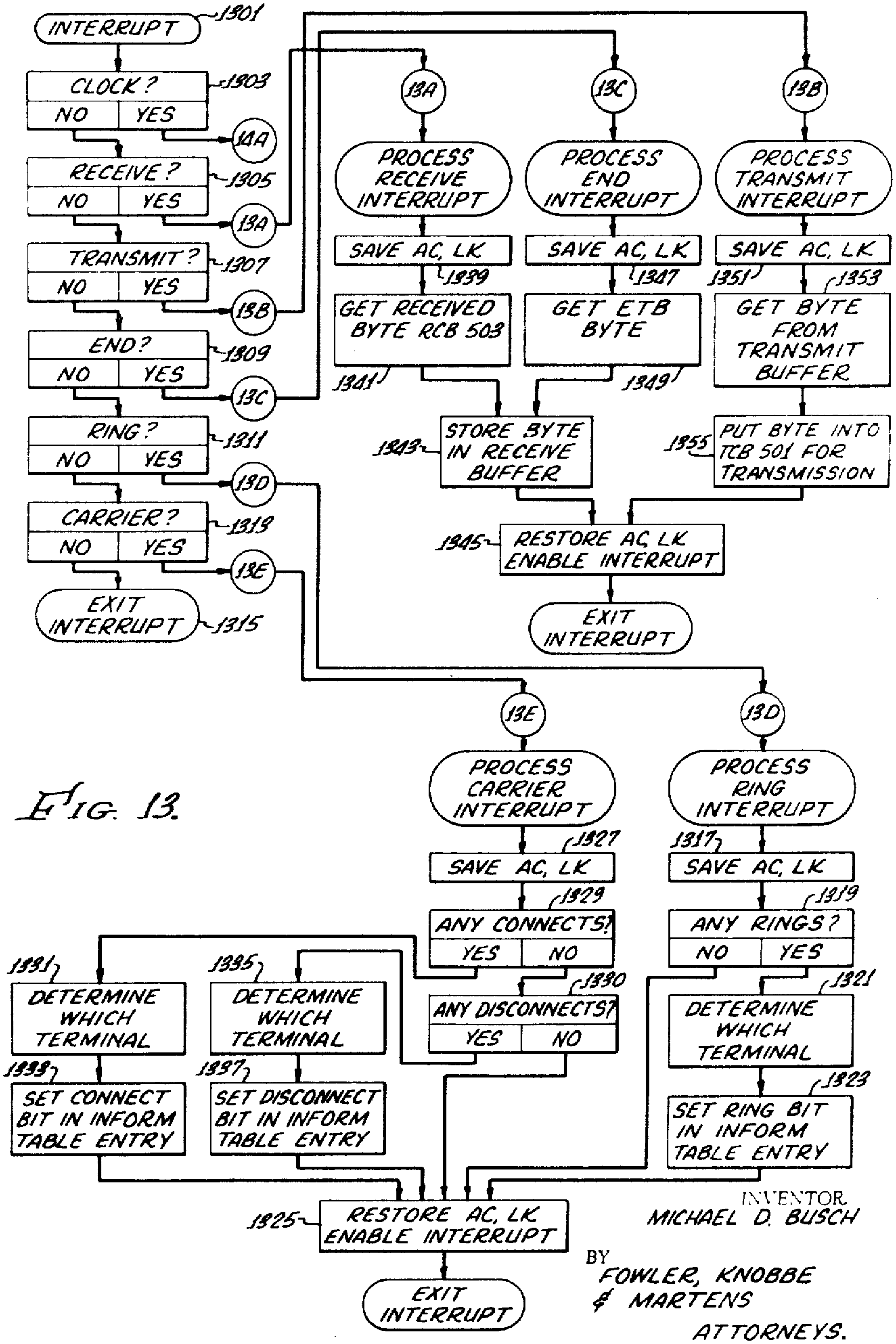
FIGS. 13 – 30 are more detailed flow charts of the operations indicated generally in FIG. 12.

6. OPERATIONS PERFORMED BY THE MESSAGE BUFFERING COMMUNICATION SYSTEM — IN DETAIL a. Low Speed Asynchronous Character Communication:

The highest priority routine performed by the data concentrator is the interrupt routine 1301 seen in FIG. 13. The interrupt routine 1301 processes both the low speed asynchronous transmission of characters between the peripheral computer 119 and the terminals 101 and the high speed synchronous transmission of characters between the peripheral computer 119 and the central computer 123. The high speed character communication will be discussed in the next section.

Recall that the clock in the serial line multiplexer 117 will generate program interrupts to the computer 119 at a rate eight times the bit rate of transmission from the terminals 101. For each clock interrupt the computer 119 will execute a TTI instruction, previously described, to examine each input line to the multiplexer 117. As each TTI instruction is performed, the computer 119 will examine the active or inactive status of the particular input line. If the input line for that instruction is determined to be inactive, the computer will proceed to the TTI instruction for the next input line. If the TTI instruction indicates that the input line is active, the computer 119 examines the count in the LSW to determine whether or not it should sample the input line. If the LSW count indicates that the input line should not be sampled, the computer 119 proceeds to the next TTI instruction for the next input line. If the LSW count indicates that eight clock interrupts to the computer 119 have occurred since that particular input line was sampled last, the computer 119 will sample that line and shift the appropriate bit into CAW and then proceed to the next TTI instruction.

Once all of the input lines to the multiplexer 117 have been examined, the computer 119 will then proceed to process the input shift buffer 801 and the output shift buffer 831, which have been previously described, for one-eighth of the terminals 101. In processing the input shift buffer 801 the computer 119 will examine the character assembly word, CAW, associated with each TTI instruction. If the CAW for a particular terminal 101 indicates that a complete character has been received from that terminal, the computer 119 will transfer the character from the CAW location into the input buffer 803 along with the address of the terminal from which the character was received.

The computer 119 will process the output shift buffer 831 by examining the characters which are being transmitted from the computer 119 to the terminals 101. If the computer 119 detects that a character has been completely transmitted from the output shift buffer 831 for a particular terminal 101 it will retrieve the next character for that terminal from the output buffer 829 and insert it into the output shift buffer 831.

Since the computer 119 will process the input shift buffer 801 and the output shift buffer 831 for one-eighth of the terminals 101 for each clock interrupt (where the clock interrupts at a rate eight times the bit transmission rate of the terminals 101), it is apparent then that each character being received from a terminal 101 will be examined once every bit time to determine whether or not the complete character has been assembled. If so, the computer 119 will remove that character from the input shift buffer 801 and place it in the input buffer 803. For the same reason, it is also apparent that the computer will examine each character being sent to the terminals 101 once every bit time to determine whether or not a complete character has been shifted out and if so the next character to be transmitted for that particular terminal will be retrieved from the output buffer 829 and inserted into the output shift buffer 831 for that terminal.

After the computer 119 has processed the input and output shift buffers 801 and 831 for each clock interrupt, it will proceed to determine whether or not is is time for character service. Recall that a character from or to a terminal 101 comprises 11 bit times. Accordingly, the computer 119 will have been interrupted by the clock in the multiplexer 117 88 times during one character time. The computer 119 keeps track of the number of clock interrupts and will proceed to the character service routine 14C after the clock has interrupted 88 times (i.e., one character time).

Figure 14:
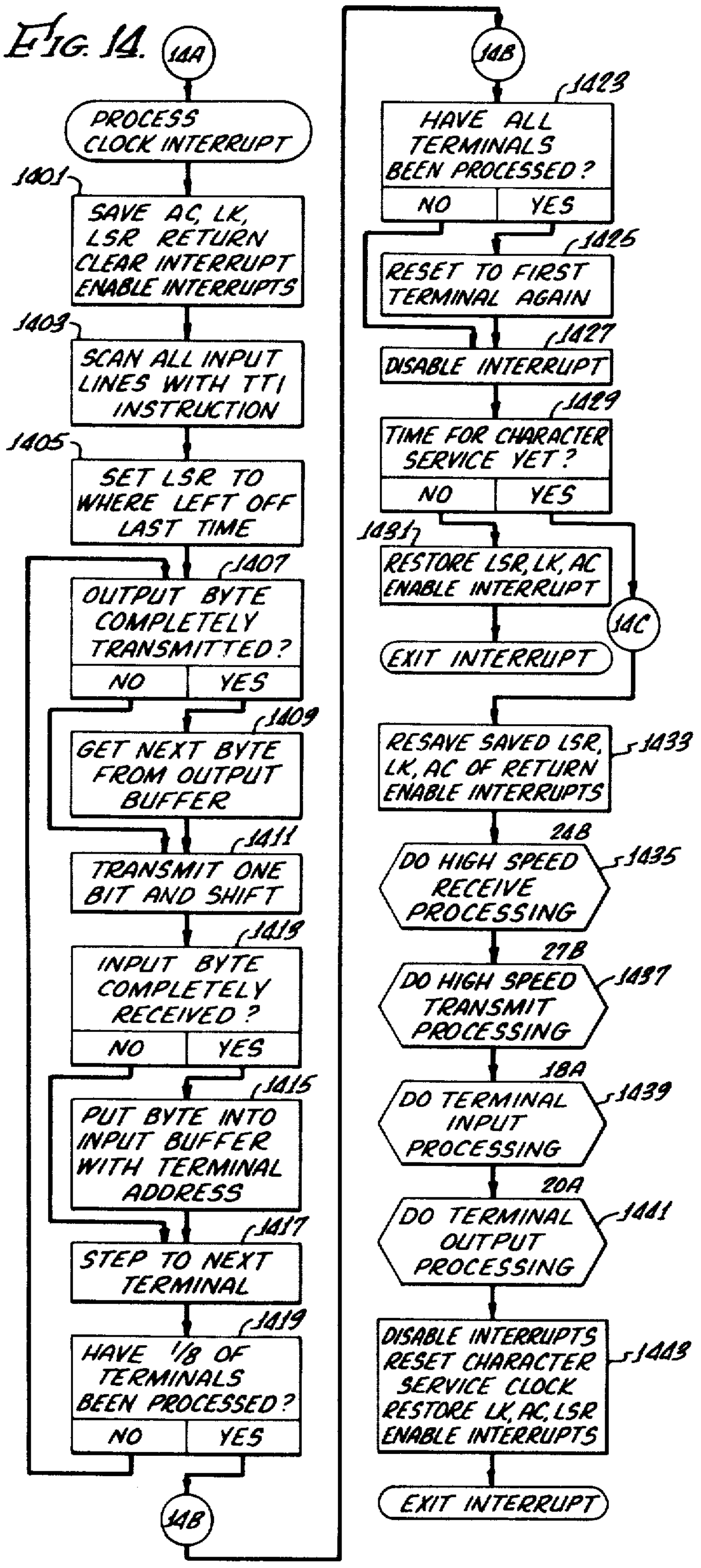
Figure 15:
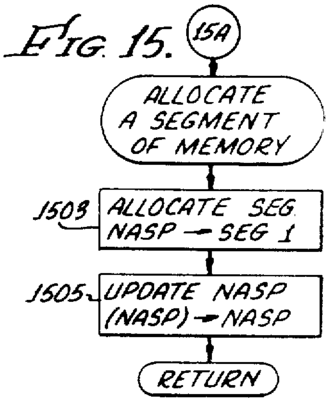

The above general description of the processing of a clock interrupt by the computer 119 is shown in detail in FIGS. 13 and 14.

In step 1303 the computer 119 interrogates the clock in the multiplexer 117 to determine whether or not it was the cause of the interrupt signal. When the computer 119 determines that the clock had interrupted, it proceeds to step 1401 in FIG. 14 where it stores the contents of the accumulator 209, the link bit, the contents of the LSR 337, and also the return address so that when the interrupt routine has been completed, the computer 119 can return to the routine which it was performing when the interrupt occurred. Also in step 1401 the computer 119 clears the clock interrupt in the multiplexer 117 and executes an interrupt enable instruction so that the computer 119 may respond to any subsequent interrupts. From this point on, the routine is "pseudo real time" and may be interrupted by a subsequent program interrupt.

The computer 119 then enters step 1403 where it scans all of the input lines to the multiplexer 117 with TTI instructions and then proceeds to step 1405.

Recall that during each clock interrupt the input shift buffer 801 and the output shift buffer 831 will be processed for one-eighth of the terminals 101. Accordingly, when the step 1405 is entered from step 1403 a number is set into the LSR 337 which corresponds to the particular terminal 101 which should be processed next, i.e., the first terminal 101 of the particular group, and continues to step 1407.

In step 1407 the computer 119 examines the character in the output shift buffer 831 which is being communicated to the terminal indicated in the LSR 337. If that character or byte has been completely transmitted, the computer 119 will retrieve the next byte to be transmitted to that terminal from the output buffer 829 by stepping to step 1409. The computer 119 then proceeds to step 1411 where it will transmit the first bit in the character just inserted into the output shift buffer 831 and shift that character one bit.

If in step 1407 the output character for the terminal 101 had not been completely transmitted, the computer 119 would have stepped immediately to step 1411 and transmitted one bit and shifted one bit.

In step 1413 the computer examines the input byte being shifted into the input shift buffer 801 from the terminal 101 indicated in the LSR 337 to determine whether or not a complete character has been received. If a character has been completely received, the computer 119 will put that character along with the address of the terminal from which that character originated into the input buffer 803 in step 1415 and then proceed to step 1417 where the LSR 337 is incremented so that the next terminal 101 may be processed. If the input byte in step 1413 had not been completely received, the computer 119 would have gone immediately to step 1417 to step the LSR 337 to the next terminal 101.

In step 1419 the computer determines whether or not one-eighth of the terminals 101 have been processed since the clock interrupt occurred. If they have not, the computer 119 will return to step 1407 to process the next terminal indicated in the LSR 337. If one-eighth of the terminals 101 have been processed since the clock pulse occurred, the computer will proceed to step 1423.

In step 1423 the computer 119 determines whether or not all of the terminals 101 have been processed. If they have, the LSR 337 is cleared and stored so that when the computer 119 processes the next clock interrupt and enters step 1405 to insert a terminal number into the LSR 337, the computer 119 at that time will begin processing one-eighth of the terminals beginning with the first terminal. The interrupts are then disabled in step 1427.

If in step 1423 all of the terminals 101 had not been processed, step 1427 would have been entered where the interrupts would have been disabled and the computer 119 would then have proceeded to step 1429 to determine whether it was time for character service (i.e., whether or not 88 clock interrupts had occurred since the last character service time).

If it is not time for character service, step 1431 is entered where the contents of the LSR 337, the link bit and the accumulator 209, which had been previously stored in step 1401 when the clock interrupt operation was initiated, are restored, the interrupts are enabled, and the interrupt routine is terminated. The computer 119 then returns to the particular routine that it was performing when the clock interrupt occurred.

If the computer 119 determines that it is time for character service in step 1429 it will proceed to step 1433 in routine 14C. In step 1433 the computer 119 will retrieve the contents of the accumulator 209, the link bit, the LSR 337 and the return address which it had stored in memory when it performed step 1401 and will store them in different locations. The interrupts are then enabled. This allows the computer 119 to process a clock interrupt, which might occur during the character service routine, without losing the information regarding the routing that it was processing when the current interrupt occurred.

The computer 119 will then execute the four character service sub-routines 24B, 27B, 18A, and 20A represented in FIG. 14 by the steps 1435, 1437, 1439, and 1441.

When sub-routine 20A has been completed the computer 119 proceeds to step 1443 where it first disables the interrupts and then resets the character service clock, examined in step 1429, by adding 88 to its current value. The contents of the accumulator 209, link bit, and the LSR 337 which were moved in step 1433 are then restored and the interrupts again enabled and the interrupt routine is terminated.

Any one of the terminals 101 may initiate a data communication to the peripheral computer 119 by generating a ring signal to the telephone interface 109. The ring signal generates a program interrupt to the computer 119 which responds to the interrupt by determining which terminal 101 has requested to send data. The computer 119 then informs the central computer 123 of this fact by an appropriate entry in the inform table 841. The computer 123 will return an instruction to the peripheral computer 119 by placing an entry into the control table 843 which causes an indication to be sent to the terminal 101 informing it that it may proceed with the communication. When the terminal 101 receives this response, it will generate a carrier signal to the telephone interface 109. The carrier signal causes a program interrupt to the computer 119 which responds by informing the central computer 123 through the inform table 843 that that particular terminal 101 is now active.

When a terminal 101 terminates communication with the computer 119, it will discontinue the carrier signal to the telephone interface 109. This will cause a program interrupt. The computer 119 will then inform the central computer 123 that that terminal 101 is now inactive by an entry into the inform table 841. The central computer 123 will send back an entry for the control table 843 which will cause the computer 119 to disconnect that particular terminal.

The above described processing of a ring or carrier interrupt by the computer 119 is shown in the flow charts in FIG. 13.

Assuming a ring interrupt has occurred, the computer 119 will proceed to the interrupt routine 1301 to determine the cause of the interrupt. It will sequentially interrogate the possible causes of the interrupt in steps 1303, 1305, 1307, 1309, and will ascertain that the cause was a ring interrupt after it enters step 1311.

The computer 119 will process the ring interrupt by proceeding to routine 13D. In step 1317, the contents of the accumulator 209 and the link bit are first stored and then the computer 119 scans all of the ring line inputs to the interface 109 in step 1319. Once it has received an indication of the status of all the ring lines, the computer 119 will examine this information in step 1321 to determine which terminal 101 had generated the ring signal. In step 1323 the computer 119 inserts a bit into the appropriate bit position corresponding to that particular terminal in the inform table 841 and proceeds to step 1325 where it restores the contents of accumulator 209 and link bit and will execute an instruction to enable the interrupts. The computer 119 will then exit the interrupt routine to return to the routine it was executing when the ring interrupt had occurred.

If the computer 119 in step 1319 had determined that none of the terminals 101 had generated a ring signal, it would have proceeded directly to step 1325 to exit the interrupt routine.

A change in any carrier signal from one of the terminals 101 to the telephone interface 109, i.e., a connect or a disconnect, will result in a program interrupt to the computer 119. The computer 119 will process this interrupt by executing routine 13E after it determines in step 1313 of the interrupt routine that a change in a carrier signal had caused the interrupt. In step 1327 of routine 13E the computer 119 will store the contents of accumulator 209 and the link bit. It will then examine the status of all the carrier signal inputs to the telephone interface 109. In steps 1329 and 1330 the computer 119 compares the status of all the carrier signal inputs with the previous status of these inputs to determine if (1) one of the terminals 101 which was previously inactive is now active or (2) one of the terminals 101 which was previously active is now inactive. In step 1329 the computer 119 tests for a recently connected terminal 101. If a terminal 101 has been recently connected, it proceeds to step 1331 where it determines which particular terminal 101 had been connected and then in step 1333 sets an appropriate bit in the inform table 841 corresponding to that terminal. The computer 119 then restores the accumulator 209 and link bit, enables the interrupt in step 1325, and exits the interrupt routine.

If in step 1329 it was determined that none of the terminals 101 had been recently connected, the computer 119 will proceed to step 1330 and examine the terminals 101 for a terminal which had recently been disconnected. If none of the terminals 101 had been disconnected, the accumulator 209 and link bit would be restored and the interrupt enabled in step 1325 and the interrupt routine would be terminated. If a terminal 101 has been disconnected, the computer 119 will go to step 1335 to determine which terminal it was. In step 1337, the computer 119 will set an appropriate bit into the inform table 841 for that terminal and exit the interrupt routine by proceeding to step 1325.

b. High Speed Synchronous Character Communication

Data characters being received by the computer 119 from the synchronous modem 125 are serially shifted into the receive shift buffer register 527, FIG. 5, as previously described. Each time a complete character has been shifted into the register 527 it will be shifted in parallel into the receive character buffer register 529 and a receive flag will be set in the control logic 505 which causes a program interrupt to the computer 119. The computer 119 will process the receive interrupt by executing the interrupt routine 1301. In step 1305 of the interrupt routine the computer 119 will determine that it was the receive flag which had caused the program interrupt. In step 1339, the computer 119 will save the contents of the accumulator 209 and the link bit and advance to step 1341. In step 1341 the computer 119 will execute a certain instruction to cause the character contained in the register 529 to be shifted into the accumulator 209. In step 1343 the character in the accumulator 209 is inserted into the receive buffer 809 in the memory 201. The computer 119 will then restore the contents of accumulator 209 and link bit and will enable the interrupts in step 1345 and then exit the interrupt routine.

The control logic 505 will also generate a receive end program interrupt when the modem 125 terminates its timing signal input on line 513 to the control logic 505. This indicates the end of a data communication. The computer 119 responds to the receive end program interrupt by processing the interrupt routine 1301. In step 1309 the computer 119 will determine that the receive end flag had caused the program interrupt and will process that interrupt by continuing to routine 13C. In step 1347 of that routine the contents of accumulator 209 and the link bit are stored. Next, the computer 119 will retrieve an ETB character from a particular location in memory and in step 1343 will store that character at the end of the data string in the receive buffer 809. The contents of the accumulator 209 and link bit are restored and the interrupts enabled in step 1345 before the computer 119 exits the interrupt routine.

Characters transmitted from the computer 119 to the synchronous modem 125 are initially shifted from the accumulator 209 into the transmit character buffer register 521. The control logic 505 will then shift this character in parallel into the transmit shift buffer register 523 and cause that character to be serially shifted to the modem 125 on line 507. Each time the control logic 505 transfers a character from the register 521 to the register 523, it will generate a transmit program interrupt to the computer 119 to indicate to the computer 119 that it must insert another character into the register 521 before the register 523 is emptied.

The computer 119 will process the transmit interrupt by executing routine 13B after it determines in step 1307 of the interrupt routine that it was the transmit flag which had caused the interrupt. In step 1351 the contents of the accumulator 209 and the link bit are stored. In step 1353 the computer 119 will retrieve the next character to be transmitted from the transmit buffer 807 in memory and in step 1355 will insert that character into register 521. The computer 119 will then restore the contents of the accumulator 209 and link bit and enable the interrupts before it exits the interrupt routine.

c. Transfer of Characters from the Input Buffer to the Segmented Memory

Figures 18, 19:
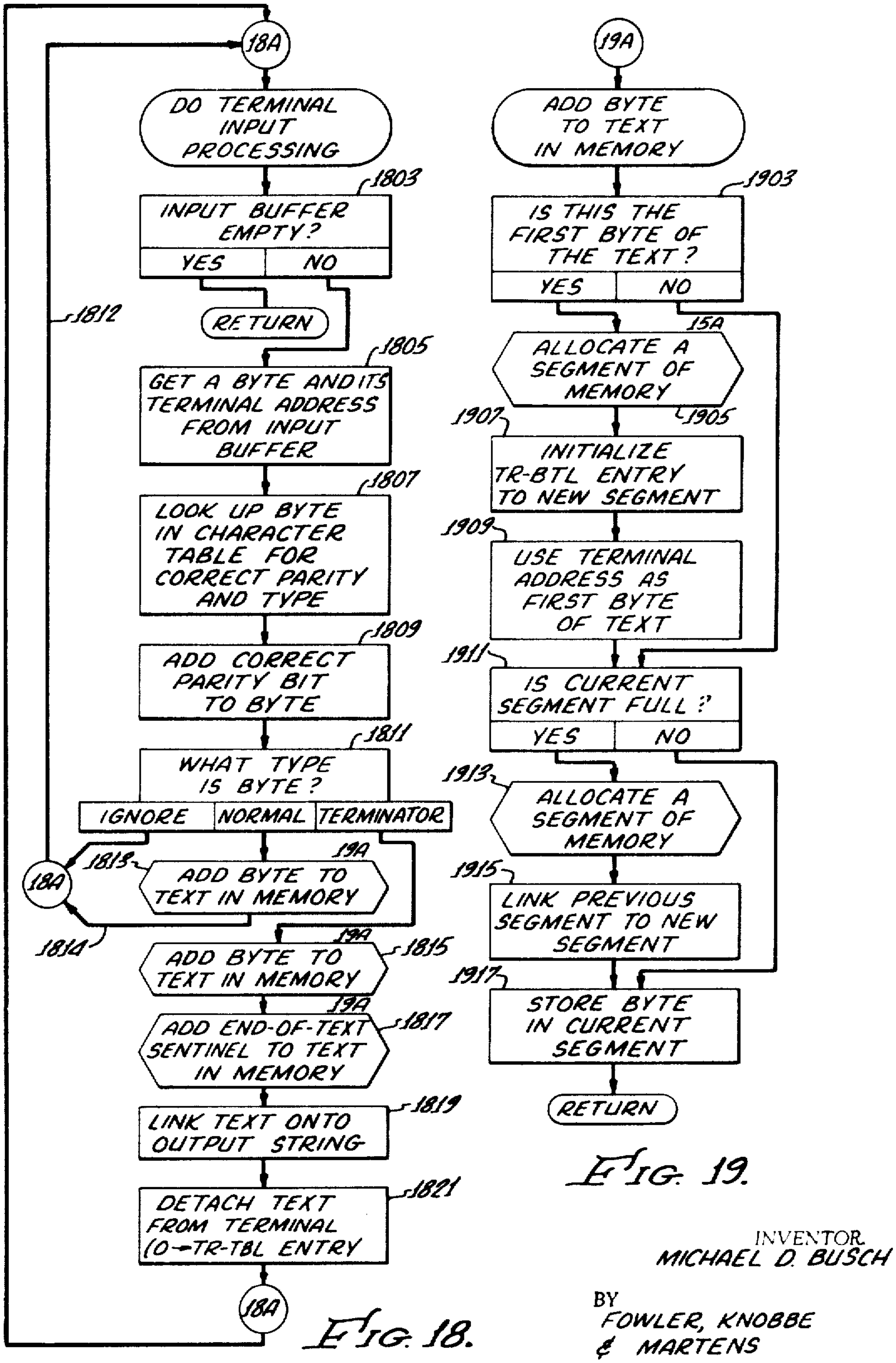
Figure 20:
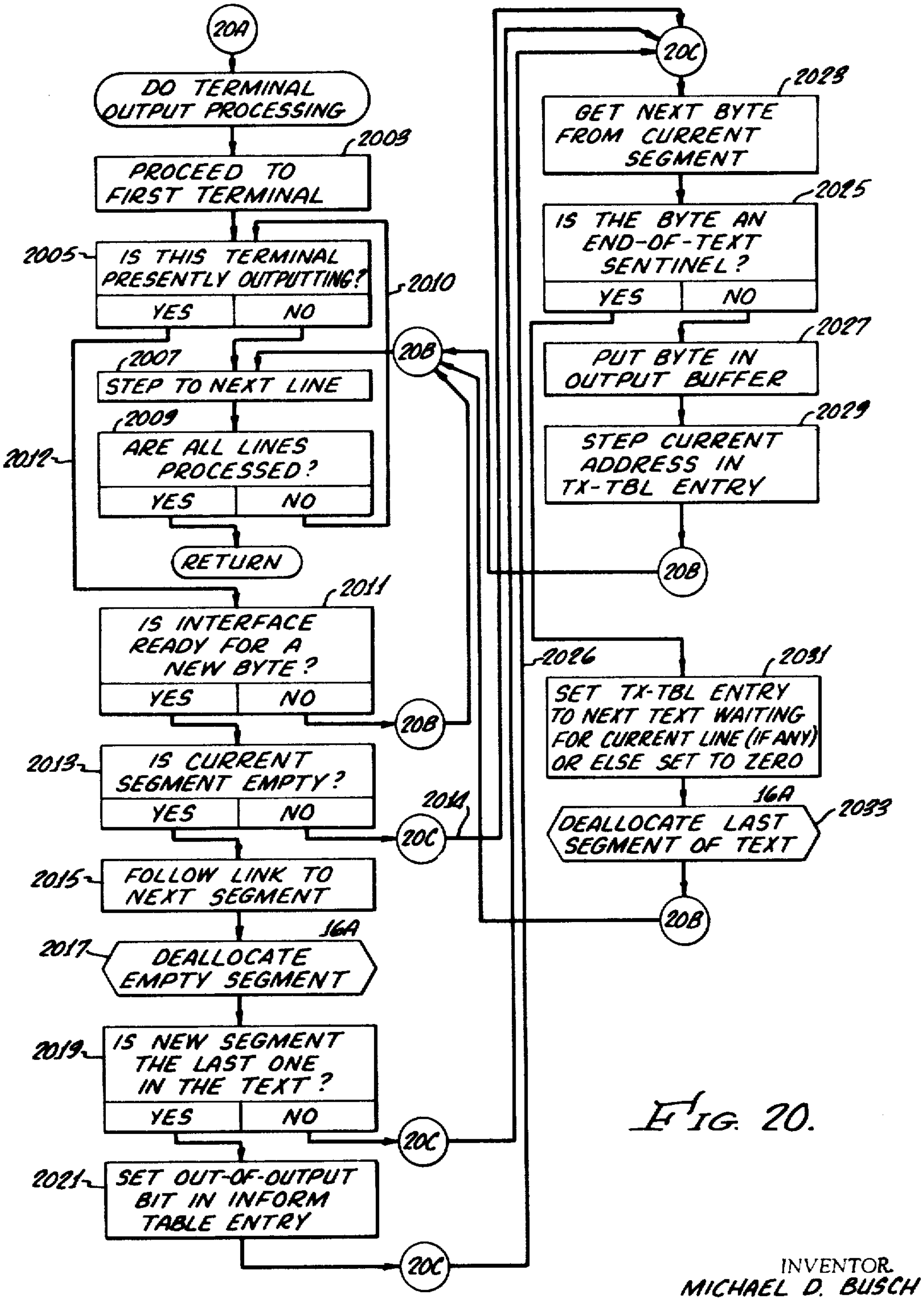

The sub-routine 18A for transferring the characters from the input buffer 803 to the segmented memory 805 is shown in FIG. 18. Its first step, shown in step 1803, is to query the input buffer 803 to discover whether or not it is empty. If it is, nothing further is done and the routine returns to the routine which initiated it, i.e., FIG. 14, Routine 14B. If there is a byte in the input buffer 803, that byte and its terminal address are taken therefrom in step 1805 and in step 1807 the correct parity and type for the byte are looked up in a character table. There are three types of bytes in the input buffer 803. They are (1) terminating characters such as a carriage return; (2) characters which should be ignored such as a delete character; and (3) all other characters which shall be called "normal." The character table (not shown in FIG. 8) comprises a block of memory locations in the memory 201. Each memory location in the block corresponds to a particular data byte so that the number of memory locations in the block is the same as the total number of different data bytes of characters which the computer 119 will process. To determine the address of the byte location in the character table which corresponds to a particular data byte, the computer 119 will add the character to the address of the beginning of the character table. This sum is the desired address. In this location, a word has been previously stored which provides the computer 119 with information regarding that particular character. For example, one particular bit position in the word informs the computer 119 whether or not the character should have a one or a zero in the parity bit position. It will also contain particular bit positions which the computer 119 can examine to determine whether the data byte is a normal byte, terminator byte, SYN byte, SOH byte, ACK byte, ETX byte or an ETB byte.

In step 1809, the parity bit supplied by the character table is added to the byte obtained from the input buffer 803. Next, in step 1811 the nature of the byte is determined. If it is of the type which is to be ignored, the routine returns through line 1812 to the beginning of the routine and its steps 1803 through 1811 are repeated to read and analyze another byte from the input buffer 803. If the character read is a normal one, step 1813 is performed, during which a sub-routine 19A is invoked to add that byte to the text in memory. This sub-routine is shown in detail in FIG. 19. The Add Byte To Text In Memory sub-routine 19A begins with the step 1903 in which a determination is made as to whether or not the byte just read from the input buffer 1803 is the first byte of a text. If it is not, the routine proceeds to step 1911 in which a determination is made as to whether or not the memory segment 1101 in which preceding portions of the text (i.e., message) are stored is full. If it is not, the routine goes directly to step 1917 which stores the byte in the next word location in the current memory segment.

If as a result of the test made in step 1903, it is found that the byte read from the input buffer 803 is the first of a message, so that there is no sub-string 1107 of memory segments 1101 in the segmented memory 805 holding preceding portions of the message, a memory segment 1101 is allocated to that byte as part of the next step 1905. This step invokes sub-routine 15A shown in FIG. 15. The first step in the Allocate a Segment of Memory sub-routine 15A is the step 1503 in which the allocate-deallocate control 812 allocates that memory segment 1101 whose address is in NASP 811. The second and final step 1505 of the sub-routine is to update NASP 811 by storing it in the address in segmented memory of the next segment in the string of available segments. This terminates the sub-routine, and it returns control to step 1905 which now leads to the next step 1907 in which the word locations in TR-TBL 813 corresponding to the terminal from which the byte originated are set to point at the segment which was just allocated to receive that byte.

A determination is again made in step 1911 to find out whether or not the current segment is full. Since the segment was just assigned the answer will be NO and the byte in question, which is the first byte of the message, will be stored in the current memory segment in step 1917.

If the test in step 1911 reveals that the current memory segment 1101 is full, control passes to the block 1913 which invokes sub-routine 15A to allocate another segment of memory to receive the byte. In block 1915 the just filled memory segment 1101 is linked to the newly allocated memory segment 1101 by storing a linking byte in the just filled memory segment 1101 representing the address of the newly allocated memory segment 1101. Once the newly allocated memory segment 1101 has thus been linked to the previous memory segment 1101 the current byte is stored in the newly allocated memory segment (block 1917).

The process just described, by which successive bytes in a message 91 are added to the text in the memory 805 continues as the routine 18A loops repeatedly through its steps 1803–1813 until a byte is read from the input buffer 803 which is found during step 1811 to be a terminator character. When this occurs, the step 1815 in the routine 18A follows the step 1811 and as part of that step an End of Text sentinel is added to the text in the segmented memory 805 using the sub-routine 19A. When the end of text sentinel character has been made part of the sub-string 1107 which has been built up by the routine 18A, the sub-string is linked to the output string 1109 in the manner described in section C.4.b. Finally, in step 1821 the sub-string 1107 containing the text or message 91 just completed and which has just been attached to the output string 1109 is detached from the TR-TBL 813 by zeroing out both entries in TR-TBL 813 corresponding to the terminal for which the sub-string was assembled.

The terminal input processing routine 18A and its sub-routine 19A were described with reference to only one input terminal 101. That is, the routine was described only with reference to assembling a single sub-string 1107 in the segmented memory 805. It will be realized of course, that each time that a new byte and its terminal address are taken from the input buffer 803 by the step 1805 that byte may, and probably will, be a part of a different message 91 and will have come from a different one of the terminals 101. Thus, data bytes are presented by the input buffer 803 for transfer into the segmented memory 805 in a random manner and, as explained previously with reference to step 1905, each time the routine 18A finds that a given byte taken from the input buffer 803 is the first byte of a message 91, it allocates a new memory segment 1101 to that byte. Subsequent data bytes in the respective messages are stored in the respective allocated memory segments 1101 and in those which are subsequently linked to them so that several sub-strings 1107 are concurrently assembled in the segmented memory 805.

The routine 18A continues until the input buffer is found to be empty during the step 1803, at which time the routine returns to the point in the character service routine series 14C at which it was called up, so that the following sub-routine in the series may begin.

d. Transfer of Characters from the Segmented Memory to the Output Buffer

The function of the sub-routine which is to be discussed next is to transfer the strings of text 821, a byte at a time, from the segmented memory 805, where they were assembled by the routine 240, to the Output Buffer 829. The sub-routine 20A of FIG. 20 performs this function. As part of the process, all of the terminals 101 are scanned by the use of the multiplex unit 117 and those that require service, i.e., that have text stored in the segmented memory 805 for delivery to them, are serviced. The first part of the process is to proceed to scan the first of the terminals 101 (step 2003). Next, a determination is made as to whether there is any information or text in the segmented memory 805 destined for that terminal (step 2005). This is detected by interrogating the word location in TX-TBL 825 corresponding to the terminal. If there is an address in that word location, it means that there is text in the segmented memory 805 for the terminal. If it is found after step 2005 that there is no text for the terminal in question, the routine steps to the next line (step 2007) and determines whether or not all lines have been processed, that is, whether or not the routine 20A has been carried out for all of the terminals 101. If the answer is YES, it means that the routine for transferring data from the segmented memory 805 to the output buffer 825 has been completed and the sub-routine terminates by returning to the routine 14C so that the following step in that routine may be performed. If the answer is NO, meaning that one or more lines remain to be serviced, the routine loops back through the line to 2010 to the step 2005 and the process of interrogating the TX-TBL 825 is begun anew.

Assuming that this time the interrogating of TX-TBL 825 reveals that there is data in the segmented memory 805 destined for the terminal being serviced, the routine proceeds directly from the step 2005 to step 2011 as indicated by the connecting line 2012 between them and as part of the step 2011, the output buffer location corresponding to this terminal is interrogated to determine whether or not it is ready for a new byte. If it is not, i.e., if it contains a byte not yet moved to the output shift buffer 831, the routine for that terminal cannot continue. Therefore, if the answer is NO, the routine for that terminal ends and returns through line 2014 to step 2007 where the system is stepped to the next line and the following steps are repeated for that line.

If it is determined during step 2011 that the output buffer 829 is ready for a new byte for the terminal being serviced, another test is performed during step 2013 to find out if the memory segment 1101 whose address is in the word location of TX-TBL 825 corresponding to the terminal being serviced is empty. If it is, then, in step 2015, the link of that segment is followed to the next segment in the string 821 in the segmented memory 805 intended for the terminal being serviced, and the empty memory segment 1101 is deallocated during the next step 2017.

Figure 16:
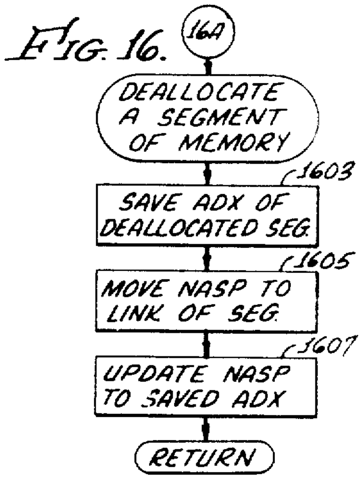

Deallocation of the empty segment called for during step 2017 is carried out by a separate sub-routine 16A. Referring to FIG. 16, the purpose of deallocating a memory segment which is found to be empty is to return it to the list of available memory segments. The first step in the process, step 1603, is to save the address of the memory segment 1101 which is to be deallocated. A one word location is provided in the memory 201 for this purpose but is not shown in FIG. 8. Next, in step 1605, the memory segment to be deallocated is linked to the first memory segment of the list of available memory segments, the address of which is in NASP 811. This linking is achieved by transferring the address of the first available memory segment 1101 from NASP 811 to the link of the memory segment 1101 which is to be deallocated. Finally, in step 1607 NASP 811 is updated by storing in it the address of the memory segment which was temporarily saved during step 1603. As a result, NASP 811 now points to the just deallocated memory segment 1101 making it the first in the list of available memory segments 1101.

Summarizing, as part of the routine 16A a memory segment 1101 which has been found to contain no data has been detached from the string of which it was a part and has been attached instead to the list of available memory segments 1101 and has indeed been made the first of them to be allocated on the basis of the address in NASP 811.

Once the sub-routine 16A has completed deallocation of the memory segment in question, it returns control to the routine which called upon it, i.e., the routine 20A. The next step to be performed is step 2019 during which a determination is made as to whether or not the new segment to which the routine proceeded during step 2015 is the last one in the text intended for the terminal being serviced. If it is, an "out of output" bit is set in the word location in the Inform Table 841 corresponding to the terminal 101 being serviced (step 2021). At a later time, during spare time processing, a control block will be sent to the central computer 123 to inform it of the fact that the terminal being serviced is about to run out of information.

After the Out of Output bit has been placed in the Inform Table 841 (step 2021), the routine 20C is begun. This routine is simply a continuation of the principal routine 20A for terminal output processing. It includes four steps whose purpose is to transfer a byte from the segmented memory 805 to the output buffer 829. It will be noted from FIG. 20 that the routine 20C for transferring a byte from the memory 805 to the output buffer 829 may be begun after any one of the steps 2013, 2019 and 2021. Thus, if during step 2013 it is found that the current memory segment is not empty, the subsequent steps 2015 through 2021, directed to proceeding to a following memory segment, are superfluous and the steps of the routine 20C for actually transferring a byte from the current memory segment may be carried out. Similarly, should it become necessary to proceed to the next memory segment and to carry out the steps 2015 and 2017, if during step 2019 it is found that the new memory segment is not the last one in the text intended for the terminal being serviced, then the step 2021 for signalling the end of the output string for the terminal being serviced becomes unnecessary and the transfer of the data byte from the new segment may be begun.

Referring to routine 20C, the first step 2023 is directed to the actual transfer of the data byte from the current memory segment 1101 to the output buffer 829. During the following step 2025 a test is made to determine if the byte just transferred to the buffer 829 is an End of Text sentinel. This is determined by direct comparison. If it is, it indicates that the byte just transferred is the last byte in the text intended for the terminal being serviced. Accordingly, the routine 20C proceeds directly through the line 2026 to step 2031. During the latter step the entry in TX-TBL 825 is set to the address of the next string of text 821 in the segmented memory 805 intended for the terminal being serviced. If there is none, the TX-TBL entry for the terminal being serviced is set to zero to indicate that fact. Next, during step 2033 the memory segment from which the end of text sentinel has been transferred during step 2023 is deallocated, using the sub-routine 16A. After this has been done, the routine 20C returns through line 2014 to the entry point 20B of the routine 20A which leads again into step 2007. At this time, as part of the step 2007, the routine is stepped to the next line to be serviced and the entire procedure for servicing a line is repeated.

If during step 2025 the byte which was transferred during step 2023 from the current memory segment 1101 is not found to be an end of text sentinel so that it is not the last byte in the text awaiting transmission to the terminal being serviced, the step which follows 2025 is 2027 during which the byte is transferred to the output buffer 829. Concurrently the address in the TX-TBL location corresponding to the terminal being serviced is updated to point to the next word location in the memory segment from which the byte was just transferred (step 2029). After this has been done the routine 20C is completed and it returns through line 2014 to the entry point 20B of the routine 20A.

In summary, the routine 20A steps from line to line and at each line it pauses to transfer one byte from the string of text 821 in the segmented memory 805 which is awaiting transmission to the terminal whose line is being handled.

In servicing each of the lines, the routine 20A operates not only to transfer data bytes from the segmented memory 805 to the respective lines which it services but it also performs certain "bookkeeping" functions should they become necessary. Thus, if it finds a memory segment empty it deallocates it and makes it part of the list of available memory segments (steps 2013 through 2017). And, if it finds that a particular memory segment holds the end of a message for a particular terminal it causes a proper signal to be sent to the central computer 123 to inform it of that fact.

The sub-routine 20A continues until all of the lines have been processed as indicated by an affirmative answer in the question stated in the block representing step 2009. When this occurs the sub-routine returns to the Character Service routine 14C by which it was called and the next sub-routine in that routine may be then carried out.

e. Transfer of Characters from the Receive Buffer to the Segmented Memory

Figure 12:
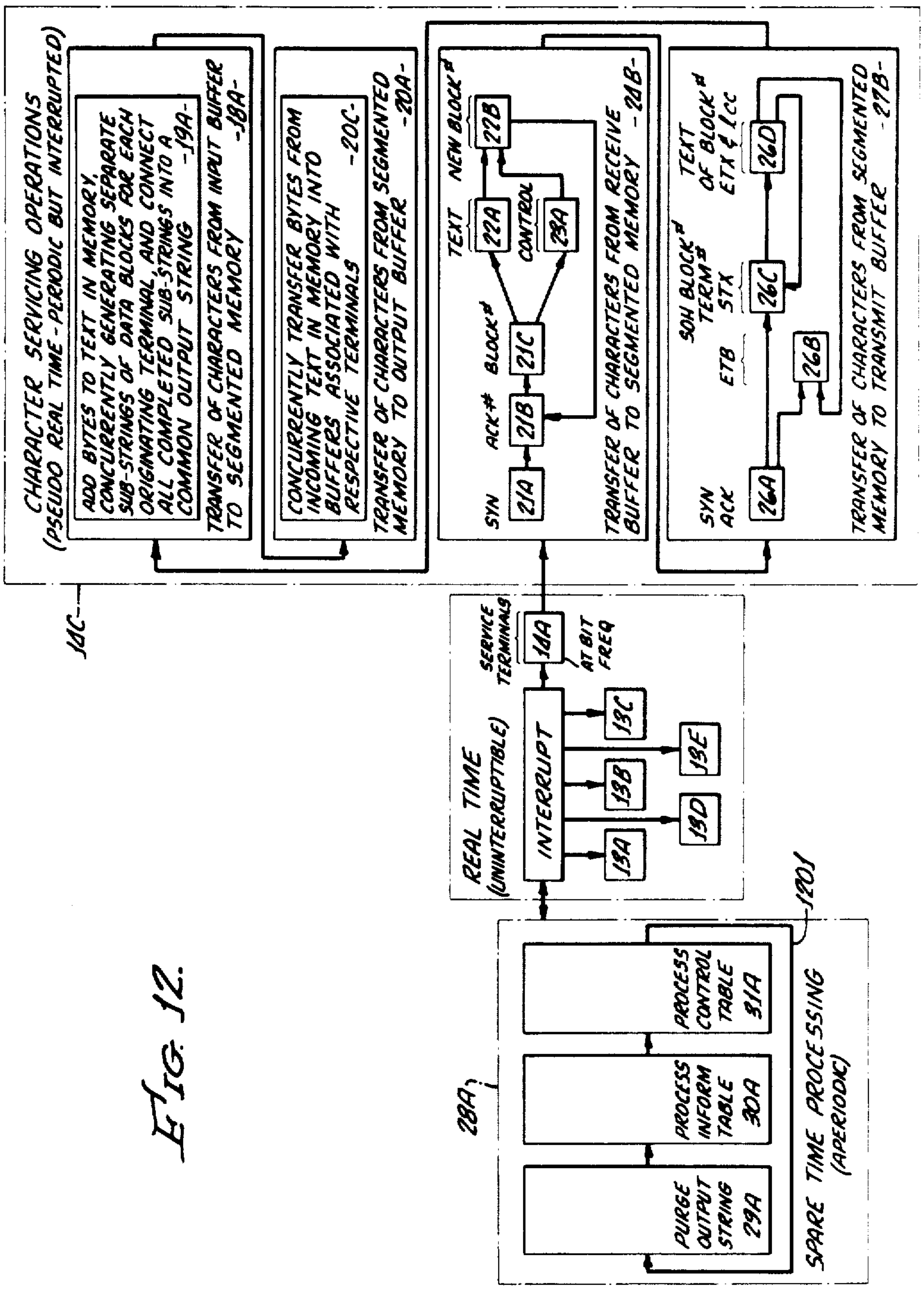
FIG. 12 is a simplified flow chart of the operations carried out by the system of FIG. 8.

The process through which characters are transferred from the receive buffer 809 to the segmented memory 805 is fairly involved, as may be seen by referring to FIG. 12, block 24B. Generally, the process involves shifting bytes into the receive buffer 809 and ignoring them until a SYN character is received. This is a function of the sub-routine 21A. Once a SYN character is received, the sub-routine 21B looks for an SOH character. Once this is received, the block number of the incoming data block is stored by routine 21C and a determination is made as to whether the data block 93 is a text block or a control block. If it is a text block, all of its data bytes are shifted from the receive buffer into the segmented memory 805 by routine 22A. If it is a control block, its bytes are similarly shifted by routine 23A. Eventually an end of text character ETX is received. In response to this, the routine 22B performs several checks on the data block which was just read into the segmented memory 805 by the preceding sub-routines 21A, 21B, 21C, and 22A or 23A. If the data block is found to have been received correctly, the block number in R-ACK 837 is updated by one and the sub-routine 223 loops back to the sub-routine 21B looking for the acknowledge number of yet another data block. This process continues until there are no further bytes in the receive buffer 809.

Figure 24:
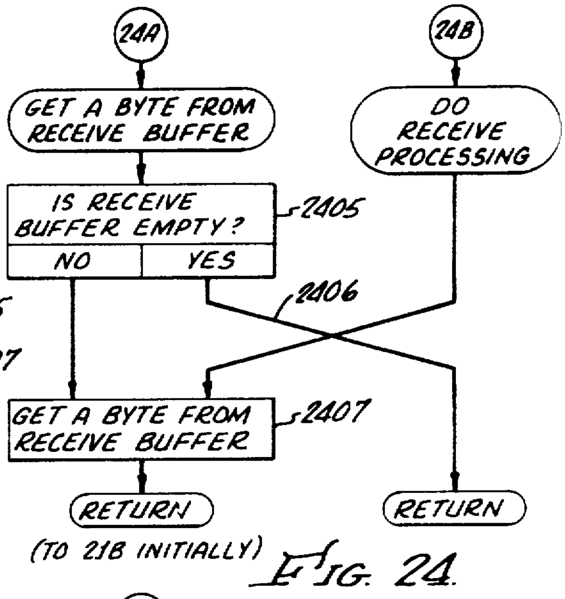

Turning now to FIG. 24 for a detailed discussion of the routine 24B, the first and only step in this general routine is step 2407 which causes a byte to be taken from the receive buffer 809. The step 2407 is properly part of another sub-routine 24A and after the step 2407 has been completed the sub-routine 24A returns to the routine which called upon it. Initially, however, when the step 2407 is initiated by the sub-routine 24B, it returns to the sub-routine 21A which is the first sub-routine involved in the process of transferring characters from the receiver buffer 809 to the segmented memory 805.

The first step in the routine 21A is 2101 which calls upon the sub-routine 24A to get a byte from the receive buffer 809. Turning again to FIG. 24, the first step in the sub-routine 24A is 2405 in which a determination is made as to whether or not the receive buffer 809 is empty. If it is empty a return is made to the routine which called upon the sub-routine 24B so as to effectively end the whole process for transferring data from the receive buffer 809 to the segmented memory 805. This, of course, follows since the transferring process should end if there is nothing to transfer. If on the other hand it is found during step 2405 that the receive buffer is not empty, the next step 2407 in the sub-routine 24A is performed and another byte is taken from the receive buffer 809. Following this, the routine returns to the point in the original routine at which the sub-routine 24A was invoked, namely step 2101 in the routine 21A. During the following step 2103 the byte which was just taken from the receive buffer 809 is tested to determine whether or not it is an SYN character. If it is not, the sub-routine 21A loops back to step 201 to get another data byte from the receive buffer 809 because at this point it is only interested in detecting an SYN character. This, it will be recalled from FIG. 10, is the first character in a message 91.

If it is found during step 2103 that the data byte is an SYN character, another byte is transferred by again resorting to sub-routine 24A during step 2105. This data byte is examined during the next step 2107 to determine what it is. If it is an SYN character, it falls in the category "other" listed in the "what is byte" table 2107 in FIG. 21. This being the case, the routine 21B loops back through line 2108 to step 2105 and another byte is obtained from the receive buffer 809 through the sub-routine 24A. Recalling from FIG. 10 that there are 4 SYN characters, it may be seen that this looping back process may be repeated. How many times will depend on how many SYN characters it takes to get the receiving equipment into synchronism. Until it is synchronized, the equipment will not process a SNY character. The first byte thus read from the receive buffer following the last SYN character should be an ACK character. It if is, control is transferred to step 2111 which calls upon sub-routine 25A to get the acknowledged block number which is part of the acknowledge block 103 (FIG. 10).

Figure 25:
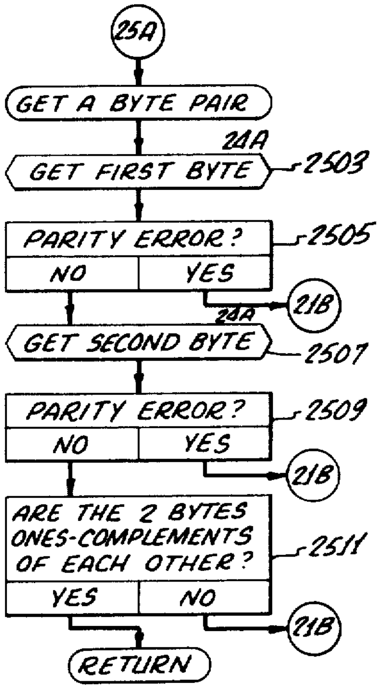
Figure 26:
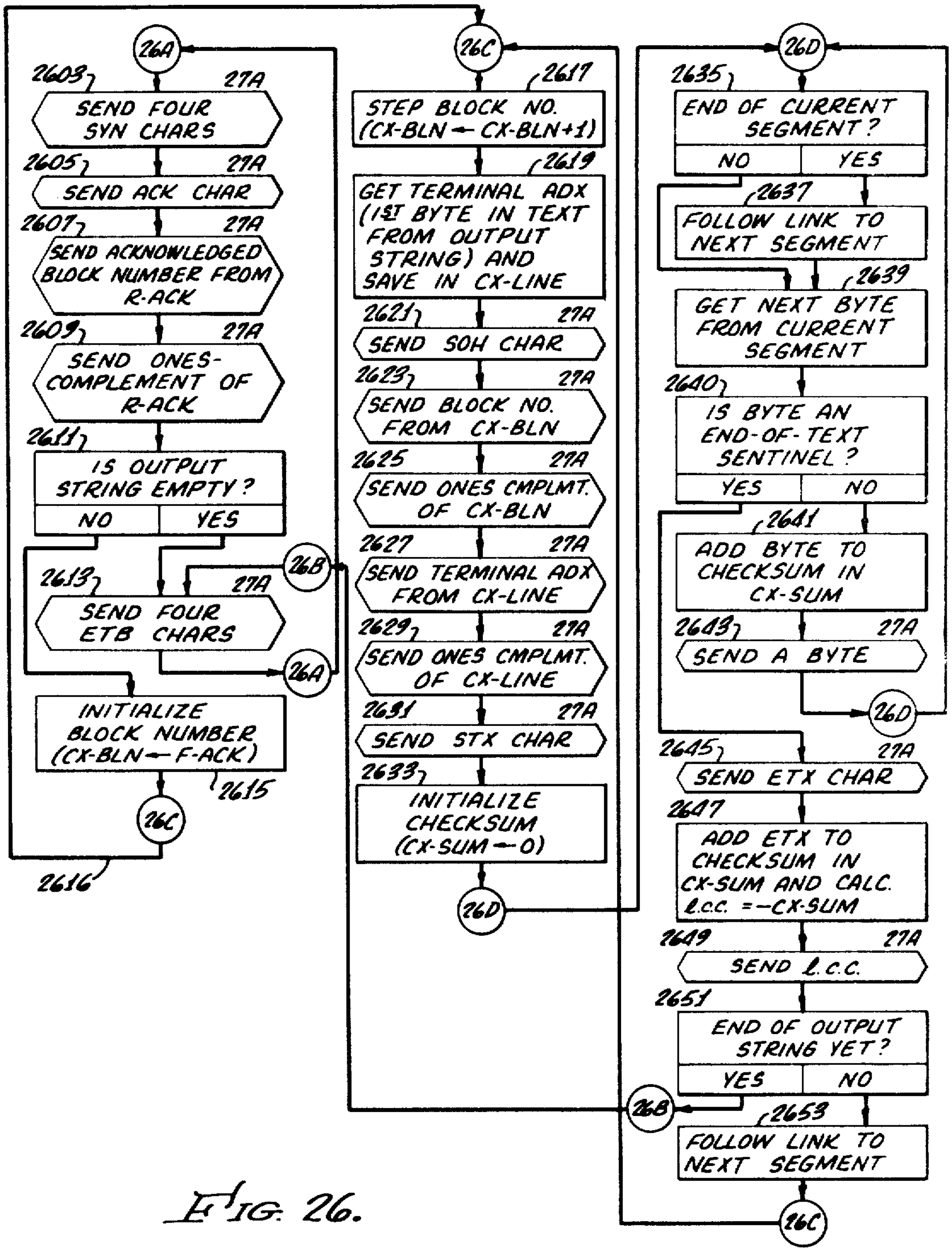

Referring to FIG. 25, the sub-routine 25A is directed to getting any pair of bytes such as ack # and ack # *. The first step in the sub-routine 25A for getting a byte pair is the step 2503 which in turn calls for yet another sub-routine 24A for obtaining the first byte of the pair to be obtained. In the manner just described with reference to sub-routine 24A the first byte of the byte pair, ack # is taken from the receive buffer 809. During the following step 2505 a parity check is carried out on that byte to verify that the byte was received correctly. If there is a parity error, the sub-routine 25A returns to the routine 21B in FIG. 21 and enters at step 2105 which causes the next byte to be read from the receive buffer 809.

If 2505 in the sub-routine 25 reveals no parity error in the ack # byte, the next byte ack # * of the acknowledge block 103 is obtained during the step 2507, which again invokes sub-routine 24A to obtain that byte from the receive buffer 809. Again, a parity check is done on the ack # * byte during step 2509 and again if this byte fails the parity test control returns to routine 21B in FIG. 21.

If the ack # * byte passes the parity test, then, during the following step 2511 a determination is made as to whether or not the bytes ack # and ack # * are ones-complements of one another as they should be. If they are not, control is again returned to sub-routine 21B in FIG. 21. If the two bytes pass the ones-complement test, the sub-routine 25A is terminated and control is returned to the routine which invoked the sub-routine 25A, i.e., to step 2111 in FIG. 21. It should be remembered during the following discussion that the sub-routine 25A is not limited to transferring the ack # , -ack # * byte pair from the receive buffer 809 but is equally adapted to transfer any data byte and its ones-complement, such as the block # - block # * and the term # - term # * byte pairs, from the receive buffer 809.

Having transferred the ack # byte from the receive buffer 809 and having verified that it was received correctly, it is next saved during step 2113 in the memory location X-ACK 839 to be used subsequently in the purging of the output string 1109 in the segmented memory 805.

With ack # stored away in X-ACK 839, the routine 21B next loops back through line 2108 to its initial step 2105 which causes the next byte to be read from the receive buffer 809, through sub-routine 24A. This byte should be an SOH character. If it is, control is transferred through line 2110 to sub-routine 21C. During the first step 2115 of sub-routine 21C the sub-routine 25A is invoked to get the block #, which should be the character immediately following the SOH character, from the receive buffer 809. In the course of performing the steps of the sub-routine 25A the block # and the block # * bytes are taken from the receive buffer 809. Each is checked for correct parity and they are also checked for being the ones-complements of one another. If they pass all of these tests, the sub-routine 25A returns control to the routine 21C which then performs the next step 2117 which is a test to determine whether or not the block # is one greater than the block number of the last data block which was successfully received and which was stored in R-ACK 837. If the block # fails this test it is an indication that the data block which is to follow has already been correctly received and should not again be entered. Or else, one or more blocks have been missed. Consequently control is returned to the sub-routine 21B. It would have been noted that, when a data byte is read from the receive buffer 809 during the routine 21B following the failure of the block # to pass its test control is returned to the beginning of that routine, causing the routine 21B to shift another byte from the receive buffer 809, and to repeat this until all of the bytes of the data block involved have been read out of the receive buffer 809. However, none of these data bytes are stored in the segmented memory so that in effect all of them are ignored.

Assuming that step 2117 showed that the block # just received is one greater than that stored in R-ACK 837 the next step 2119 in the routine 21C is carried out. This step invokes sub-routine 25A to obtain from the receive buffer 809, and to verify, the term # character which should be the next character read out of the receive buffer. If the term # has been correctly received it is saved in CR-LINE 823 during step 2121 for subsequent use in interrogating TX-TBL 825. After storing term #, sub-routine 24A is used during the next step 2123 to get the next byte from the buffer 809. It is tested during the following step 2125 for being the STX character which it should be. If it is not, the preceding step 2123 is repeated and another byte is obtained from the receive buffer 809. If the next byte is an STX character, the CR-SUM memory location 833 is set to zero in step 2127 in preparation for accumulating therein a running sum modulo 128 of the bytes received in the data block to be shifted into the segmented memory 805 from the receive buffer 809. A determination is then made in step 2129 as to the nature of the data block in the receive buffer 809. This is done by examining the 7th bit location in CR-LINE 823 which holds the term # of the data block. As explained previously in Section C.2., with reference to the distinction between data blocks and control blocks, if the incoming data block is a control block 93*b*, the 7th bit of its term # is set to 1. If it is a text block 93*a* the 7th bit of its term # is set to 0.

Let it be assumed first that the 7th bit of the term # in CR-LINE 823 is found to be zero, i.e., that the data block in the receive buffer 809 is a text block. This being the case, the bytes of the text in the text block will be transferred from the receive buffer 809 to the segmented memory 805 under the control of the routine 22A. Referring to FIG. 22, the routine 22A for obtaining bytes of the text in the receive buffer 809 begins with step 2203 which invokes sub-routine 24A to get the next byte from the receive buffer 809. After that byte has been read from the receive buffer 809, it is tested during step 2205 to determine whether it is a normal byte, an incorrectly received byte, or an ETX byte. If it is a normal byte, the routine continues to step 2207 in which the byte is added (modulo 128) to the check sum stored in CR-SUM 833.

A test is then performed during step 2209 to determine whether or not the byte is the first of the text in the data block. In the present case, the answer will be yes, and the next step 2211 will invoke sub-routine 15A to allocate a segment of memory to the incoming byte. After this, the routine 22A proceeds directly to step 2219 and stores the byte in the current memory segment 1101 which was just allocated during the step 2211. The routine then loops back through line 2220 and repeats the steps 2203 through 2209 for the next byte in the receive buffer 809 unless there is something wrong with it.

During step 2213 which follows step 2209 for the second text byte, a test is made to determine whether or not the current memory segment 1101 is full. In this case, it will not be full since there will be only a single byte in it. Therefore, the process continues directly to step 2119 and the byte is stored in the current segment. The sequence involving steps 2205, 2207, 2209, 2213 and 2219 is repeated until the memory segment 1101 which was allocated is filled, as indicated by the test 2213 resulting in a positive answer. When this occurs, the step 2213 leads into step 2215 which invokes sub-routine 15A to allocate another memory segment 1101 to the data bytes in the text. The previous segment is linked to the newly allocated memory segment 1101 during the following step 2217 by setting into it a linking byte representing the address of the newly allocated memory segment 1101. The process then loops back through line 2220 and repeats, continuing to fill and link successive memory segments 1101 until in step 2205 an ETX character is detected, representing the end of the text portion of the data block.

The detection of an ETX character causes a transfer from the routine 22A to the routine 22B. In the initial step 2221 of the routine 22B the ETX byte is added to the checksum stored in CR-SUM 833. Next, during step 2223 the sub-routine 24A is invoked to get the next byte in the data block 93 residing in the receive buffer 809, this data byte being the longitudinal checksum lcc character byte which follows the ETX character in the data block (see FIG. 10). The lcc byte is added to the checksum in CR-SUM 833 (step 2225) and a test is performed to determine whether or not the sum of the addition carried out in step 2225 is zero (modulo 128). If this is not the case, the longitudinal checksum character lcc is not the two's-complement of the sum which was accumulated in CR-SUM 833 indicating an error must have occurred in the transmission of the data block. If this is the case, control is transferred from the sub-routine 22B to the sub-routine 22C which includes a single step 2203 which calls upon a sub-routine 17A to deallocate all of the segments in which the previously accumulated (and erroneous) text was stored.

Figure 17:
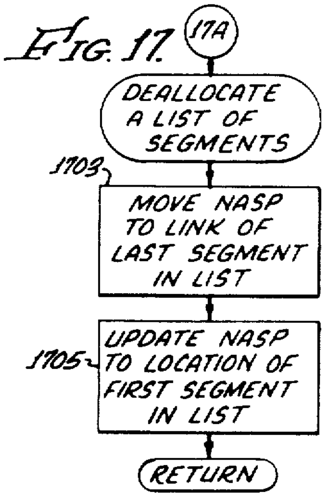

Referring to FIG. 17 for the routine for deallocating a list of segments, it includes steps 1703 and 1705. During the first step 1703 the last memory segment 1101 in the list of memory segments to be deallocated is linked to the first memory segment in the list of available memory segments by transferring the address of the first available memory segment then in NASP 811 to the link of the last memory segment to be deallocated. As a result of this step the linking byte stored in the last of the memory segments to be deallocated will point to the first of the list of available memory segments 1101. In the next step 705 of the deallocating routine, NASP 811 is updated to point to the first memory segment of the list of memory segments to be deallocated by storing in NASP 811 the address of that first memory segment. The effect of the last step, therefore, is to make the first memory segment of the list of memory segments to be deallocated the new first available memory segment. Stated differently, the entire string of memory segments which were to be deallocated has been tacked onto the beginning of the previously list of available memory segments. When the routine 17A is completed, it returns control to the sub-routine 22C which in turn returns control to the routine 21B in FIG. 21.

If during step 2227 the checksum test is satisfied, indicating that the entire data block was received correctly, the routine 22B continues and during its next step 2229 an End of Text sentinel is added to the text assembled in the segmented memory 805. This completes the assembling of the text block 93A in the segmented memory 805 and it is now time for step 2231, which determines whether or not the terminal 101 which is to receive the text which was just assembled is presently "outputting" i.e., whether there is presently a string of text stored in the segmented memory 805 intended for that terminal. This is determined by referring to the entry in TX-TBL 825 corresponding to the terminal involved and checking to see whether or not there is an address stored in it. If there is, the routine 22B proceeds to step 2233 during which the text in segmented memory which was just completed is linked to the end of the text which is currently in the segmented memory 805, and which is to go to the same terminal. This is done by setting the link of the first memory segment in the just completed string of segments to point to the last memory segment in the preceding string of segments intended for the same terminal.

To find the last memory segment in the preceding string of text it is followed in the segmented memory 805 until a memory segment is reached which has a zero link. This is the last memory segment in the string and it is this segment to which the first memory segment of the new string of text is to be linked. Once the linking of the new string of text to the preceding string of text in the segmented memory 805 is completed, the block number in R-ACK 837 is updated (increased by one) in the final step 2237 of routine 22B, so as to correctly indicate the serial number of the last correctly received data block.

If in step 2231 it is found that there is no other string of text in the segmented memory 805 intended for the terminal 101 which is being serviced, the routine proceeds to step 2235, during which the entry in TX-TBL 825 for that terminal is set to point at the initial memory segment of the newly stored string of text 821. Following this step, the updating step 2237 is performed. That step, once completed, leads back to the routine 21B in FIG. 21 which will attempt to transfer any other message which might be present in the receive buffer 809.

A third possibility in performing the step 2205 in routine 22A is that the byte which was read during step 2203 from the receive buffer 809 was in error. If this is the case, control is transferred directly from the step 2205 of routine 22A to the initial and only step of the error correction routine 22C during which the entire string of text of which the erroneous byte was a part is deleted from the segmented memory 805.

The entire set of operations shown in FIGS. 21, 22, and 23 which collectively make up the process of transferring characters from the receive buffer 809 to the segmented memory 805 and assembling them into strings of text intended for various terminals is continued until such time as it is found during the execution of the sub-routine 24A, step 2405 that the receive buffer is empty. When this happens, a return is made to the Character Service Routine 14C. And at this time the next major character servicing sub-routine 27B is begun.

f. Transferring of Characters From the Segmented Memory to the Transmit Buffer

Figure 27:
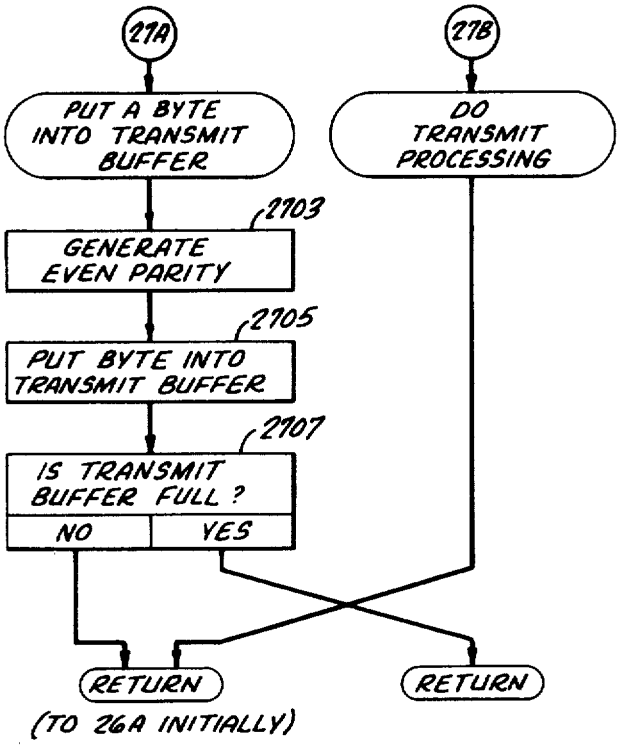

As shown in FIG. 27, the routine with entry points 27A and 27B is a coordinating routine which couples the transmission routines 26A, 26B, 26C and 26D of FIG. 26 to the character service routine 14C. When the Character Service Routine 14C requests terminal output processing according to sub-routine 27B, that sub-routine is entered at point 27B in FIG. 27 and is initially returned to the start of routine 26A in FIG. 26.

The first step 2603 in routine 26A calls for the sub-routine 27A shown in FIG. 27, whose purpose is to put a byte into the transmit buffer 807. This sub-routine, which is extremely often invoked by the sub-routines shown in FIG. 26, is a simple one involving three steps. During the first step 2703 even parity is generated for the byte which is to be transferred into the transmit buffer 807 using the character table. During the next step 2705 the byte with the correct parity is placed in the transmit buffer 807. Finally, during step 2707 the status of the transmit buffer 807 is determined. If it is found to be full the routine returns to the step which had invoked it, i.e., the Character Service Routine 14C. In effect, this terminates the high speed transmit processing sub-routine 27B.

If it is found during step 2707 that the transmit buffer 807 is not full, the sub-routine 27A is returned to the step which had invoked it, i.e., step 2603 in sub-routine 26A, FIG. 26. Step 2603 calls for the sending of four SYN characters in succession, so that the sub-routine 27A is invoked 4 times during the step 2603. After the four SYN characters have been put into the transmit buffer 807, an ACK character is transferred therein during step 2605, again using routine 27A.

Referring to FIG. 10 it will be recognized that thus far the first five bytes of a data message 91 have been assembled in the transmit buffer 807. This process of assembling a message 91 continues in step 2607 in which the ack # stored in R-ACK 837 is transferred to the next word location in the transmit buffer 807, by sub-routine 27A. The ack # * character is sent during the following step 2609 by another execution of the sub-routine 27A. At this point a test is performed at step 2611 to determine if the output string 1109 in the segmented memory 805 is empty. If it is, four ETB characters are transferred during the following step 2613 by executing the sub-routine 27A, operating on an ETB character, four times. Following this the sub-routine returns through line 2614 to the initial step 2603. The effect of this is to send a data block having only a series of four SYN characters 101, an acknowledge block 103, and a set of four ETB characters 105 so as to let the central computer 123 know that the block whose acknowledgement number is being transmitted was correctly received. In this way the lack of an output string 1109 in the peripheral computer 119 awaiting transmission to the central computer 123 does not prevent or delay the prompt transmission of an acknowledgement number to the central computer.

If step 2611 indicates that the output string 1109 is not empty, it is followed by step 2615, during which the block number in CX-BLN 817 is set to equal the number stored in F-ACK 835. The number in F-ACK 835 represents the last data block to have been erased from the output string 1109 in the segmented memory 805. Consequently, the number of the initial data block in the output string 1109 to be transmitted may be derived by increasing the number in F-ACK by one. This is done as the first step 2617 in the routine 26C which follows the last block 2615 of the routine 26A through the line 2616.

Assuming, as we have, that the output string 1109 is not empty, there are now stored in the transmit buffer 807, as a result of the steps performed during the routine 26A, four SYN characters 101 and the acknowledge block 103, neither of which were obtained from the output string 1109 in the memory segment 805. The first byte in that output string 1109 is the terminal address (term # ) of the terminal 101 which originated the message 91 forming the initial portion of the output string.

The term # is taken from the output string 1109 in the memory 805 during step 2619 and is saved in CX-LINE 815. The sub-routine 27A is then invoked 6 times and during steps 2621 through 2631, successively to set into the transmit buffer 807 (a) and SOH character, (b) the block number of the data block to be transmitted, obtained from CX-BLN 817, (c) the ones-complement of the block number obtained from CX-BLN 817, (d) the address of the (term # ) terminal from which the message to be sent originated, obtained from CX-LINE 815, (e) the ones complement of the terminal address (term # ), and (f) an STX character to indicate the beginning of text. Once these six characters have been assembled successively in the transmit buffer 807, the number in CX-SUM 819 is initialized to zero (step 2633). The system is now ready to transfer, into the transmit buffer 807 by means of the routine 26D successive text bytes of the first data block in the output string 1109 held in the segmented memory 805.

The routine 26B begins with step 2635, which quieries the first memory segment 1101 in the output string 1109 to find out if there are any data bytes left in it. If there are, the routine proceeds to step 2639, in which the next byte in the current segment is read. During the following step 2640 a determination is made to find out if the byte just read is an End of Text sentinel. If it is not, the byte is added to the checksum in the CX-SUM location 819, after which the byte is stored in the transmit buffer 807 during the step 2643, which is a 27A sub-routine. Following this, the sub-routine 26D loops back to its initial step 2635 and the process is repeated to transfer another byte from the output string 1109 in the segmented memory 805 into the transmit buffer 807.

The process of successively transferring text bytes from the output string 1109 continues until the byte read is an End of Text sentinel. This is detected by the test performed as part of the step 2640 and results in the routine proceeding directly to step 2645 which is directed to invoking routine 27A to set an ETX character into the transmit buffer 807 after the last text character is stored therein.

Following the storage of the ETX character in the transmit buffer 807 it is added to the checksum in CX-SUM 819 and the longitudinal checksum character lcc is calculated by using the two's complement of the number in CX-SUM after the ETC character has been added thereto. The longitudinal checksum character so calculated is set into the transmit buffer 807 during step 2649, which is another routine 27A. Next, during step 2651 a determination is made as to whether or not the end of the output string 1109 has been reached. This test is accomplished by testing the linking byte position 1103 (link) of the current memory segment 1101. The end of the output string 1109 has been reached if the link 1103 is zero. If the link is not zero it then points to at least one additional memory segment 1101 in the output string 1109. If this is the case, during the next step 2653 that link is followed to the next memory segment and operation returns to the beginning of routine 26C and to its first block 2617. The transfer of another block from the output string 1109 to the transmit buffer 807 then begins.

If the test of step 2651 at the end of routine 26B reveals that the end of the output string 1109 has been reached, control is returned to the beginning of routine 26B which is directed to inserting four ETB characters 105 in the transmit buffer 807 in the manner described previously with reference to the step 2613. This terminates the transfer of characters from the segmented memory 805 to the transmit buffer 807 so as to complete a message 91.

g. Spare Time Operations

Figure 28:
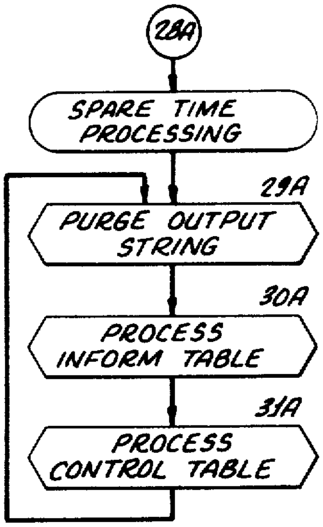
Figure 29:
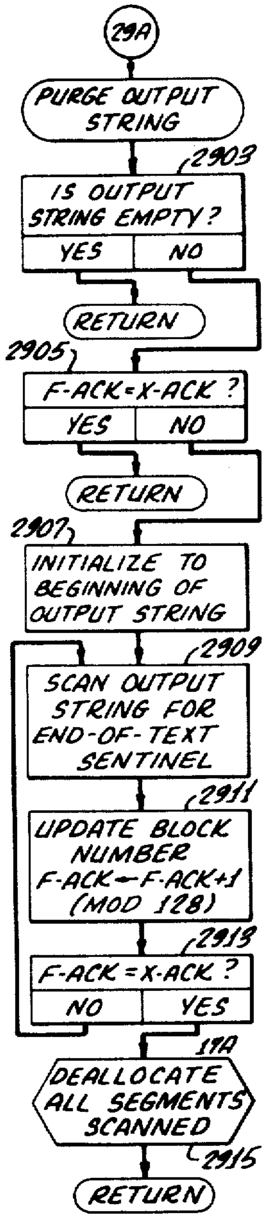
Figure 30:
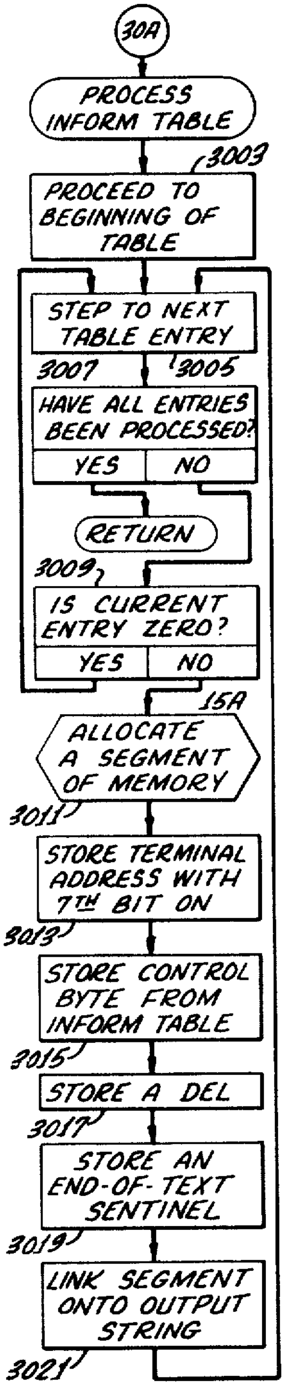

Spare time operations are generally indicated by the routine 28A in FIG. 28. It is a loop which executes three sub-routines 29A, 30A, and 31A in succession and which continues to cycle in spare time any time that the real time or psuedo real time operations are not performed. The first sub-routine to be invoked is 29A and its function is to purge the output string 1109 in accordance with acknowledgements received from the central computer 123. The second sub-routine 30A is directed to processing entries in the Inform Table 841 to generate control blocks in the output string 1109 from them. The third sub-routine 31A has as its function the processing of entries in the control table 843 and the carrying out of whatever functions are indicated by the microencoded bits in those entries.

h. Purging the Output String in Spare Time

The first step in the sub-routine 29A for purging the output string 1109 is to determine in step 2903 whether or not the output string is empty. If it is there is obviously nothing to purge and the sub-routine returns to the calling routine 28A for the performance of the following sub-routine 30A. However, if the output string 1109 is found to be not empty, the step 2905 is performed in which a determination is made as to whether or not the numbers stored in F-ACK 835 (representing the block number of the last block to have been erased from the output string) is equal to the number in X-ACK 839 representing the number of the last block to have been acknowledged by the central computer 123). If the two numbers are equal, it means that the last block to have been purged is the same as the last block for which an acknowledgment has been received, which is as it should be. In this case, the purge routine has nothing to do.

If the two numbers are not equal, then one or more blocks must be erased from the output string 1109. In this event, the sub-routine 29A proceeds to step 2907 in which we proceed to the beginning of the output string 1109. During the following step 2909 the output string 1109 is scanned for an End of Text sentinel. As part of this step the output string 1109 is followed from its initial memory segment 1101 through successive ones of its interlinked memory segments until the end of text sentinel is found in one of them. When it has been found, it means that one entire block in the output string 1109 has been scanned. At this point the next step 2911 is performed in which the block number in F-ACK 835 is updated by one to indicate that the first block of the output string 1109 has been marked for purging. Based on the assumption that the block so marked has been purged, a test is next made in step 2913 to determine whether the new block number in F-ACK 835 is equal to the block number in F-ACK 839. If the answer is yes, it means that purging of the block which has just been marked for purging will be sufficient to bring the two block numbers into agreement, all blocks up to the last one for which acknowledgement was received will have been purged from the output string 1109. If this is the case the sub-routine 29A continues to step 2915 in which it invokes sub-routine 17A to deallocate all of the segments which have been scanned and marked for purging. Once this has been completed the sub-routine 29A returns to the calling routine 28A for the next sub-routine to be performed.

If on the other hand it is found during the step 2913 that the new block number in F-ACK 835 is still not equal to the block number in X-ACK 839, the sub-routine loops back to its step 2909 and the output string 1109 is scanned further until another End of Text sentinel is reached, i.e., until another block has been scanned. When this step has been completed, the block number in F-ACK 835 is again updated by one, thus marking a total of 2 blocks for purging and another test is made to see if the block numbers in F-ACK 835 and X-ACK 839 agree. This process continues until agreement is found between the two block numbers, at which time the sub-routine exits from the step 2913 and calls upon the sub-routine 17A to deallocate whatever total number of segments were finally scanned, which may include any number of data blocks.

i. Processing the Inform Table in Spare Time

Generally, the sub-routine 30A scans the inform table 841 looking for non-zero entries. If such an entry is found, a corresponding control block 93B is created in the segmented memory 805 and is linked onto the output string 1109 therein. Specifically, the sub-routine begins with step 3003 in which we proceed to the beginning of the inform table 841, that is, to the location corresponding to the first of the terminals 101. The steps 3005 through 3009 represent a loop which scans through the inform table, stepping successively through its entries corresponding to respective terminals 101 looking for non-zero entries. The loop continues until all entries have been processed (step 3007) or until a non-zero entry is found (step 3009). In the latter event the loop is interrupted and the step 3011 is performed in which the sub-routine 15A is called upon to allocate a memory segment 1101 to receive the control block 93B to be set up for the non-zero entry just found. Following the allocation of a memory segment 1101, in step 3011 the terminal address of the terminal 101 in whose location in the Inform Table 841 the non-zero entry was found is stored in the first data byte location of the allocated memory segment, with the 7th bit of the terminal address (term # ) byte being set to one designate that it is part of a control block 93B.

In step 3015 the microenceded control byte which was removed from the Inform TAble 841 is stored in the next data word location in the memory segment 1101. At this point the entry in the INform Table 841 for the terminal 101 in question is zeroed out. A delete character is then stored in the following byte location in the memory segment 1101 in step 3017 of the sub-routine 30A. Finally, in step 3019 an End of Text sentinel is stored in the memory segment 1101 thus completing the control block 93B (see Section G.2.).

The memory segment 1101 containing the just assembled control data block **93*b* is then linked in step 3021 to the output string 1109 by storing the address of the memory segment containing the control data block 93*b* in the linking byte location of the last memory segment 1101 in the output string 1109**.

j. Processing the Control Table in Spare Time

The Control Table 843 contains one word location in the memory 201 corresponding to each of the terminals 101. When control blocks **93*b* arrive from the central computer 123 the High Speed Receive routine 24B extracts the micro-encoded control byte from each control block 93*b* and stores it in the control table entry corresponding to the terminal address of the control block. Subsequently, in spare time, the sub-routine 31A performs the functions specified by the microencoded bits held in the control table 843**.

Figure 31:
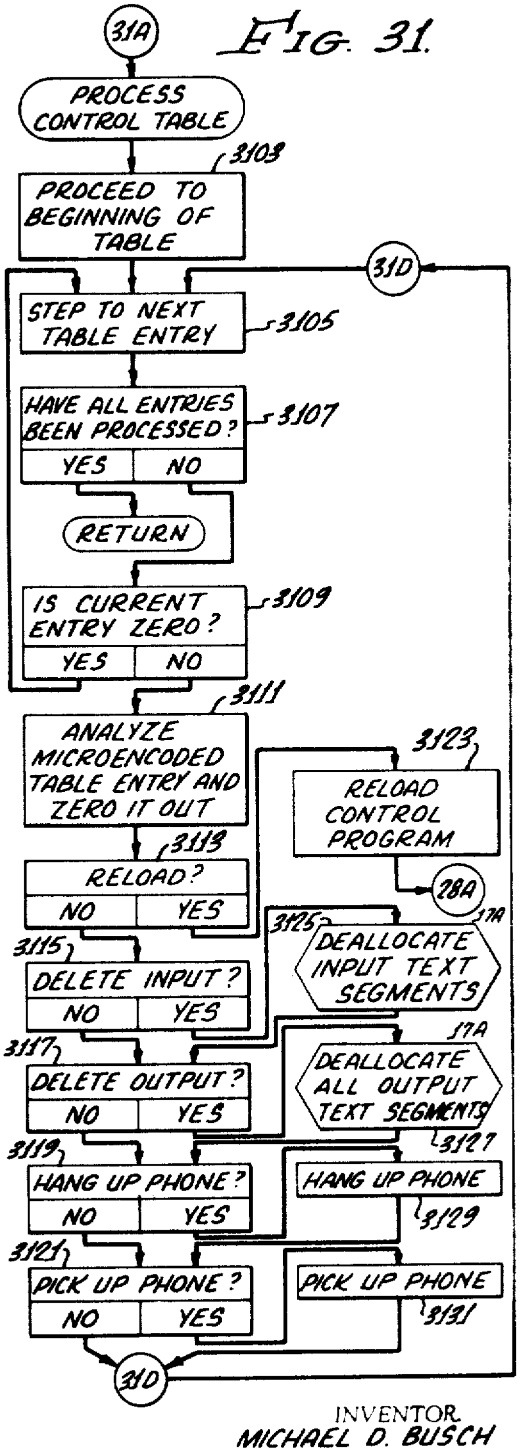

Referring to FIG. 31, the first step in the sub-routine 31A is to proceed to the beginning of the control table 843, i.e., the word location corresponding to the first one of the terminals 101. The next three steps 3105, 3107, and 3109 together represent a loop which scans through successive word locations in the control table 843 until either all entries have been processed (step 3107) or a non-zero entry is found in one of the word locations (step 3109). In the latter case the loop is interrupted and the last of its steps 3109 is followed by another step 311 in which the micro-encoded entry in the Control Table 843 found in step 3109 is analyzed and zeroed out. The details of this analysis and its results are shown by the blocks 3113 through 3131.

As part of the process of analyzing the micro-encoded entry in the Control Table 843 in step 3113 a test is made to determine whether the micro-encoded byte represents an instruction to reload the entire control program of the computer. If it does, the reloading is carried out in step 3123 after which control is returned to the routine 28A.

The steps 3113 and 3123 for reloading the control routines of the peripheral computer 119 in response to a control message from the central computer 123 are provided for unforseen emergencies only. The step 3123 is invoked only when the central computer 123 has determined that control routines in the peripheral computer 119 are in error. In this case it can, by sending an appropriate control block, cause the data concentrator to reload itself. In this event however, all of the text which is in the memory 201 of the data concentrator is lost. Consequently, this reloading procedure is done only when absolutely essential.

If, upon analysis in step 3133, it is found that the microencoded control byte does not represent an instruction to reload, another test is performed to determine whether or not it represents an instruction to delete text which is held in the segmented memory 805 for delivery to the central computer 123. If this is found to be the case, step 3125 is performed next in which the sub-routine 17A is called upon to deallocate all of the memory segments 1101 in the segmented memory 805 which contain data from the terminal 101 corresponding to the entry in the control table 843 in which the microencoded control bit was found.

If the test in step 3115 yields a negative answer, the next test, indicated by step 3117, is carried out to determine if the control byte represents an instruction to delete text in the segmented memory 805 held there pending delivery to the terminal 101 for which the control byte is being held in the Control Table 843. If the answer is positive, the sub-routine proceeds to step 3127 in which the additional sub-routine 17A is used to deallocate all of the memory segments 1101 in the segmented memory 805 holding text for the terminal 101 in question. Deletion of an input text is normally requested by the central computer 123 immediately after a terminal 101 has been connected to the system, in order to erase any random noise characters which might have been received by the data line interface 121 in the course of the connecting process. Deletion of an output text intended for delivery to one of the terminals 101 is used when the central computer 123 wants the peripheral computer 119 to stop typing immediately on a given terminal 101. Let it be assumed, for example, that the peripheral computer 119 is typing on a given terminal 101 and that it has several lines of output text 821 stored in the segmented memory 805 waiting to be typed out. Let it be assumed further that at this point the user at the particular terminal 101 types in a command requesting that the central computer 123 stop typing. Even if the central computer 123 stopped sending more output text to the data concentrator as a result of this command, the peripheral computer 119 would continue typing at least until it has exhausted the string of text 821 held in its segmented memory 805 for delivery to the terminal 101 involved. Therefore, provision is made for the central computer 123 to send to the peripheral computer 119 a control message requesting that it delete producing further output, at which point the peripheral computer 119 immediately discontinues typing on the terminal 101 and deallocates all of the text then in the segmented memory 805 waiting to be typed out on the terminal.

Returning to the routine 31A for processing the control table 843, if it is found in step 3117 that the microencoded control byte being analyzed is not calling for a deletion of output text, another test is performed during step 3119 to determine if it is calling for the hanging up of the phone in the telephone channel 102 connecting the terminal 101 corresponding to the control byte. If this is the case the phone connecting the terminal 101 is hung up.

Finally, if the control byte does not represent any of the foregoing four instructions, it is tested in step 3121 for the possibility that it is calling for picking up of the phone connected to the terminal 101 to which it corresponds. If the latter is the case, the phone is picked up in step 3121. If not, the sub-routine 31A is terminated and it loops back through the entry point 31D to step 3105 in which the process is stepped to the next entry in the Control Table 843 and is repeated with reference to it.

It should be noted that more than one bit of the microencoded control byte may have been set to "1," so that the control byte may represent more than one instruction. For this reason each of the tests 3117, 3119, and 3121 is performed even though the preceding test yielded a positive result. So, for example, if the answer to step 3115 is YES, all input segments are deallocated in step 3125 and then the next test, step 3117, is carried out to determine if the control byte also carried a "delete output" instruction.

A detailed list of instructions for programming the computers 119 and 123 to carry out the operations shown in and described with reference to FIGS, 12 through 30 appears in Appendix V of the application.

7. SUMMARY OF OPERATIONS

The operations of the system of FIG. 8 may be divided into those which are performed by elements of the peripheral computer 119 in combination with the multiplex system 117 and the telephone channels 102 controlled to act as a Data Concentrator and those performed by elements of both computers 119 and 123 controlled to act as a high speed error correcting data transmission system.

The DAta Concentrator takes several streams of data bytes representing messages sent intermittently and asynchronously from several terminals 101 and assembles them all into a tightly packed string of data in the segmented memory 805 containing successive messages 91 each identified with its originating terminal.

As part of the above function data is taken a bit at a time from successive ones of the terminal 101, assembled into data bytes in the input shift buffer 801, and successively fed through the input buffer 803 byte by byte into the segmented memory 805. This memory is organized successively to allocate memory segments 1101 from a string of available memory segments. Incoming data bytes are stored in separate groups of memory segments, each group interlinked into a sub-string 1107 containing a complete message from a respective one of the terminals 101. As each sub-string 1107 is completed, it is linked onto an output string 1109 of memory segments in the segmented memory 805 from which data is transmitted synchronously to the central computer 123 as part of the high speed transmission routine of the system..

Data received by the Data Concentrator from the central computer 123 is stored as separate strings of text 121 in the segmented memory 805. Each string contains a separate message and each message is identified with the terminal 101 to which it is to be sent. Bytes from the respective strings of text 121 are transferred into locations in the output buffer 829 individually allocated to respective ones of the terminals 101. The terminals are serviced periodically in rapid succession, a bit being transmitted to each respective terminal 101 from the output shift buffer 831 each time the terminal is serviced. In this way, the respective strings of text 821 in the segmented memory 805 are concurrently fed through the output buffer 829 and the output shift buffer 831 and are concurrently transmitted on a time-shared basis a bit at a time to the respective terminals 101. For a more detailed description of the portions of the system involved in the foregoing operations sections G.4.a–G.4.c. should be reviewed. For their detailed operation Section G.6.a.–G.6.d. should be studied.

The structural features of FIG. 8 related to the high speed transmission of data with error correction are described in detail in Sections G.4.e., and G.4.g.–G.4.i. and the operations involved are discussed in detail in sections G.6.e. and G.6.f. These operations will now be reviewed with reference to the transmission of data blocks from the peripheral computer 119 to the central computer 123.

The output string 1109 in the segmented memory 805 of the transmitting computer 119 is intermittently purged of data blocks for which acknowledgement has been received, and the block number of the last data block to have been purged is stored in F-ACK 835 (routine 29A). CX-BLN 817 is used to store the number which is to be assigned as the block number of the next data block to be transmitted from the output string 1109 during the next transmission routine. After each data block is sent from the transmitting computer 119, the number in CX-BLN 817 is stepped by one so that each block number taken from CX-BLN is one greater than the last. Prior to each transmission routine the number in CX-BLN 817 is set to a number which is one higher than that in F-ACK 835. This number is assigned to the first data block to be transmitted so that its number will be one greater than the number of the last data block to have been purged (routine 26A and 26C).

In the receiving computer, the block number of the last successfully received data block is stored in R-ACK **835*a*, and each subsequent block received is checked to verify that its block number is one greater than the number stored in R-ACK 835*a*. If it is, the entire data block is read into the segmented memory 805*a* of the receiving computer 123 and when all of the data block has been read, it is checked to see if it was correctly received. If it was, R-ACK 837*a* is updated by increasing the block number therein by one. The next time that there is a transmission from the receiving computer 123 to the transmitting computer 119 the newly stored block number in R-ACK 837*a* is sent (step 2607**).

Let it be assumed that, prior to the beginning of a given transmission routine, block 56 was the last data block for which an acknowledgement was received by the transmitting computer 119. Assume further that there are presently four data blocks in the output string 1109 to be transmitted. They will then be assigned block numbers 57–60. Assuming that all four blocks are correctly received at the receiving computer 123, its R-ACK 837 is stepped from 56 to 60. During the next transmission the number 60 is sent back to, and is stored in, X-ACK 839 of the transmitting computer 119 (steps 2607 and 2111). During the next purge routine (29A) the output string 1109 in the segmented memory 805 of the transmitting computer 119 is purged until a number in F-ACK 835 is the same as that in X-ACK 839, i.e., 60.

Let it be assumed further that during the time which elapsed between the transmission of the data blocks 57–60 and their subsequent purging, two additional data blocks have been added to the output string 1109. During the next transmission, the first block in the string to be transmitted will be the first of the two new data blocks added to the output string 1109. Its block number will be one greater than the block number stored in F-ACK 835, i.e., 61 and that of the following data block well be 62.

Throughout the specification the term "greater than" has been used to express the relationship of a number in one of the word locations CX-BLN, CR-BLN, F-ACK, R-ACK, X-ACK to some other number. It is used for example in the sense that, after the number in X-ACK 839 has been stepped, it is one "-greater than" it was before. Or, in the sense that each number taken from CX-BLN 817 to be used as a data block number by a transmitting computer is "one greater" than the previous one. However, those of the word locations which are periodically stepped, such as CX-BLN, have a maximum count state of 127. Their next count state after that is 0. Therefore, as used herein, greater than means further along in the circular progression 0, 1, 2.....127, 0, and 0 is greater than 127.

Two separate checks are performed at the receiving computer 123 on each data block that it receives. The first is a parity check and it is performed individually on each data byte. It will be recalled that each data byte is sent from the transmitting computer 119 with correct parity.

The second check performed at the receiving computer 123 is a collective check on all of the data bytes of the data block. This check is performed by determining whether or not the sum (modulo 128) of all of the text bytes in the data block equals the longitudinal checksum character lcc of the data block. The lcc character is generated in the transmitting computer 119 by storing in its CX-SUM 819 a running sum(modulo 128) of all the text bytes set into the transmit buffer 807 for a given data block. After the last text byte the lcc character for that block is computed by taking the two's complement of the number in CX-SUM and this number is set as the last character of the data block into the transmit buffer 807. Since the lcc number is the two's complement of the sum(modulo 128) of all of the preceding text bytes in the data block, it follows that the sum of all of the data bytes (modulo 128) when added to the lcc character should result in a total sum of zero. If the data block is transmitted to the receiving computer 123 without error this relationship will remain true. This may be confirmed by keeping a running sum (modulo 128) of all of the next bytes in a data block which has been received at the receiving computer in its CR-SUM **833*a*. At the end of receiving a data block, when the lcc character of the data block is read it is added to the sum which has been accumulated in CR-SUM 833** and if the result is zero it will be an indication that the block was received correctly.

H. CONCLUSION

From the foregoing it is apparent that the disclosed apparatus and method represent a significant contribution to the art of digital data communication. Many remote terminals are enabled by use of the invention to share the time of a single central computer located many miles away. As a data concentrator, the system permits efficient use of the long distance lines through which the central computer is reached. And this tightly packed information is sent more securely by virtue of the error correcting ability of the system.

APPENDIX I

Logical And (AND Y)

Op. Code: 0
Operation: The AND operation is performed between the content of memory location Y and the content of the AC. The result is left in the AC; the original content of the AC is lost.

Two's Complement Add (TAD Y)

Op. Code: 1
Operation: The content of memory location Y is added to the content of the AC in two's complement arithmetic. The result of this addition is held in the AC; the original content of the AC is lost. If there is a carry from ACO, the link is complemented. This feature is useful in multiple precision arithmetic.

Increment and Skip if Zero (ISZ Y)

Op. Code: 2
Operation: The content of memory location Y is incremented by one in two's complement arithmetic. If the resultant content of Y equals zero, the content of the PC is incremented by one and the next instruction is skipped, If the resultant content of Y does not equal zero, the program proceeds to the next instruction. The incremented content of Y is restored to memory. The content of the AC is not affected by this instruction.

Deposit And Clear AC (DCA Y)

Op. Code: 3
Operation: The content of the AC id deposited in core memory at address Y and the AC is cleared. The previous content of memory location Y is lost.

Jump to Sub-Routine (JMS Y)

Op. Code: 4
Operation: The content of the PC is deposited in core memory location Y and the next instruction is taken from core memory location Y + 1. The content of the AC is not affected by this instruction.

Jump To Y (JMP Y)

Op. Code: 5
Operation: Address Y is set into the PC so that the next instruction is taken from core memory address Y. The original content of the PC is lost. The content of the AC is not affected by this instruction.

APPENDIX II

Interrupt Turn On (ION)

Op. Code: 6001
Operation: This command enables the computer to respond to a program interrupt request. If the interrupt is disabled when this instruction is given, the computer executes the next instruction, then enables the interrupt. The additional instruction allows exit from the interrupt sub-routine before allowing another interrupt to occur. This instruction has no affect upon the condition of the interrupt circuits if it is given when the interrupt is enabled.

Interrupt Turn Off (IOF)

Op. Code: 6002
Operation: This command disables the program interrupt synchronization element to prevent interruption of the current program.

Teletype Increment (TTINCR)

Op. Code: 6401
Operation: The content of the line select register (LSR) in the Serial Line Multiplexer is incremented by one to address the next sequentially numbered line unit.

Teletype In (TTI)

Op. Code: 6402
Operation: Three core memory locations are required by the TTI instruction. The first location contains the TTI instruction, and the two succeeding locations contain a line status word (LSW) and a character assembly word (CAW), respectively. Bit 0 of the LSW records the active/inactive status of the selected Teletype line, and bits 9 through 11 of the LSW serve as a real time clock to determine the bit assembly time for the CAW. Both of these words should be cleared prior to the first use of the TTI instruction in a sub-routine. The TTI instruction checks the status of the selected line and the number in the real time clock. If the line is active and the clock indicates the center of a bit has passed, one bit of the Teletype line is shifted into the CAW.

The TTI instruction is executed in two or three computer cycles. In the first cycle, a fetch cycle, the computer reads the instruction from core memory and establishes the next sequential core memory location as the address to be read during the next cycle. By placing a 1 in bit 11, this instruction can be microencoded to increment the content of the LSR of the Serial Line Multiplexer during the first cycle.

The second cycle is a Status state in which the LSW is read, the active/inactive status of the line is checked, the timing of the current bit is checked, and (based on these conditions) the inactive status of the line is recorded in MBO and the program advances to the next instruction, the real time clock count is incremented in the LSW and the program advances to the next instruction, or the real time clock count is incremented and the third cycle is initiated.

The active/inactive status of the Teletype line is checked by sampling the condition of bit 0 of the LSW. If it is a zero, MBO(O) (indicating that the line is inactive, i.e., not transmitting a character the LSW is shifted one position to the right in the MB, and the complement of the Teletype line is set into MBO. Therefore, if the line is now active, a 1 is set into MBO and will be read during the Status cycle of the next TTI instruction. The program count is then incremented by one to skip over the CAW, the LSW is restored to core memory, the MB is cleared, and the Fetch state is entered to fetch next instruction. If the MBO(1) at the beginning of the Status cycle, the LSW is incremented by one to advance the real time clock and the LSW number is sampled. If LSW/3 it is too early to sample the active line so the program count is incremented to skip over the CAW, the LSW is restored to core memory, the MB is cleared, and the program advances to the Fetch state for the next instruction. If LSW-4 after incrementation, the LSW is rewritten in memory and the line is written into the CAW during the next cycle.

The third cycle is a Character state in which the CAW is read into the MB from core memory, the character is shifted right one position with the line bit being shifted into MBO, then the CAW is rewritten in memory. The program then advances to the Fetch state for the next instruction.

Teletype Out (TTO)

Op. Code: 6404
Operation: This instruction must be preceded by a command sequence (such as CLA and TAD) that loads the AC with the character to be (or being) transferred to the external Teletype equipment. The TTO instruction clears the L, shifts the content of the AC and the L one position to the right, then transfers the bit contained in AC11 to the selected Teletype line.

Clear Line Select Register (TTCL)

Op. Code: 6411

Operation: The line select register is cleared, so line 0 is addressed.

Load Line Select Register (TTSL)

Op. Code: 6412

Operation: The line select register is set by an OR transfer from the content of bits 5 through 11 of the accumulator, then the accumulator is cleared.

Read Line Select Register (TTRL)

Op. Code: 6414

Operation: The content of the line select register is loaded into bits 5 through 11 of the accumulator by an OR transfer.

Skip on Clock Flag (TTSKP)

Op. Code: 6421

Operation: The content of clock 1 flag of the Serial Line Multiplexer is sampled, and if it contains a 1 (indicating that a clock pulse has occurred and the flag has been enabled to request a program interrupt) the content of the program counter is incremented by 1 to skip the next sequential instruction. If the skip occurs clock 1 caused a program interrupt if the interrupt system was enabled when the clock pulse occurred.

Turn On Clock (TTXON)

Op. Code: 6422

Operation: The clock in the Serial Line Multiplexer is enabled and the clock flag cleared. When the clock is enabled the next clock pulse sets the clock flag and requests a program interrupt.

Skip on Transmit Flag (STF)

Op. Code: 6611

Operation: Causes the program to skip the next instruction if the Transmit Flag is in the 0 state. When the Transmit Flag is in the 1 state, the transmit buffer register is ready to accept another character.

Clear Transmit Flag (CTF)

Op. Code: 6602

Operation: Resets the Transmit Flag. If Transmit Active Flag is not set, CTF also causes the program to skip the next instruction.

Transmit a Character (TAC)

Op. Code: 6601

Operation: Causes the contents of the accumulator to be transferred into the transmit buffer register (TCB)

Skip on Receive Flag (SRF)

Op. Code: 6651

Operation Causes the program to skip the next instruction if the Receive Flag is not set. (The Receive Flag is set when the first incoming sync character is detected, and stays set until the Receive End Flag is set.)

Read Receive Buffer (RRB)

Op. Code: 6612

Operation: Transfers the contents of the Receive Buffer (RCB) to the accumulator. RRB also resets the Receive Flag.

Skip on Receive End Flag (SEF)

Op. Code: 6621

Operation: Causes the program to skip the next instruction if the Receive End Flag is not set. (The Receive End Flag flip-flop is set when the receive logic has stopped receiving serial data from the communications equipment due to termination of the timing pulses.

Clear End Flag (CEF)

Op. Code: 6622

Operation: Resets the Receive End Flag.

Set Ring Enable (SRE)

Op. Code: 6624

Operation: Set the Ring Enable flip-flop which permits the Ring Flag to request a program interrupt.

Clear Ring Enable (CRE)

Op. Code: 6644

Operation: Resets the Ring Enable flip-flop.

Skip on Ring Indicator (SRI)

Op. Code: 6631

Operation: Causes the program to skip the next instruction if the Ring Flag is not set. The Ring Flag is set when a Ring input is received from the data set.

Clear Ring Flag (CRF)

Op. Code: 6632

Operation: Resets the Ring Flag.

Set Terminal Ready (STR)

Op. Code: 6634

Operation: Sets the Terminal Ready flip-flop.

Clear Terminal Ready (CTR)

Op. Code: 6642

Operation: Resets the Terminal Ready flip-flop.

Skip on Data Set Ready (SSR)

Op. Code: 6641

Operation: Causes the program to skip the next instruction if the communications equipment is in the "ready" state.

Clear Receiver Active (CRA)

Op. Code: 6652

Operation: Resets the Receive Active flip-flop, taking the receive logic out of the "active" state. No more incoming characters are transferred to the receive buffer register until another sync character is detected.

Turn Off Clock (TTXOFF)

Op. Code: 6424

Operation: The clock is disabled is cleared and the clock flag is cleared. When the clock is disabled the clock flag can not be set by the clock, and can not request a program interrupt or be skipped upon. The clock is unaffected and continues to run, but all operations caused by clock pulses are disabled. (When the system handles multiple-baud frequencies additional clocks and instructions are provided. Instructions similar to TTSKP, TTXON, and TTXOF use select code 43 for clock 2 and use select code 44 for clock 3.)

APPENDIX III

No Operation (NOP)

Op. Code: 7000

Operation: This command causes a 1-cycle delay in the program and then the next sequential instruction is initiated. This command is used to add execution time to a program, such as to synchronize sub-routine or loop timing with peripheral equipment timing.

Increment Accumulator (IAC)

Op. Code: 7001
Operation: The content of the AC is incremented by one in two's complement arithmetic.

Rotate Accumulator Left (RAL)

Op. Code: 7004
Operation: The content of the AC is rotated one binary position to the left with the content of the link. The content of bits AC1–11 are shifted to the next greater significant bit, the content of ACO is shifted into the L, and the content of the L is shifted into AC11.

Rotate Two Left (RTL)

Op. Code: 7006
Operation: The content of the AC is rotated two binary positions to the left with the content of the link. This instruction is logically equal to two successive RAL operations.

Rotate Accumulator Right (RAR)

Op. Code: 7010
Operation: The content of the AC is rotated one binary position to the right with the content of the link. The content of bits AC0–10 are shifted to the next less significant bit, the content of AC11 is shifted into the L, and the content of the L is shifted into ACO.

Rotate Two Right (RTR)

Op. Code: 7012
Operation: The content of the AC is rotated two binary positions to the right with the content of the link. This instruction is logically equal to two successive RAR operations.

Complement Link (CML)

Op. Code: 7020
Operation: The content of the L is complemented.

Complement Accumulator (CMA)

Op. Code: 7040
Operation: The content of the AC is set to the one's complement of the current content of the AC. The content of each bit of the AC is complemented individually.

Complement and Increment Accumulator (CIA)

Op. Code: 7041
Operation: The content of the AC is converted from a binary value to its equivalent two's complement number. This conversion is accomplished by combining the CMA and IAC commands, thus the content of the AC is complemented during event time 1 and is incremented by one during event time 2.

Clear Link (CLL)

Op. Code: 7100
Operation: The content of the L is cleared to contain a O.

Set Link (STL)

Op. Code: 7120
Operation: The L is set to contain a binary 1. This instruction is logically equal to combining the CLL and CML commands.

Clear Accumulator (CLA)

Op. Code: 7200
Operation: The content of each bit of the AC is cleared to contain a binary 0.

Set Accumulator (STA)

Op. Code: 7240
Operation: Each bit of the AC is set to contain a binary 1. This operation is logically equal to combining the CLA and CMA commands.

APPENDIX IV

Halt (HLT)

Op. Code: 7402
Operation: The program stops at the conclusion of the current machine cycle. This command can be combined with others in the OPR 2 group that are executed during either event time 1, or 2, and so are performed before the program stops.

Skip, Unconditional (SKP)

Op. Code: 7410
Operation: The content of the PC is incremented by one so that the next sequential instruction is skipped.

Skip on Non-Zero Link (SNL)

Op. Code: 7420
Operation: The content of the L is sampled, and if it contains a 1 the content of the PC is incremented by one so that the next sequential instruction is skipped. If the L contains a 0, no operation occurs and the next sequential instruction is initiated.

Skip on Zero Link (SZL)

Op. Code: 7430
Operation: The content of the L is sampled, and if it contains a 0 the content of the PC is incremented by one so that the next sequential instruction is skipped. If the L contains a 1, no operation occurs and the next sequential instruction is initiated.

Skip on Zero Accumulator (SZA)

Op. Code: 7440
Operation: The content of each bit of the AC is sampled, and if each bit contains a 0 the content of the PC is incremented by one so that the next sequential instruction is skipped. If any bit of the AC contains a 1, no operation occurs and the next sequential instruction is initiated.

Skip on Non-Zero Accumulator (SNA)

Op. Code: 7450
Operation: The content of each bit of the AC is sampled, and if any bit contains a 1 the content of the PC is incremented by one so that the next sequential instruction is skipped. If all bits of the AC contain a 0, no operation occurs and the next sequential instruction is initiated.

Skip on Minus Accumulator (SMA)

Op. Code: 7500
Operation: The content of the most significant bit of the AC is sampled, and if it contains a 1, indicating the AC contains a negative two's complement number, the content of the PC is incremented by one so that the next sequential instruction is skipped. If the AC contains a positive number no operation occurs and program control advances to the next sequential instruction.

Skip on Positive Accumulator (SPA)

Op. Code: 7510
Operation: The content of the most significant bit of the AC is sampled, and if it contains a 0, indicating a positive (or zero) two's complement number, the content of the PC is incremented by one so that the next sequential instruction is skipped. If the AC contains a negative number, no operation occurs and program control advances to the next sequential instruction.

Clear Accumulator (CLA)

Op. Code: 7600

Operation: Each bit of the AC is cleared to contain a binary 0.

APPENDIX V

A list of instructions which may be entered into the memory 201 of the peripheral computer 119 to implement the data communication techniques of the present invention is disclosed in U.S. Pat. No. 3, 560,936 issued Feb. 2, 1971. The subject matter beginning at line 67, column 56, and continuing thru line 30, column 106 in the above-mentioned patent is incorporated herein by reference.

What is claimed is:

1. A data communication system comprising in combination
a. a plurality of terminals each producing a stream of digital data representing digital messages, said digital data streams having different lengths;
b. a peripheral computer;
c. a plurality of low speed communication channels between respective ones of said terminals and said peripheral computer for concurrently transmitting said intermittent data streams to said peripheral computer;
d. means within said peripheral computer for assembling all of said data streams having different lengths into a continuous data string while preserving the identity of each said data stream therein;
e. a central computer; and
f. means, including a high speed communication circuit between said computers, for transmitting said data string to said central computer.

2. A data communication system as defined in claim 1 and further characterized by the provision of an error correcting transmission system between said computers comprising in combination
a. means in said peripheral computer for transmitting said data string to said central computer in successive data blocks, each having a unique block number;
b. means in said central computer for acknowledging to said peripheral computer by specific block number each data block said central computer has received correctly;
c. means in said peripheral computer for retransmitting each data block in said data string until an acknowledgment is received at said peripheral computer that the data block has been correctly received; and
d. means responsive to said unique block number in said central computer for rejecting any data block whose block number is the same as that of a data block whose correct receipt said central computer has previously acknowledged.

3. An error correcting system for transmitting data blocks from a transmitting computer to a receiving computer comprising in combination
a. a memory in said transmitting computer;
b. means for accumulating a series of data blocks in said memory;
c. means for periodically transmitting said series of data blocks to said receiving computer until they have been purged from said memory and for providing each data block so transmitted with a successively higher block number;
d. means in said receiving computer for receiving and storing only those data blocks transmitted from said transmitting computer whose block numbers are higher than those of previously correctly received data blocks, and for confirming that such received and stored data blocks have been correctly received;

e. means in said receiving computer for purging from its said receiving and storing means any data block which is found to have been incorrectly received;
f. means in said receiving computer for periodically transmitting to said transmitting computer an acknowledgment number corresponding to the block number of the last data block which it has confirmed to have received correctly;
g. means in said transmitting computer for storing the last acknowledgment number that it has received from said receiving computer; and
h. means in said transmitting computer for intermittently purging from said memory all data blocks up to and including the data block whose acknowledgment number is in said acknowledgment number storing means, whereby data blocks continue to be transmitted to said receiving computer until their positive acknowledgment is correctly received at said transmitting computer.

4. An error correcting system for bi-directional transmission of data blocks between a pair of digital computers comprising in combination
a. a memory in each computer;
b. means in each computer for accumulating a series of data blocks in its memory;
c. means in each computer for periodically transmitting its series of accumulated data blocks to the other computer until they have been purged from its memory and for transmitting with each data block a successively higher block number;
d. means in each computer for receiving and storing in its memory only those data blocks transmitted from the other computer whose block numbers are higher than those of previously correctly received data blocks and for confirming that such received and stored data blocks have been correctly received;
e. means in each computer for periodically transmitting to the other computer an acknowledgment number corresponding to the block number of the last data block which it has confirmed to have received correctly from the other computer;
f. means in each computer for storing the last acknowledgment number that it has received from the other computer; and
g. means in each computer for intermittently purging from its memory all data blocks up to and including the data block whose acknowledgment number is in its acknowledgment number storing means, whereby each computer continues to transmit each data block to the other computer until it receives from the other computer a positive acknowledgment of its correct receipt.

5. An error correcting system for transmitting data blocks from a transmitting computer to a receiving computer comprising in combination
a. a memory in said transmitting computer;
b. means for accumulating a series of data blocks in said memory;
c. means for periodically transmitting said series of data blocks to said receiving computer until they have been purged from said memory and for providing each data block so transmitted with a successively higher block number;
d. means in said receiving computer for receiving and storing only those data blocks transmitted from said transmitting computer whose block numbers are higher than those of previously correctly received data blocks;
e. means in said receiving computer for periodically transmitting to said transmitting computer an acknowledgment number corresponding to the block number of the last data block which it has confirmed to have received correctly; and
f. means in said transmitting computer for intermittently purging from said memory all data blocks up to and including the data block whose acknowledgment number was transmitted to said transmitting computer from said receiving computer, so that data blocks continue to be transmitted to said receiving computer until their positive acknowledgment is correctly received at said transmitting computer.

6. An error correcting system for transmitting data blocks from a transmitting computer to a receiving computer comprising in combination a. memory means in said transmitting computer for accumulating a series of data blocks;

b. means in said transmitting computer for periodically transmitting a series of data blocks to said receiving computer until they have been purged from said memory and for providing each data block so transmitted with a unique block number;

c. means in said receiving computer responsive to the block number of the received data block for storing said data block only if its block number bears a predetermined relationship to the immediately preceding correctly received data block;

d. means in said receiving computer for periodically transmitting to said transmitting computer an acknowledgment number corresponding to the block number of the last data block stored in said receiving computer; and e. means in said transmitting computer for intermittently purging from said memory means all data blocks up to and including the data block whose acknowledgment number was transmitted to said transmitting computer from said receiving computer, so that data blocks continue to be transmitted to said receiving computer until their positive acknowledgment is correctly received at said transmitting computer.

7. A method of transmitting a series of data blocks from a transmitting computer to a receiving computer comprising the steps of a. assembling a string of data blocks in the memory of the transmitting computer;

b. successively transmitting data blocks from said string to the receiving computer, transmitting as part of each data block a block number which is higher than that of the last transmitted data block, and periodically re-transmitting each data block present in said memory and its block number until said data block is purged from said memory;

c. checking each of said transmitted data blocks at the receiving computer and rejecting any whose block number is not higher than that of all previously correctly received data blocks;

d. storing at said receiving computer each data block which is received and not rejected and performing a longitudinal sum check to confirm that each stored data block has been correctly received;

e. periodically transmitting an acknowledgment number from the receiving computer to the transmitting computer corresponding to the block number of each data block which has been received, stored, and found to be correct by said receiving computer;

f. keeping count at the transmitting computer of the last acknowledgment number received from the receiving computer; and g. intermittently purging from the string of data blocks in the memory of said transmitting computer all data blocks up to and including the one corresponding to the last acknowledgment number received from the receiving computer, so that each data block is transmitted by the transmitting computer until it receives positive acknowledgment that the data block has been correctly received by said receiving computer.

8. A method of transmitting a series of data blocks from a transmitting computer to a receiving computer comprising the steps of a. assembling a string of data blocks in the memory of the transmitting computer;

b. successively transmitting data blocks from said string to the receiving computer, transmitting as part of each data block a block number which bears a predetermined relationship to the block number of the last transmitted data block, and periodically retransmitting each data block present in said memory and its block number until said data block is purged from said memory;

c. checking each of said transmitted data blocks at the receiving computer and rejecting any whose block number does not bear said predetermined relationship to the block number of the last correctly received data block;

d. storing at said receiving computer each data block which is received and not rejected and performing a check to confirm that each stored data block has been correctly received;

e. periodically transmitting an acknowledgment number from the receiving computer to the transmitting computer corresponding to the block number of the last data block which has been received, stored, and found to be correct by said receiving computer;

f. keeping count at the transmitting computer of the last acknowledgment number received from the receiving computer; and g. intermittently purging from the string of data blocks in the memory of said transmitting computer all data blocks up to and including the one corresponding to the last acknowledgment number received from the receiving computer, so that each data block is transmitted by the transmitting computer until it receives positive acknowledgment that the data block has been correctly received by the receiving computer.

* * * * *